(12) United States Patent
Obama

(10) Patent No.: US 8,837,910 B2
(45) Date of Patent: Sep. 16, 2014

(54) IMAGE PROCESSING PROGRAM, IMAGE PROCESSING DEVICE AND IMAGE PROCESSING METHOD

(75) Inventor: Akihiko Obama, Tokyo (JP)

(73) Assignee: Nikon Corporation, Tokyo (JP)

( * ) Notice: Subject to any disclaimer, the term of this patent is extended or adjusted under 35 U.S.C. 154(b) by 1167 days.

(21) Appl. No.: 12/311,705

(22) PCT Filed: Oct. 10, 2007

(86) PCT No.: PCT/JP2007/069755
§ 371 (c)(1),
(2), (4) Date: Apr. 9, 2009

(87) PCT Pub. No.: WO2008/047643
PCT Pub. Date: Apr. 24, 2008

(65) Prior Publication Data
US 2010/0027959 A1  Feb. 4, 2010

(30) Foreign Application Priority Data
Oct. 10, 2006  (JP) .................................. 2006-276189

(51) Int. Cl.
*G06F 21/00* (2013.01)
*G06F 17/30* (2006.01)
*G11B 27/034* (2006.01)
*H04N 5/765* (2006.01)
*H04N 5/77* (2006.01)

(52) U.S. Cl.
CPC .......... *H04N 5/765* (2013.01); *G06F 17/30265* (2013.01); *G11B 27/034* (2013.01); *H04N 5/772* (2013.01)

USPC ........................... 386/278; 386/201; 386/223

(58) Field of Classification Search
USPC ......................................... 386/278, 201, 223
See application file for complete search history.

(56) References Cited

U.S. PATENT DOCUMENTS

| 5,778,136 | A | 7/1998 | Hirayama et al. |
| 2004/0022522 | A1 | 2/2004 | Terada |
| 2004/0130635 | A1 | 7/2004 | Kasai |
| 2005/0254363 | A1 | 11/2005 | Hamada et al. |
| 2006/0158526 | A1* | 7/2006 | Kashiwa et al. .......... 348/211.11 |
| 2006/0204143 | A1* | 9/2006 | Shiota et al. ................... 382/305 |

FOREIGN PATENT DOCUMENTS

| EP | 1 585 133 A1 | 10/2005 |
| EP | 1 675 395 A1 | 6/2006 |
| JP | A-11-341449 | 12/1999 |

(Continued)

OTHER PUBLICATIONS

Extended European Search Report issued in European Application No. 07829493.1 dated May 6, 2011.

(Continued)

*Primary Examiner* — Jeffrey Pwu
*Assistant Examiner* — Thong Truong
(74) *Attorney, Agent, or Firm* — Oliff PLC

(57) ABSTRACT

An image processing program that is executed by a computer includes: reading process of reading a plurality of image data items that have been photographed and acquired by a plurality of cameras; and editing process of extracting image data items of which dates and times of photography overlap within a same time band from among the plurality of image data items that have been read, and generating a data item for playback by editing the plurality of extracted image data items.

17 Claims, 36 Drawing Sheets

(56) References Cited

FOREIGN PATENT DOCUMENTS

| | | |
|---|---|---|
| JP | A-2000-244914 | 9/2000 |
| JP | A-2000-316146 | 11/2000 |
| JP | A-2004-064396 | 2/2004 |
| JP | A-2004-328185 | 11/2004 |
| JP | A-2004-343472 | 12/2004 |
| JP | A-2006-033155 | 2/2006 |
| WO | WO 2004/029960 A1 | 4/2004 |

OTHER PUBLICATIONS

May 29, 2012 Office Action issued in Japanese Patent Application No. 2008-539757 (with translation).

Aug. 28, 2012 Office Action issued in Japanese Application No. 2008-539757 (with English Translation).

* cited by examiner

FIG.3
(a) 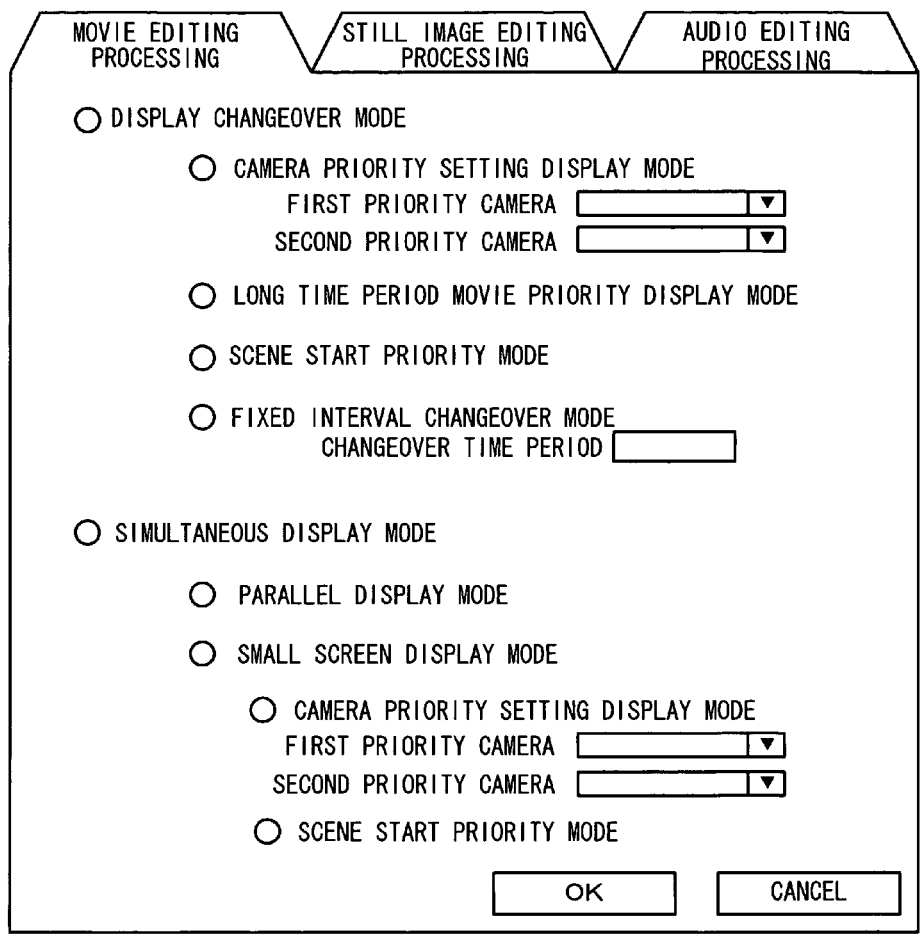
(b) 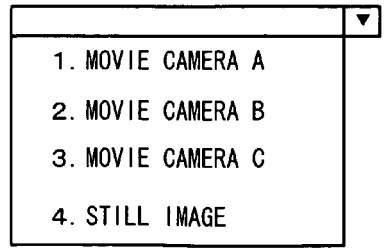

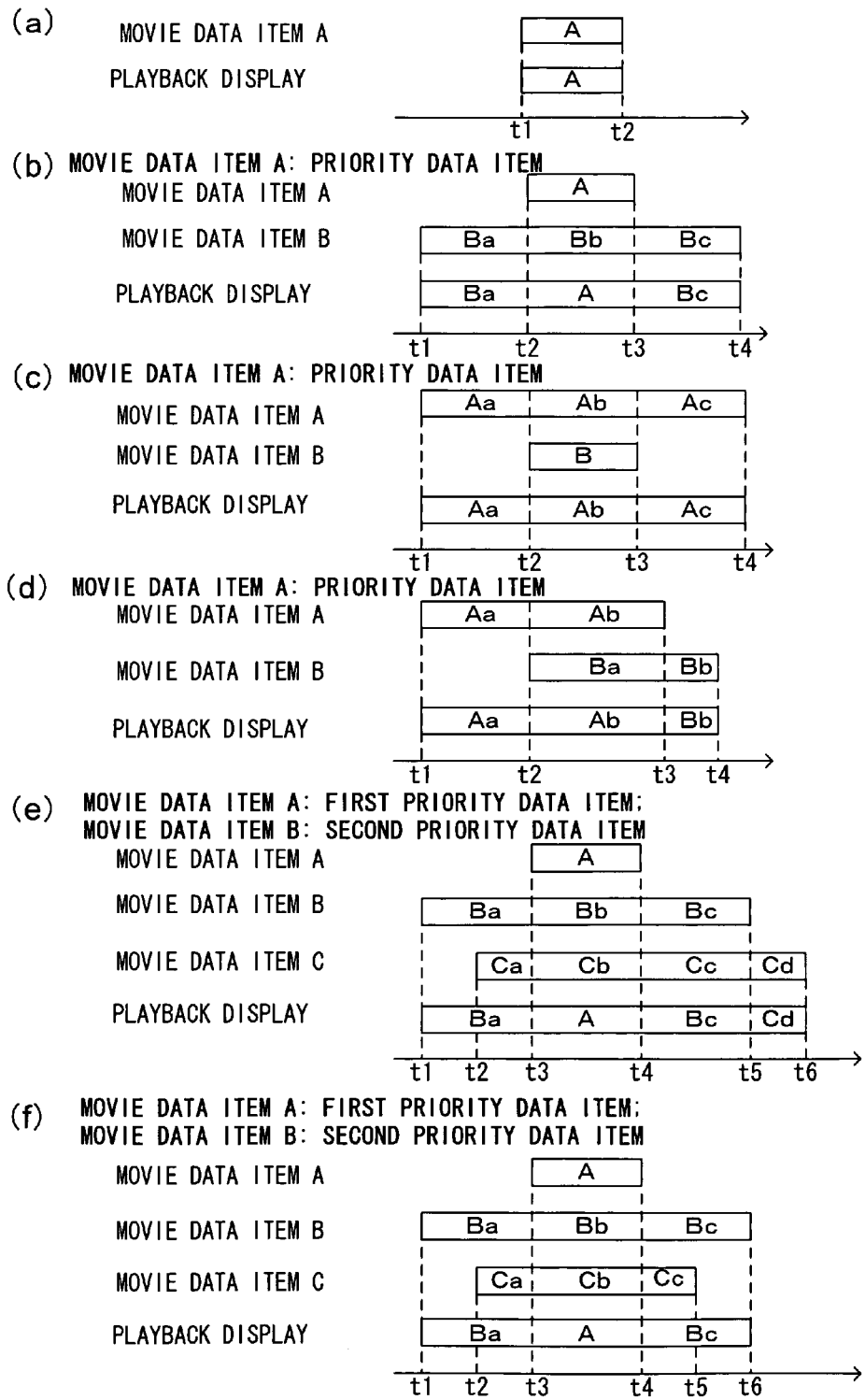

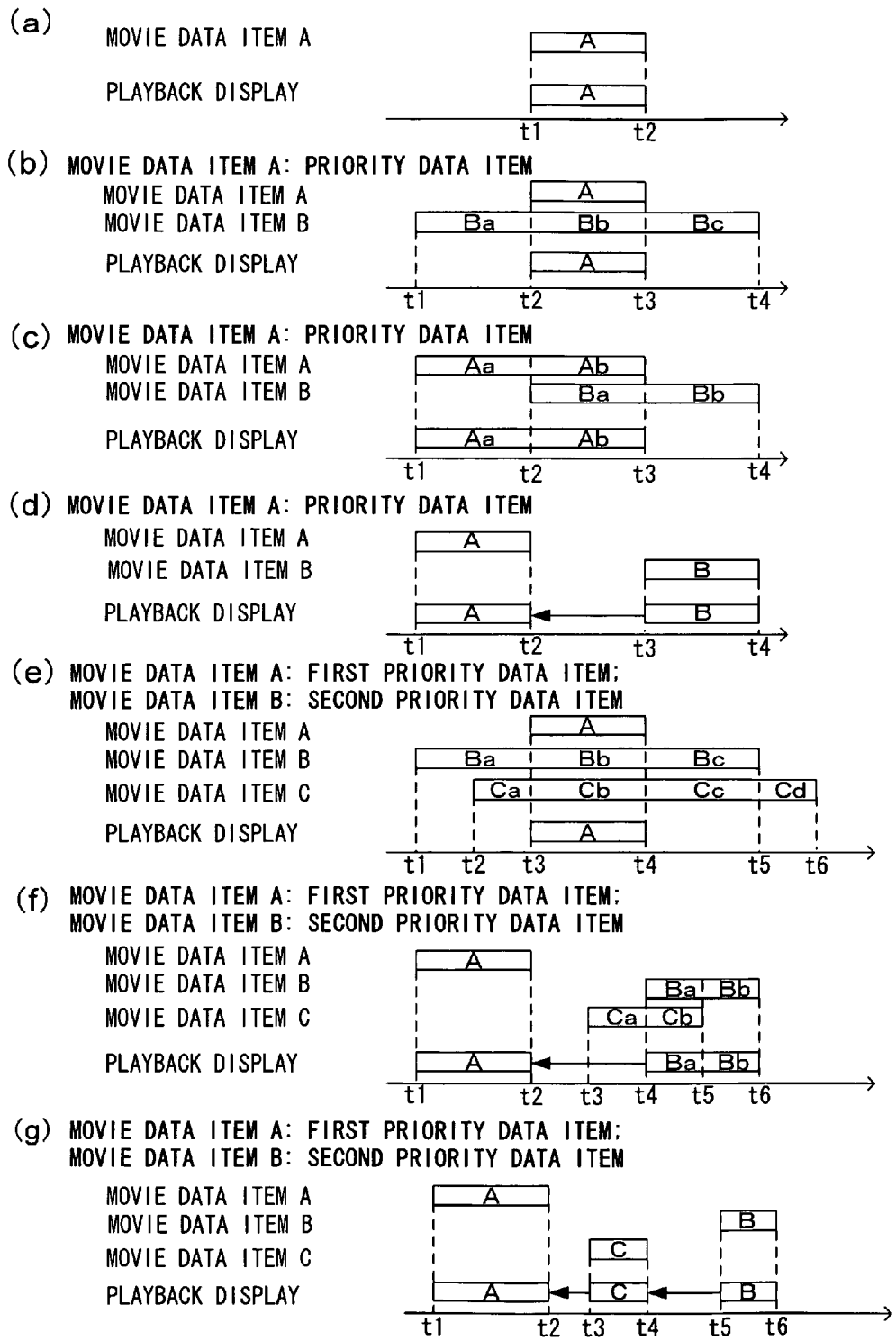
FIG.6 THE DISPLAY ONE ONLY MODE IN THE PRIORITY CAMERA MODE OF THE DISPLAY CHANGEOVER MODE FIG.7  THE COMBINED DISPLAY MODE IN THE LONG TIME PERIOD MOVIE
PRIORITY MODE OF THE DISPLAY CHANGEOVER MODE (a) MOVIE DATA ITEM A

PLAYBACK DISPLAY

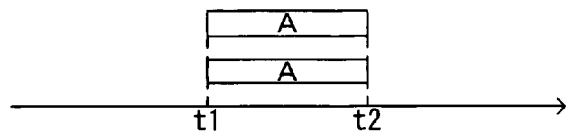

(b) MOVIE DATA ITEM A
MOVIE DATA ITEM B

PLAYBACK DISPLAY

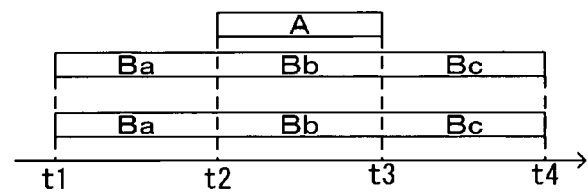

(c) MOVIE DATA ITEM A
MOVIE DATA ITEM B

PLAYBACK DISPLAY

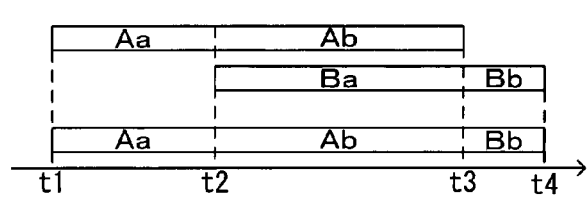

(d) MOVIE DATA ITEM A
MOVIE DATA ITEM B

PLAYBACK DISPLAY

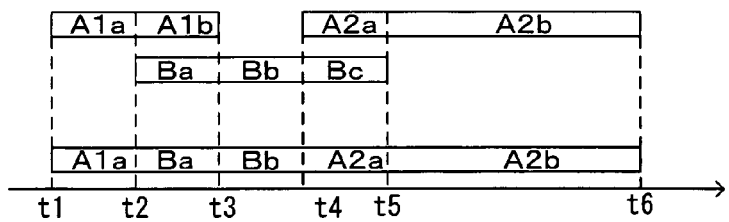

(e) MOVIE DATA ITEM A
MOVIE DATA ITEM B
MOVIE DATA ITEM C

PLAYBACK DISPLAY

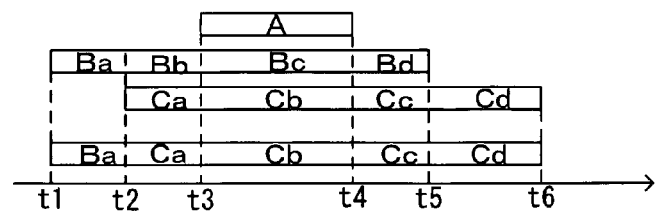

(f) MOVIE DATA ITEM A
MOVIE DATA ITEM B
MOVIE DATA ITEM C

PLAYBACK DISPLAY

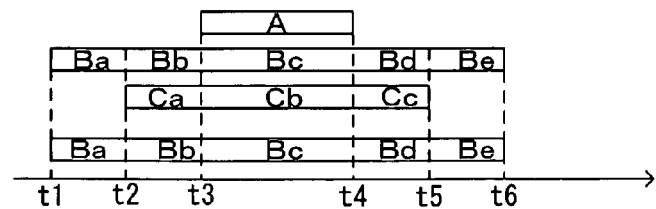

FIG.8
THE DISPLAY ONE ONLY MODE IN THE LONG TIME PERIOD MOVIE
PRIORITY MODE OF THE DISPLAY CHANGEOVER MODE
(a) 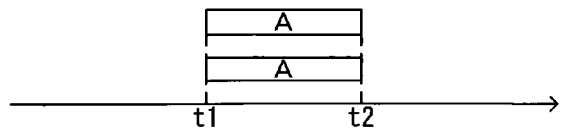
(b) 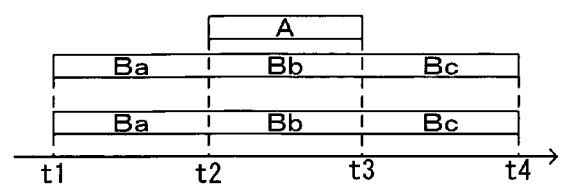
(c) 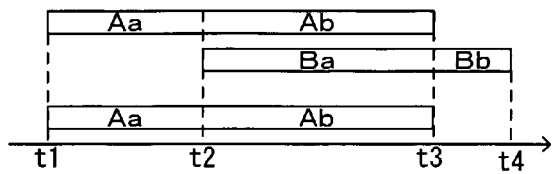
(d) 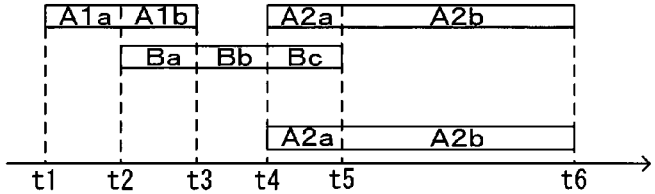
(e) 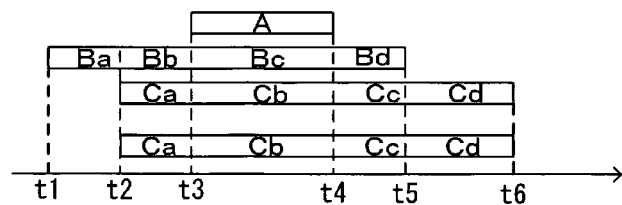
(f) 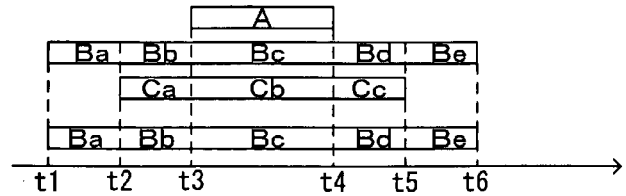

FIG.9 THE SCENE START PRIORITY MODE IN THE DISPLAY CHANGEOVER MODE
(a)
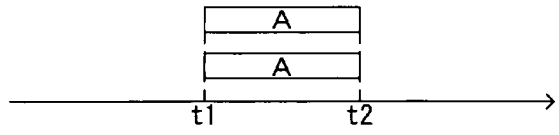
(b)
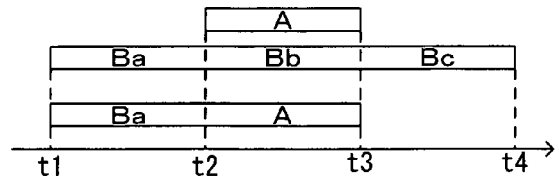
(c)
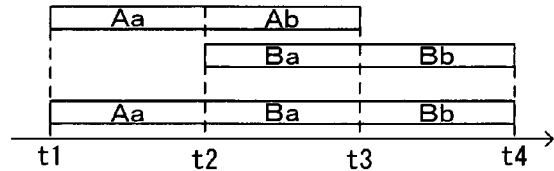
(d)
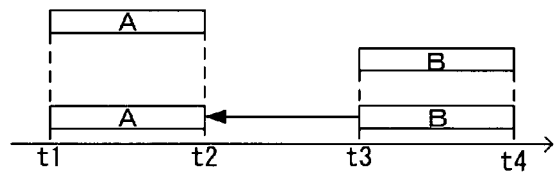
(e)
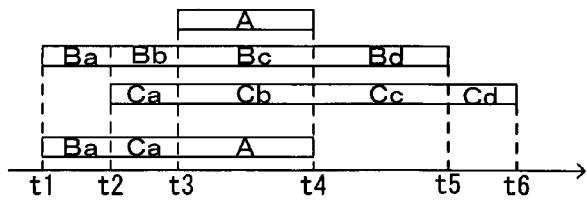
(f)
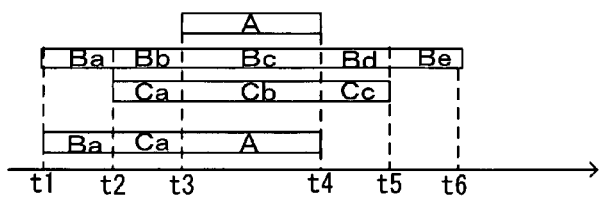
(g)
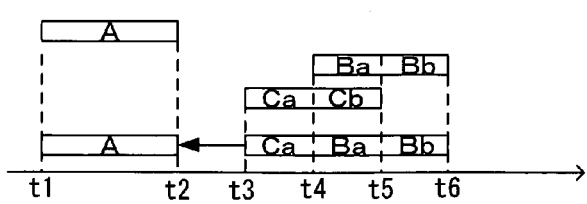

FIG.10   THE FIXED INTERVAL CHANGEOVER MODE
IN THE DISPLAY CHANGEOVER MODE
(a) 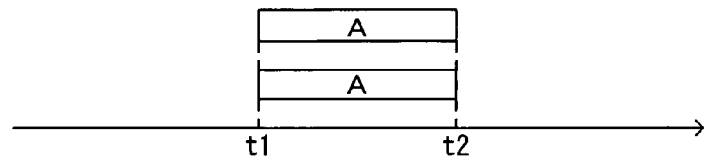
(b) 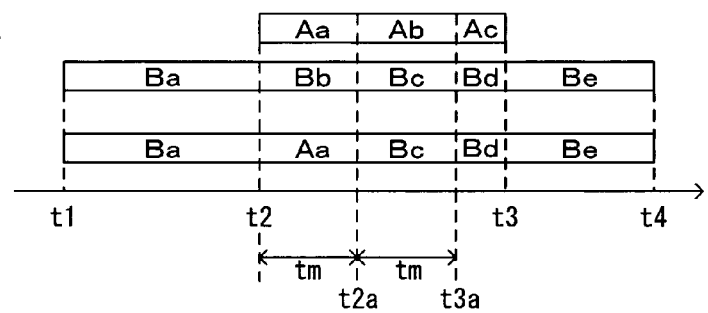
(c) 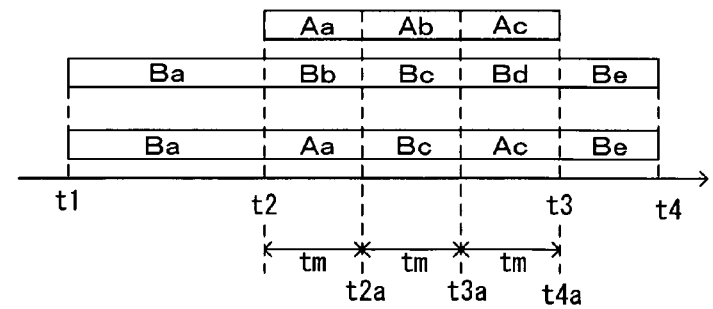
(d) 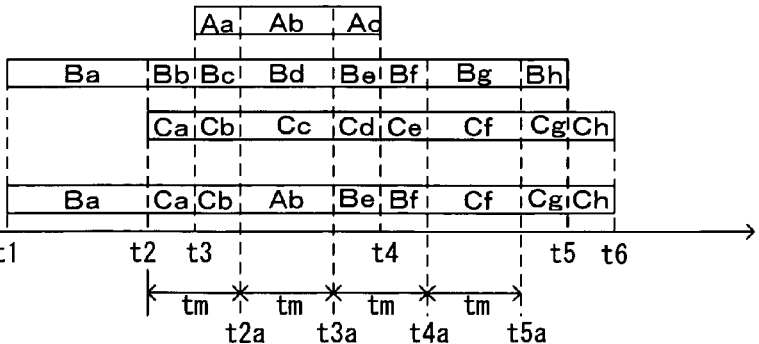

FIG.11
THE PARALLEL DISPLAY MODE IN THE
SIMULTANEOUS DISPLAY MODE
(a)
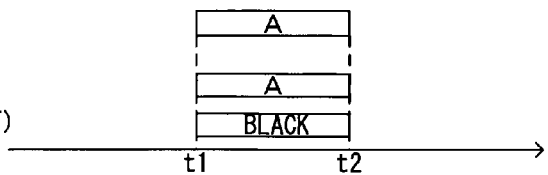
(b)
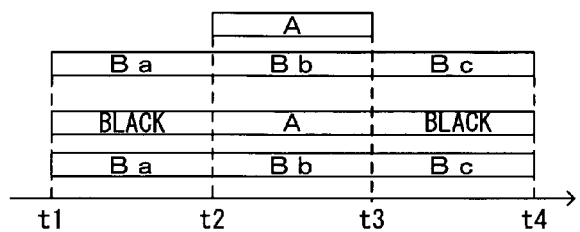
(c)
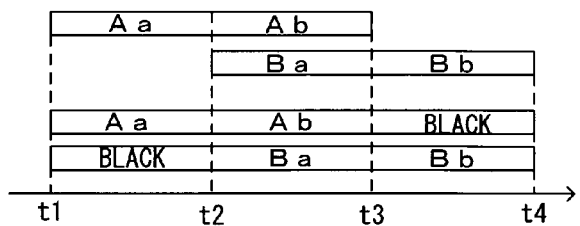
(d) MOVIE A, MOVIE B DISPLAY
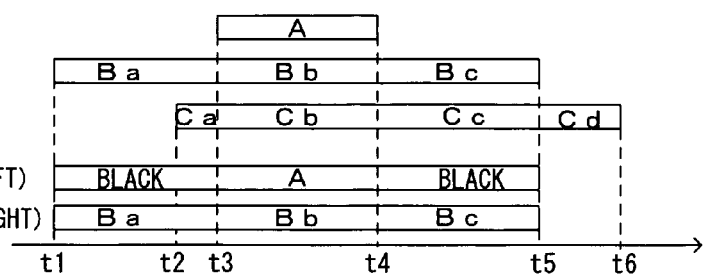

FIG.12  THE CAMERA PRIORITY SETTING MODE IN THE SMALL SCREEN
DISPLAY MODE OF THE SIMULTANEOUS DISPLAY MODE (a) MOVIE DATA ITEM A

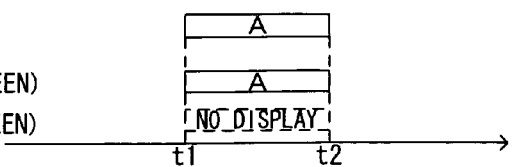

(b) MOVIE DATA ITEM A: PRIORITY DATA ITEM

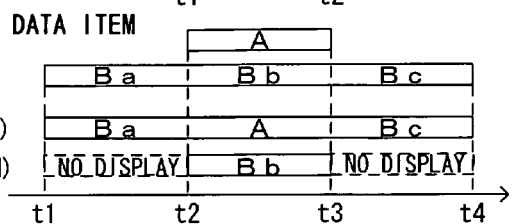

(c) MOVIE DATA ITEM A: PRIORITY DATA ITEM

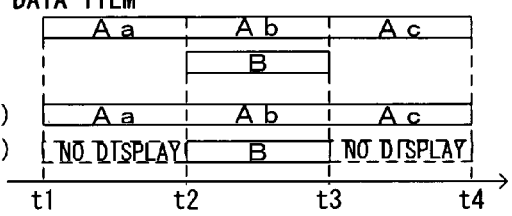

(d) MOVIE DATA ITEM A: PRIORITY DATA ITEM

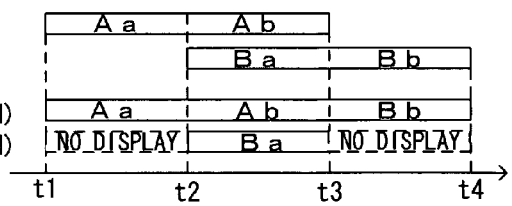

(e) MOVIE DATA ITEM A: FIRST PRIORITY DATA ITEM,
MOVIE DATA ITEM B: SECOND PRIORITY DATA ITEM

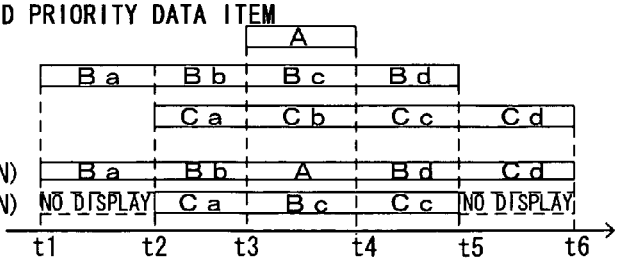

(f) MOVIE DATA ITEM A: FIRST PRIORITY DATA ITEM;
MOVIE DATA ITEM B: SECOND PRIORITY DATA ITEM

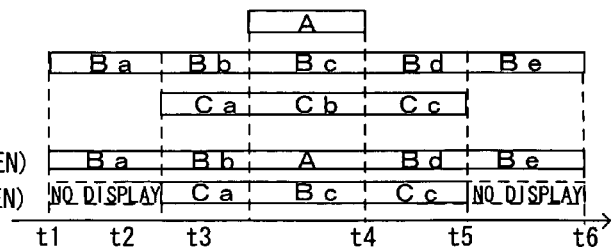

FIG.13
THE SCENE START PRIORITY MODE IN THE SMALL SCREEN DISPLAY MODE OF THE SIMULTANEOUS DISPLAY MODE
(a) 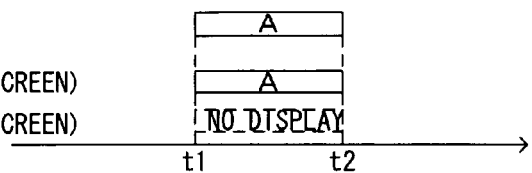
(b) 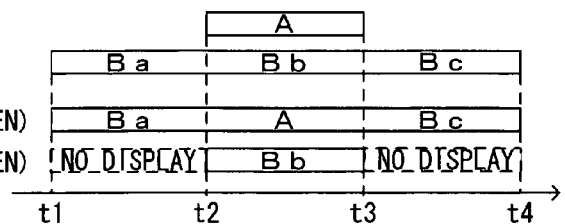
(c) 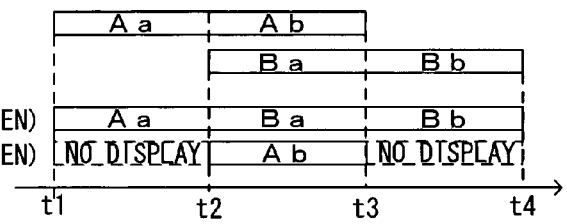
(d) 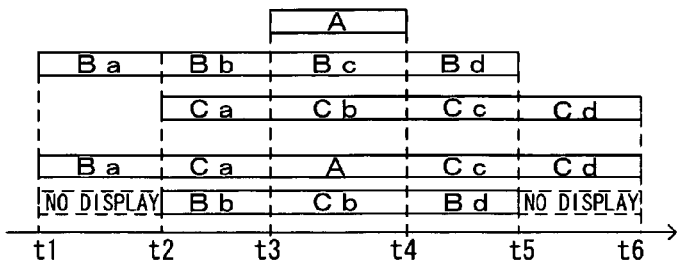
(e) 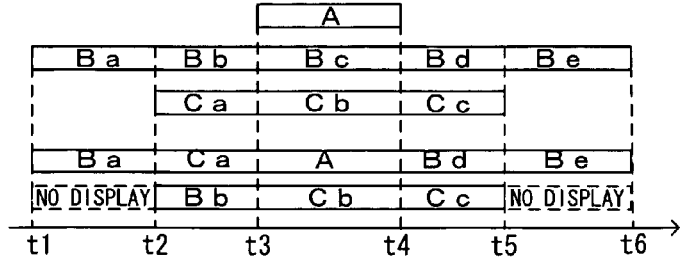

FIG. 15  STILL IMAGES: THE STILL IMAGE SIMULTANEOUS INSERTION MODE
MOVIE: THE COMBINED DISPLAY MODE IN THE CAMERA PRIORITY
SETTING MODE OF THE DISPLAY CHANGEOVER MODE (a) STILL IMAGE DATA ITEM S

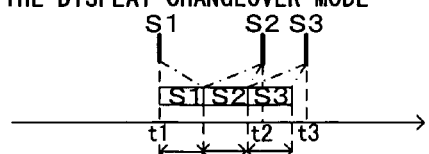

(b) MOVIE DATA ITEM A: PRIORITY DATA ITEM
   MOVIE DATA ITEM A
   STILL IMAGE DATA ITEM S

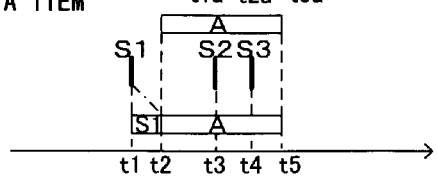

(c) STILL IMAGE DATA ITEM S: PRIORITY DATA ITEM
   MOVIE DATA ITEM A
   STILL IMAGE DATA ITEM S

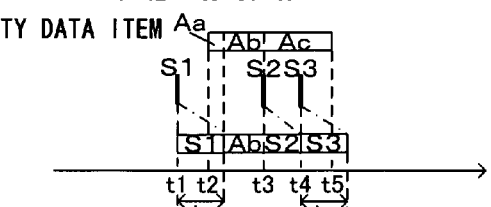

(d) MOVIE DATA ITEM A: FIRST PRIORITY DATA ITEM;
   MOVIE DATA ITEM B: SECOND PRIORITY DATA ITEM

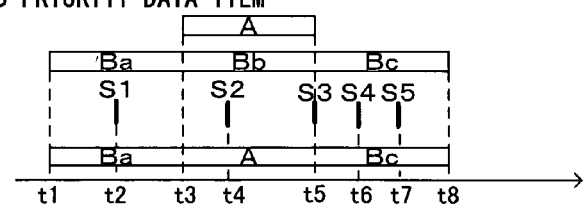

(e) STILL IMAGE DATA ITEM S: FIRST PRIORITY DATA ITEM;
   MOVIE DATA ITEM A: SECOND PRIORITY DATA ITEM

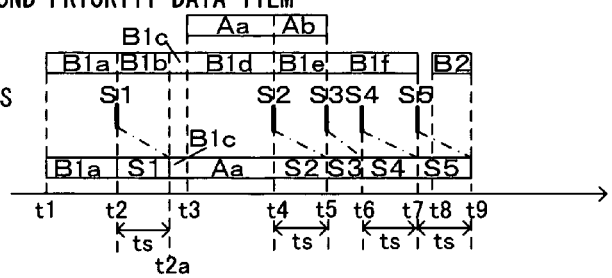

(f) MOVIE DATA ITEM A: FIRST PRIORITY DATA ITEM;
   STILL IMAGE DATA ITEM S: SECOND PRIORITY DATA ITEM

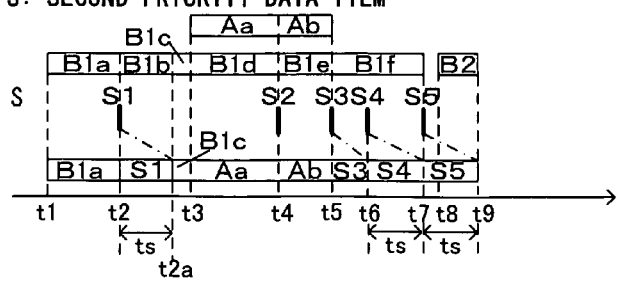

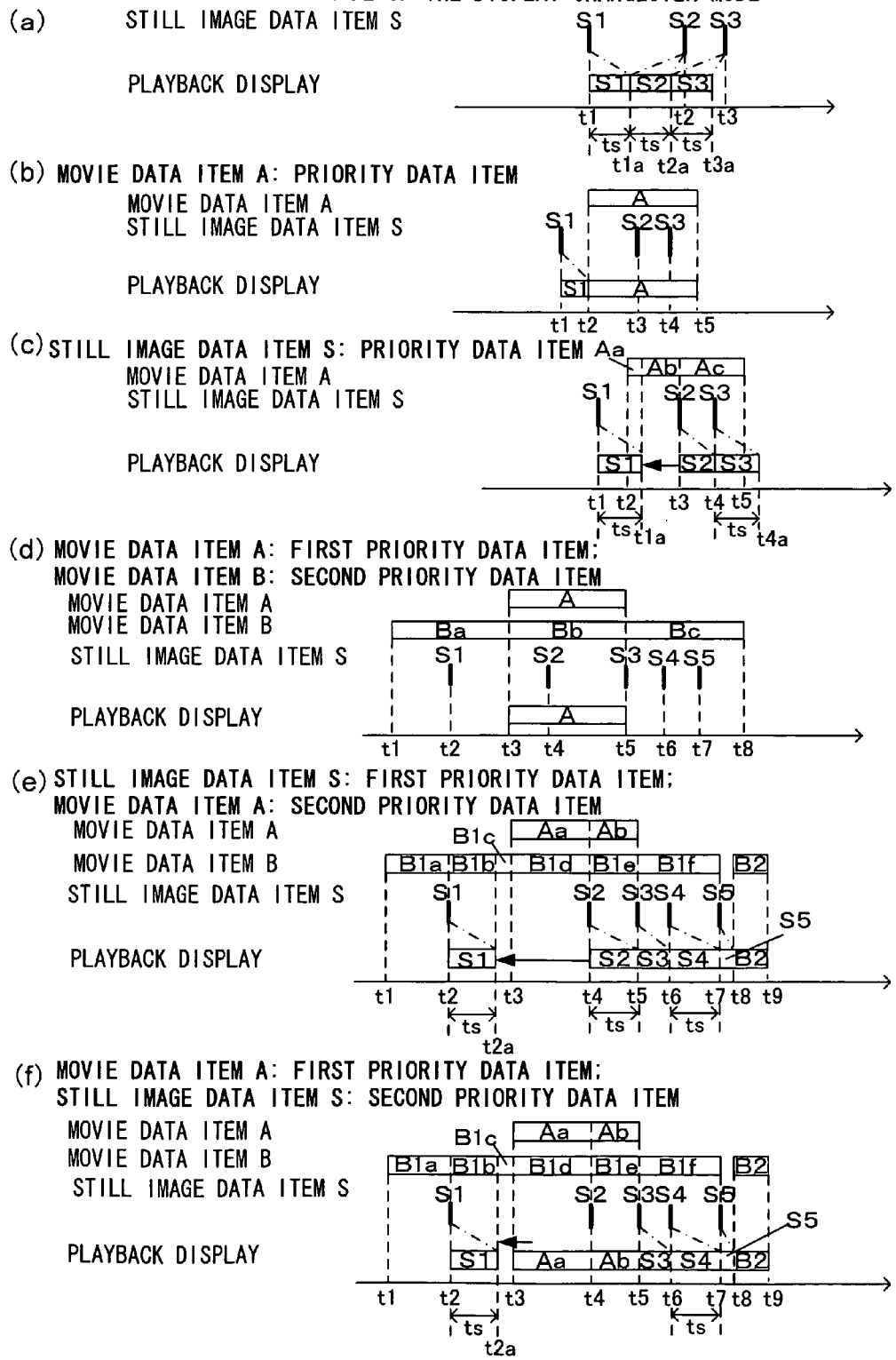

FIG.17
STILL IMAGES: THE STILL IMAGE SIMULTANEOUS INSERTION MODE
MOVIE: THE COMBINED DISPLAY MODE IN THE LONG TIME PERIOD
MOVIE PRIORITY MODE OF THE DISPLAY CHANGEOVER MODE (a) STILL IMAGE DATA ITEM S

PLAYBACK DISPLAY

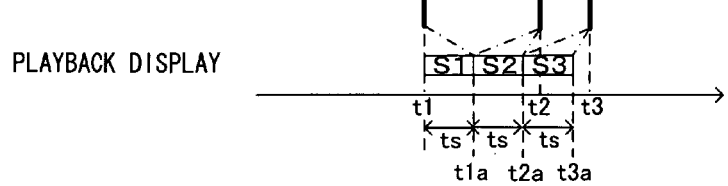

(b) MOVIE DATA ITEM A
STILL IMAGE DATA ITEM S

PLAYBACK DISPLAY

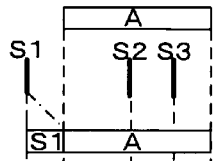

(c) MOVIE DATA ITEM A
MOVIE DATA ITEM B
STILL IMAGE DATA ITEM S

PLAYBACK DISPLAY

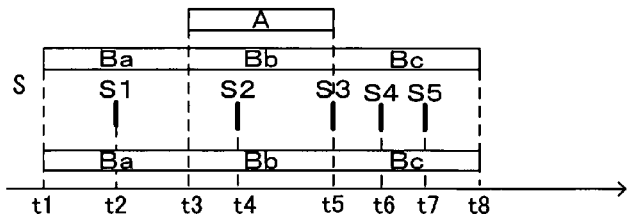

(d) MOVIE DATA ITEM A
MOVIE DATA ITEM B
STILL IMAGE DATA ITEM S

PLAYBACK DISPLAY

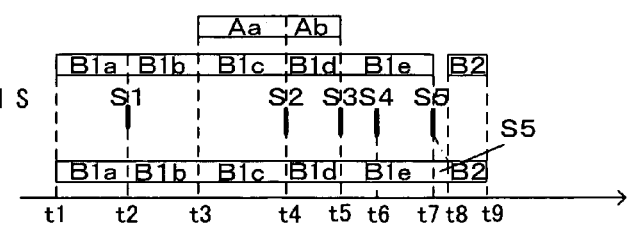

(e) MOVIE DATA ITEM A
MOVIE DATA ITEM B
STILL IMAGE DATA ITEM S

PLAYBACK DISPLAY

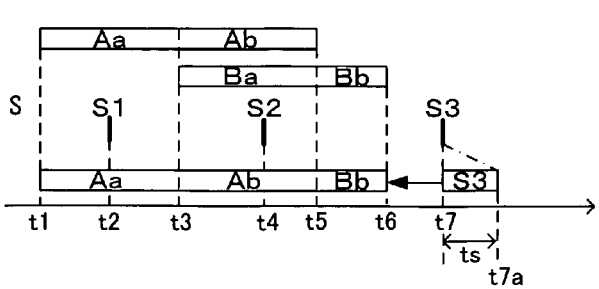

FIG.18
STILL IMAGES: THE STILL IMAGE SIMULTANEOUS INSERTION MODE
MOVIE: THE DISPLAY ONE ONLY MODE IN THE LONG TIME PERIOD
MOVIE PRIORITY MODE OF THE DISPLAY CHANGEOVER MODE
(a)
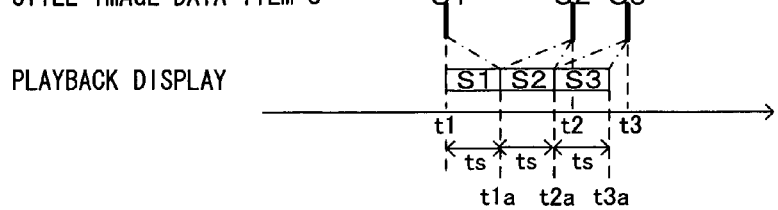
(b)
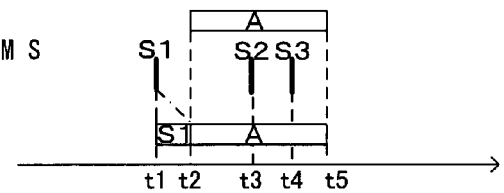
(c)
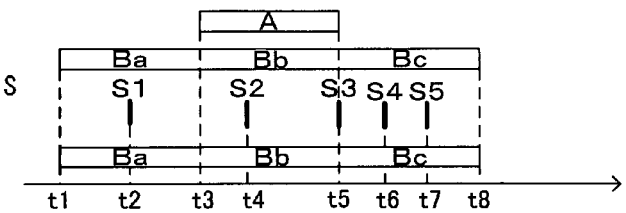
(d)
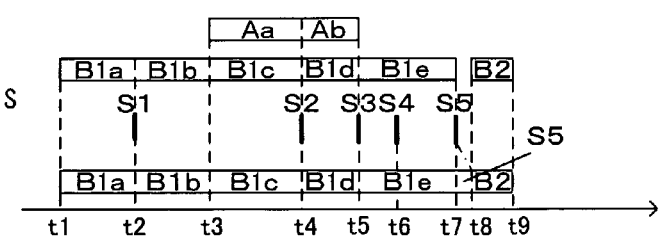
(e)
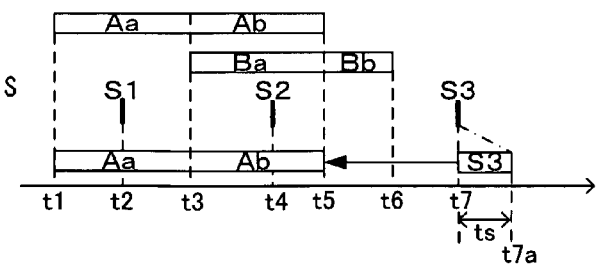

FIG.21
STILL IMAGES: THE STILL IMAGE SIMULTANEOUS INSERTION MODE
MOVIE: THE PARALLEL DISPLAY MODE IN THE SIMULTANEOUS DISPLAY MODE
(a) STILL IMAGE DATA ITEM S
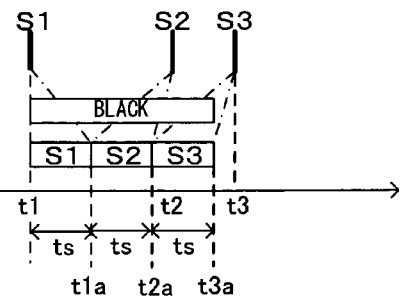
(b)
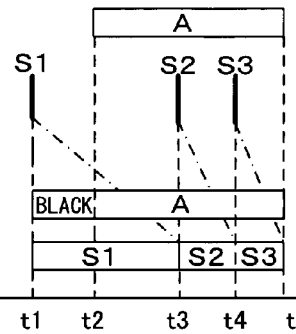
(c) DISPLAY MOVIE A AND STILL IMAGE S
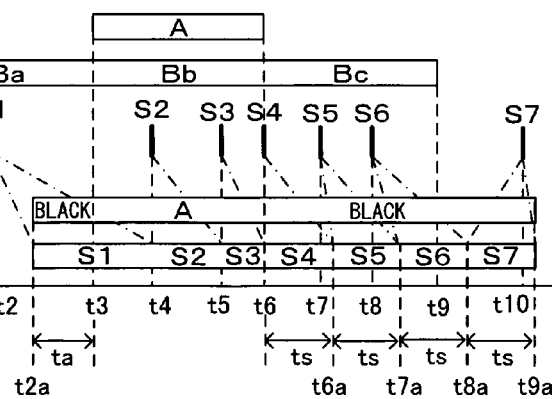
(d) DISPLAY MOVIE B AND STILL IMAGE S
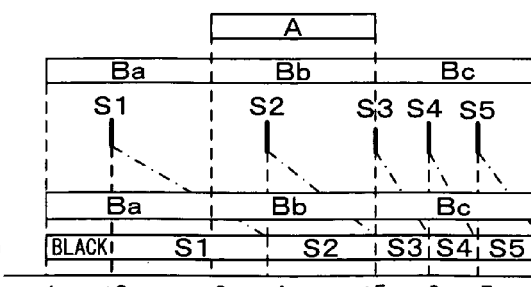

FIG.22 STILL IMAGES: THE STILL IMAGE SIMULTANEOUS INSERTION MODE
MOVIE: THE CAMERA PRIORITY SETTING MODE IN THE SMALL SCREEN
DISPLAY MODE OF THE SIMULTANEOUS DISPLAY MODE (a) STILL IMAGE DATA ITEM S

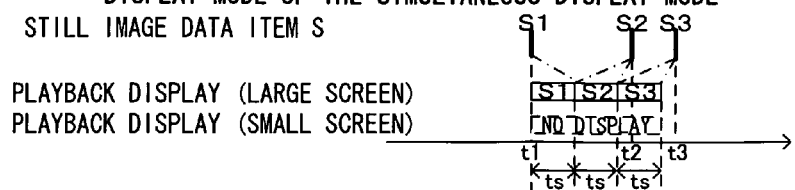

(b) MOVIE DATA ITEM A: PRIORITY DATA ITEM

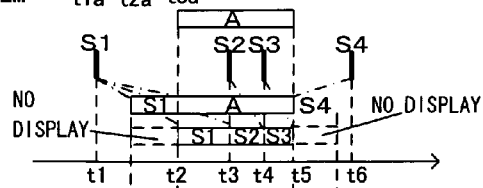

(c) STILL IMAGE DATA ITEM S: PRIORITY DATA ITEM

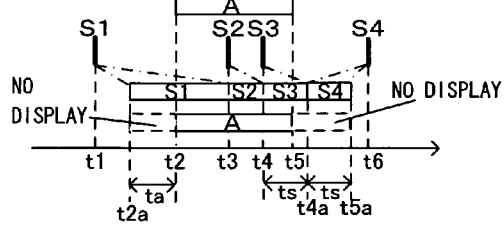

(d) ALWAYS DISPLAY STILL IMAGES S IN SMALL SCREEN DISPLAY REGION

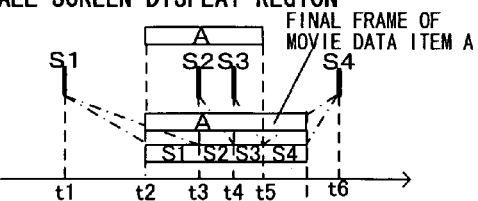

(e) MOVIE DATA ITEM A: FIRST PRIORITY DATA ITEM;
MOVIE DATA ITEM B: SECOND PRIORITY DATA ITEM

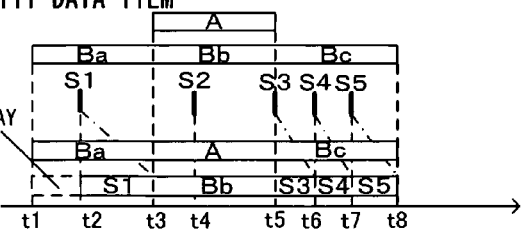

(f) MOVIE DATA ITEM A: FIRST PRIORITY DATA ITEM;
STILL IMAGE DATA ITEM S: SECOND PRIORITY DATA ITEM

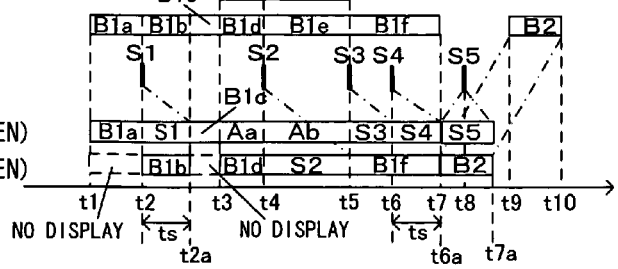

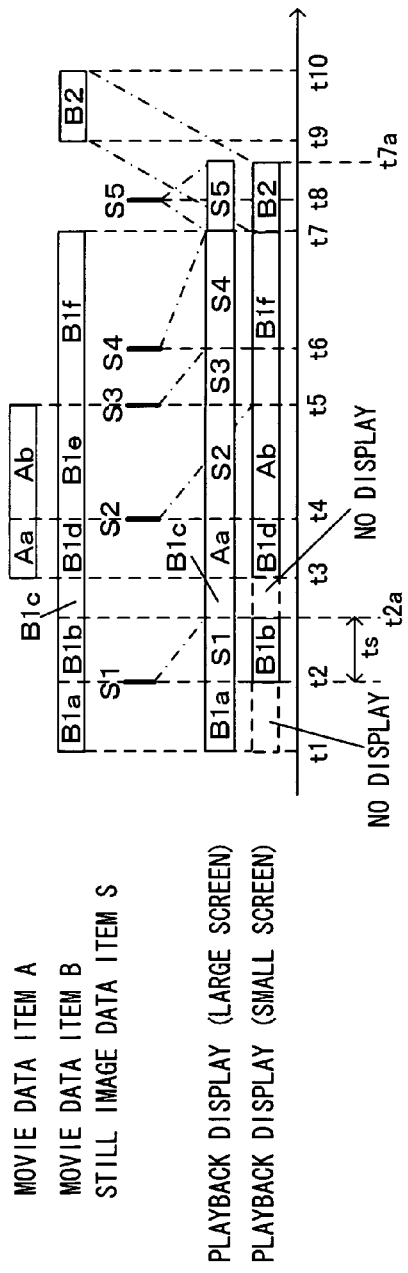
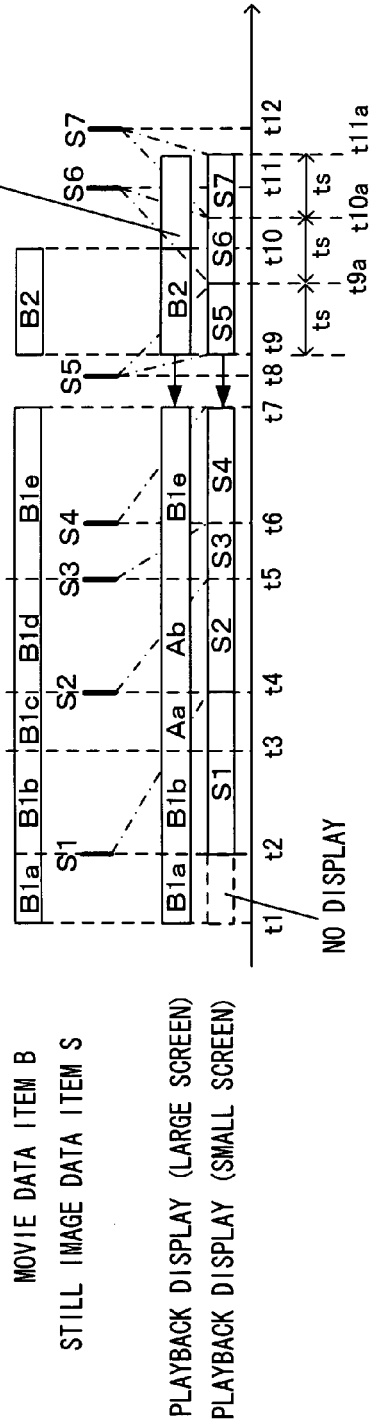
FIG.23

FIG.24
STILL IMAGES: THE STILL IMAGE SIMULTANEOUS INSERTION MODE
MOVIE: THE SCENE START PRIORITY MODE IN THE SMALL SCREEN
DISPLAY MODE OF THE SIMULTANEOUS DISPLAY MODE
(a) 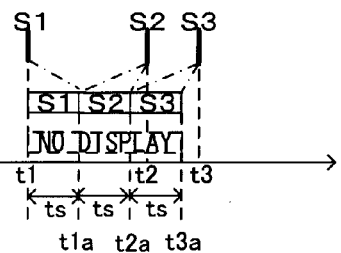
(b) 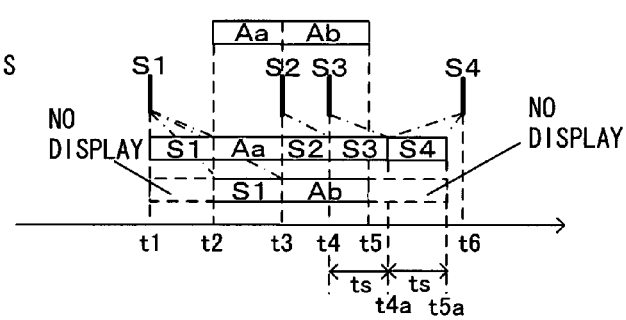
(c) 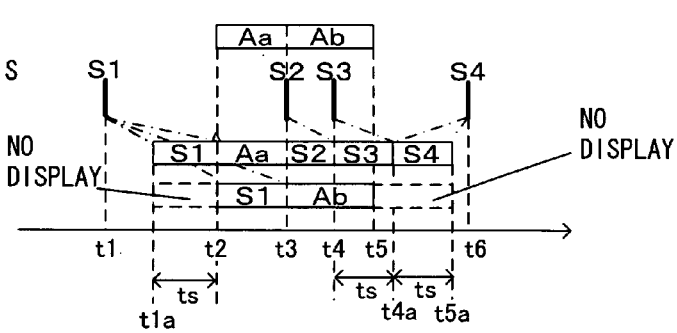
(d) 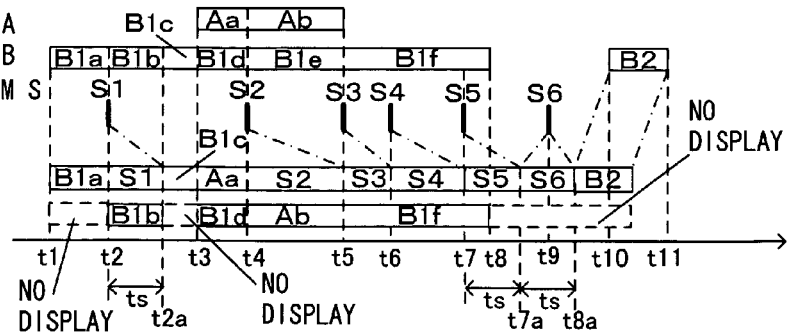

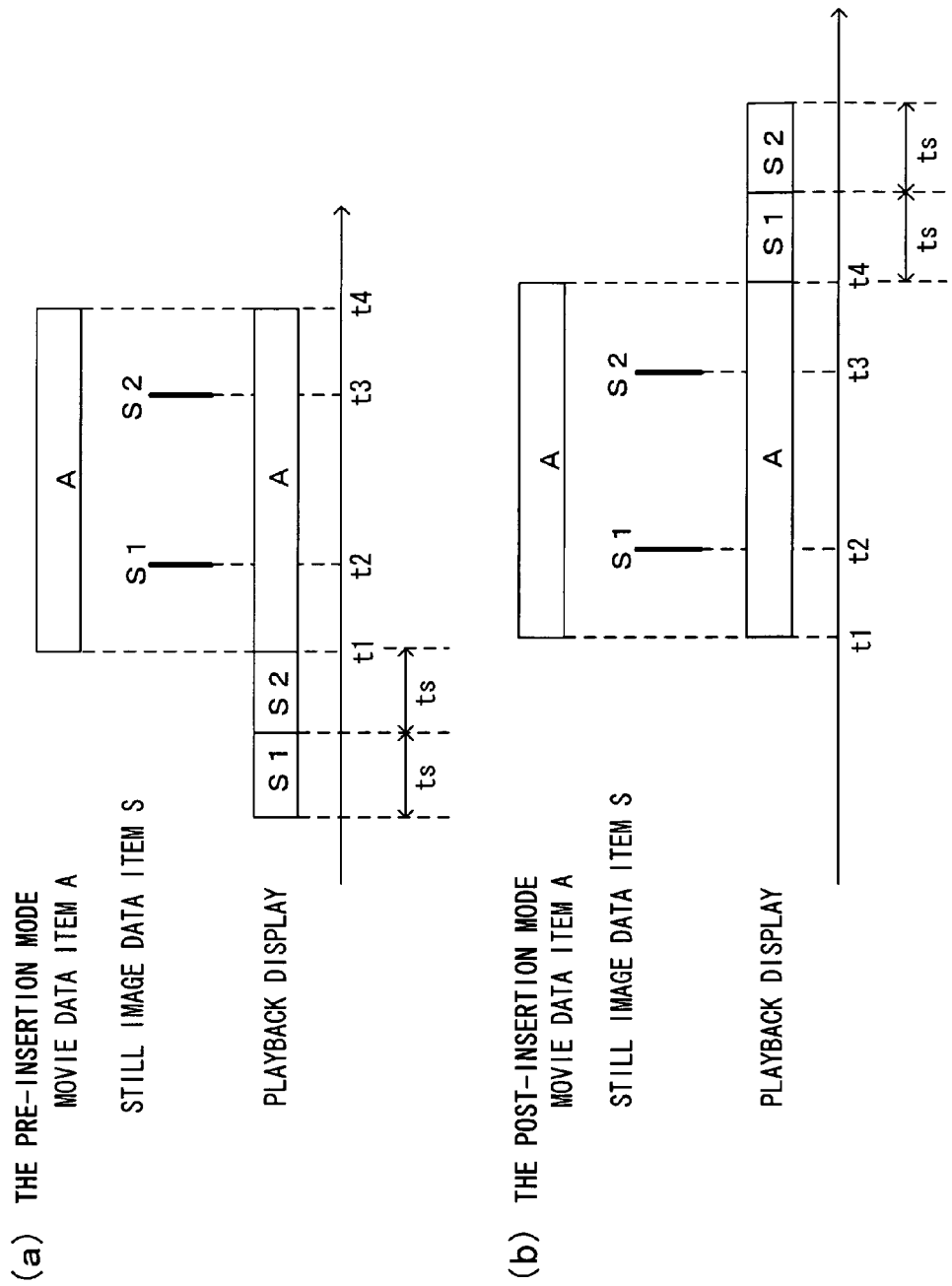

FIG. 26 THE PROGRAM BEFORE OR AFTER AGGREGATED MODE IN THE STILL IMAGE SIMULTANEOUS EDITING MODE
(a) THE PRE-INSERTION MODE
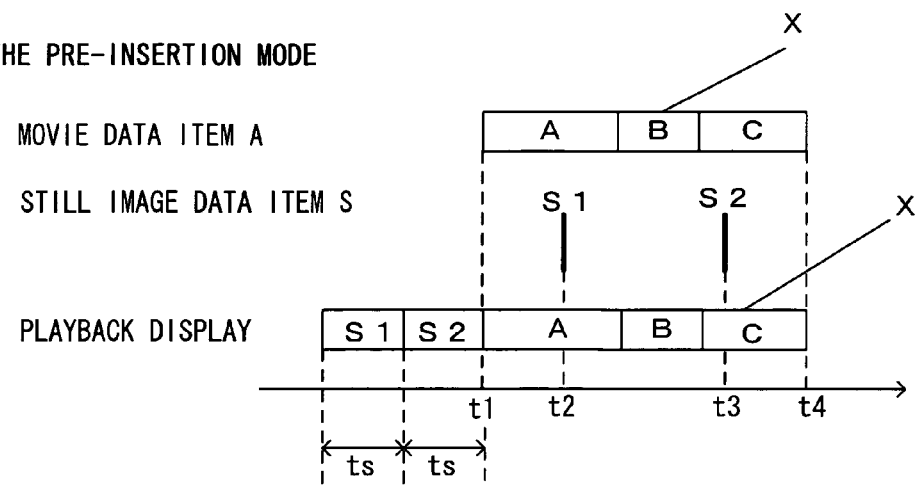
(b) THE POST-INSERTION MODE
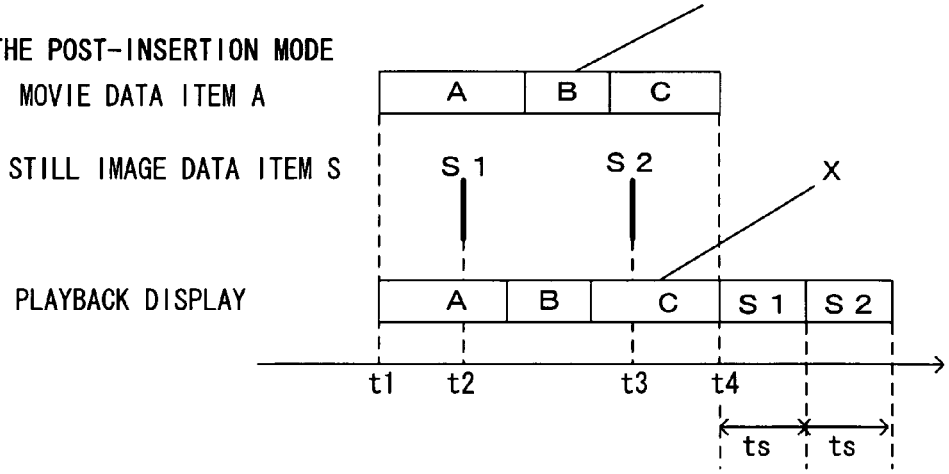
(c) THE PRE-AND-POST-INSERTION MODE
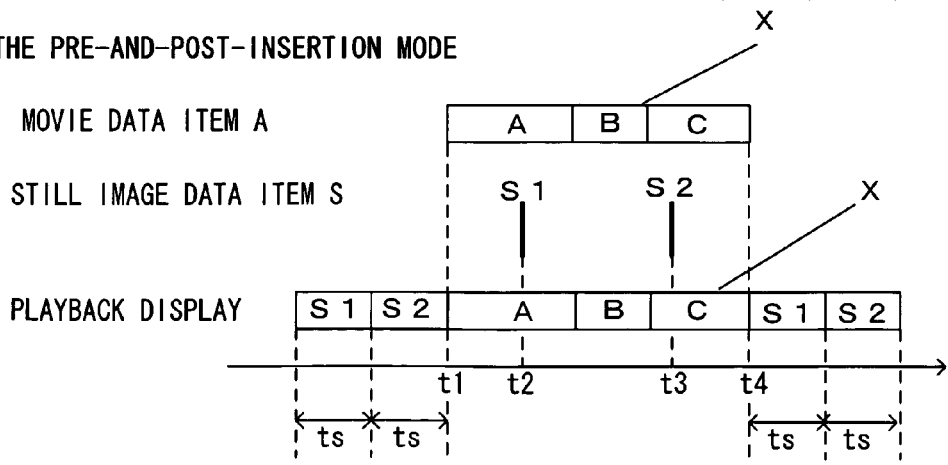

FIG. 27 THE MOVIE AUDIO SETTING MODE (a) THE AUDIO PRIORITY MODE
STILL IMAGE DATA ITEM S: FIRST PRIORITY DATA ITEM;
MOVIE DATA ITEM A: SECOND PRIORITY DATA ITEM
MOVIE DATA ITEM B: AUDIO PRIORITY DATA ITEM (b) THE NON-AUDIO PRIORITY MODE
STILL IMAGE DATA ITEM S: FIRST PRIORITY DATA ITEM;
MOVIE DATA ITEM A: SECOND PRIORITY DATA ITEM

FIG.33 THE COMBINED DISPLAY MODE IN THE SHORT TIME MOVIE PRIORITY MODE OF THE DISPLAY CHANGEOVER MODE

FIG.34
THE DISPLAY ONE ONLY MODE IN THE SHORT TIME
MOVIE PRIORITY MODE OF THE DISPLAY CHANGEOVER MODE
(a) 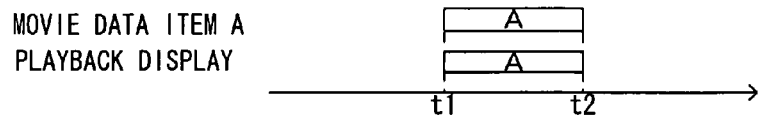
(b) 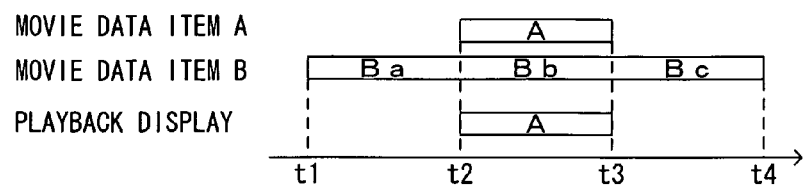
(c) 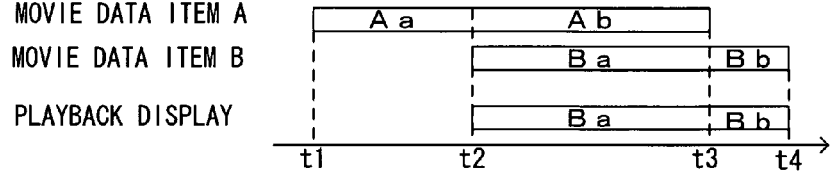
(d) 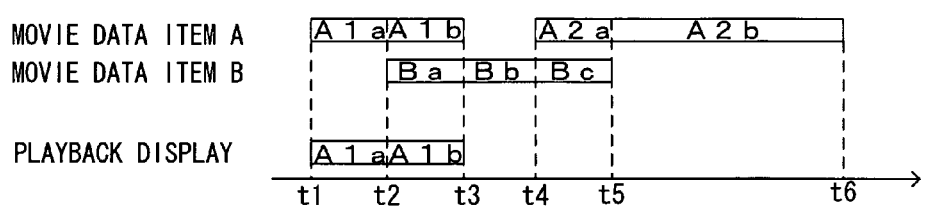
(e) 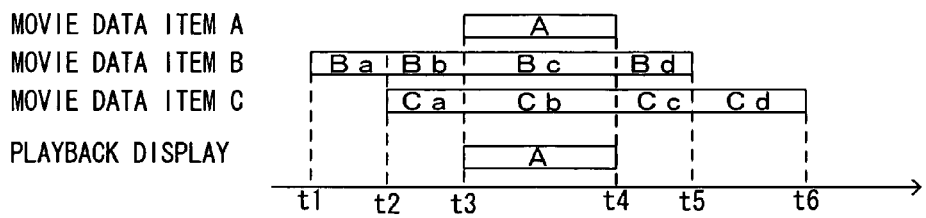
(f) 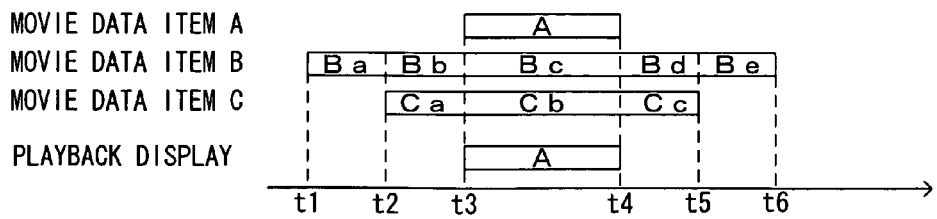

FIG.35

THE SCENE START PRIORITY MODE IN THE DISPLAY CHANGEOVER MODE (a)
MOVIE DATA ITEM A
PLAYBACK DISPLAY
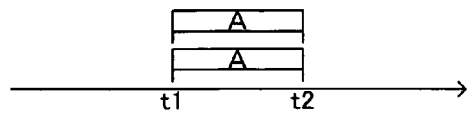

(b)
MOVIE DATA ITEM A
MOVIE DATA ITEM B
PLAYBACK DISPLAY
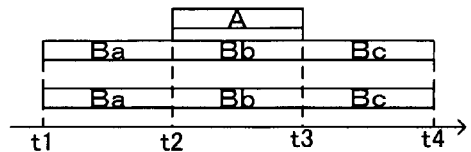

(c)
MOVIE DATA ITEM A
MOVIE DATA ITEM B
PLAYBACK DISPLAY
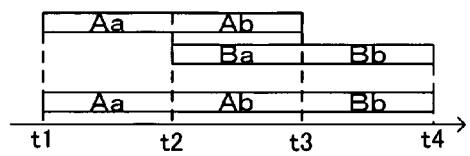

(d)
MOVIE DATA ITEM A
MOVIE DATA ITEM B
PLAYBACK DISPLAY
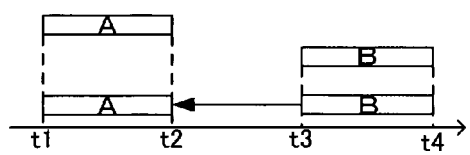

(e)
MOVIE DATA ITEM A
MOVIE DATA ITEM B
MOVIE DATA ITEM C
PLAYBACK DISPLAY
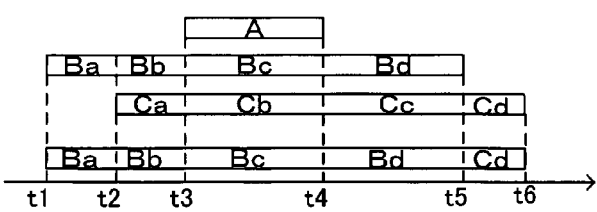

(f)
MOVIE DATA ITEM A
MOVIE DATA ITEM B
MOVIE DATA ITEM C
PLAYBACK DISPLAY
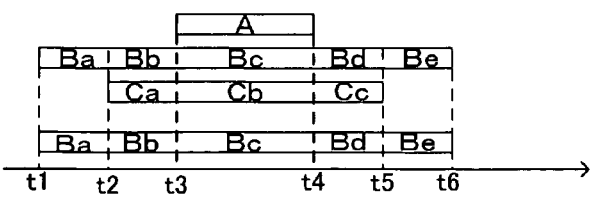

(g)
MOVIE DATA ITEM A
MOVIE DATA ITEM B
MOVIE DATA ITEM C
PLAYBACK DISPLAY
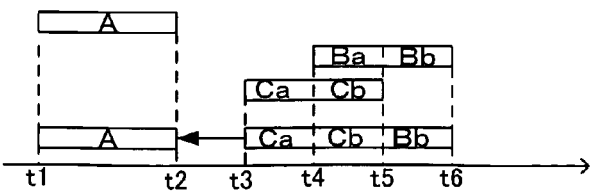

IMAGE PROCESSING PROGRAM, IMAGE PROCESSING DEVICE AND IMAGE PROCESSING METHOD

TECHNICAL FIELD

The present invention relates to an image processing program, an image processing device, and an image processing method for editing a plurality of images that have been acquired from different cameras.

BACKGROUND ART

An image generation method is known for generating a continuous playback image data item by arranging a plurality of image data items in order of date and time of photography (for example, see Patent Reference #1).
Patent Reference #1: Japanese Laid-Open Patent Publication 2004-64396.

DISCLOSURE OF THE INVENTION

Problems to be Solved by the Invention

However, if the dates and times of photography of a plurality of image data items are overlapped in the same time band, with this prior art image generation method, it is has been necessary for the user to perform selection between them by manual actuation.

Means for Solving the Problems

According to the present invention, an image processing program that is executed by a computer comprises: reading process of reading a plurality of image data items that have been photographed and acquired by a plurality of cameras; and editing process of extracting image data items of which dates and times of photography overlap within a same time band from among the plurality of image data items that have been read, and generating a data item for playback by editing the plurality of extracted image data items.

The image processing program according to the present invention can further comprise: selection process of selecting one editing mode from a plurality of editing modes according to a selection command output from an actuation member. In the image processing program, the editing process generates the data item for playback by editing the image data item according to the editing mode selected by the selection process.

In the image processing program according to the present invention, it is preferred that the editing process includes: image data item selection process of selecting an image data item as a selected image data item, from the plurality of extracted image data items and data item for playback generation process of generating the data item for playback so as to display an image upon one screen, based upon the selected image data item.

In the image processing program that includes the selection process and the data item for playback generation process, the image data item selection process can select the image data item that has been acquired by the camera of a highest priority level as the selected image data item, from among the plurality of extracted image data items that are acquired by the plurality of cameras assigned to different priority levels.

In the image processing program that includes the selection process and the data item for playback generation process, if a movie data item and a still image data item have been extracted, the image data item selection process can select the still image data item as the selected image data item. Furthermore, if a movie data item and a still image data item have been extracted, the image data item selection process can to select a movie data item as the selected image data item.

In the image processing program that includes the selection process and the data item for playback generation process, it is preferred that the image data item selection process selects a movie data item that has a longest playback time period, as the selected image data item.

In the image processing program that includes the selection process and the data item for playback generation process, the image data item selection process can select a movie data item that has a shortest playback time period, as the selected image data item.

In the image processing program that includes the selection process and the data item for playback generation process, the image data item selection process can select an image data item that has a latest starting time point of photography, among the plurality of extracted image data items, as the selected image data item.

In the image processing program that includes the selection process and the data item for playback generation process, the image data item selection process can select an image data item that has an earliest starting time point of photography, among the plurality of extracted image data items, as the selected image data item.

In the image processing program that includes the selection process and the data item for playback generation process, the image data item selection process may select as follows. Namely, on the basis of the plurality of extracted image data items, the selection process selects a first image data item that is one of the plurality of extracted image data items for a first time band in the same time band of date and time of photography. The selection process selects a second image data item that is different from the first image data item from among the plurality of extracted image data items, for a second time band within the same time band of date and time of photography that is different from the first time band.

The image processing program according to the present invention, may further comprise ranking assignment process of assigning priority levels to the plurality of image data items. If the data item for playback is a data item for playback that displays images corresponding to the plurality of extracted image data items upon two large and small screens on the display monitor, the editing process can generate the data item for playback so as to display an image corresponding to an image data item to which a high priority level has been assigned in a large screen display region, and so as to display an image corresponding to an image data item to which a low priority level has been assigned in a small screen display region. In this case, for each of the plurality of image data item that are photographed by the cameras of which assigned to different priority levels and acquired, the ranking assignment process assigns the high priority level to an image data item that has been photographed with a camera to which a high priority level has been assigned, and assigns the low priority level to an image data item that has been photographed with a camera to which a low priority level has been assigned.

Even if the image corresponds to the image data item that has been photographed with the camera having the low priority level and of which priority level is low, the editing process can generate the data item for playback so as to display, in the large screen display region, the image corresponding to the image data item of which the date and time of photography do not overlap with an image corresponding to an image data item of which priority level is high and that has been photographed with the camera having the high priority level.

The image processing program according to the present invention can further comprise: ranking assignment process of assigning priority levels to the plurality of image data items; and mode setting process of setting one of a movie priority mode and a still image priority mode. If the data item for playback is a data item for playback that displays images corresponding to the plurality of extracted image data items in two large and small screen regions upon a display monitor, if a movie priority mode is set, when one of the plurality of extracted image data items by the editing process corresponds to a movie, and the other corresponds to a still image, the ranking assignment process can assign a high priority level to the image data item of the movie, and assign a low priority level to the image data item of the still image. If the data item for playback is a data item for playback that displays images corresponding to the plurality of extracted image data items in two large and small screen regions upon a display monitor, the editing process can generate the data item for playback so as to display the movie that corresponds to the image data item to which the high priority level has been assigned in the large screen display region, and so as to display the still image that corresponds to the image data item to which the low priority level has been assigned in the small screen display region. Furthermore, if a still image priority mode is set, when one of the plurality of extracted image data items by the editing process corresponds to a movie, and the other corresponds to a still image, the ranking assignment process can assign a high priority level to the image data item of the still image, and assigns a low priority level to the image data item of the movie. The editing process generates the data item for playback so as to display the still image that corresponds to the image data item to which the high priority level has been assigned in the large screen display region, and so as to display the movie that corresponds to the image data item to which the low priority level has been assigned in the small screen display region.

The image processing program according to the present invention can further comprise: ranking assignment process of assigning priority levels to the plurality of image data items, and the editing process can include process to compare a starting time points of photography of the plurality of extracted image data items. If the data item for playback is a data item for playback that displays images corresponding to the plurality of extracted image data items in two large and small screen regions on a display monitor, the ranking assignment process can assign, on the basis of a results of comparison of starting time points of photography, a high priority level to an image data item that has a later starting time point of photography, and assigns a low priority level to an image data item that has an earlier starting time point of photography. If the data item for playback is a data item for playback that displays images corresponding to the plurality of extracted image data items in two large and small screen regions on a display monitor, the editing process generates the data item for playback so as to display the image that corresponds to the image data item to which the high priority level has been assigned and that has the later starting time point of photography in the large screen display region, and so as to display the image that corresponds to the image data item to which the low priority level has been assigned and that has the earlier starting time point of photography in the small screen display region.

In the image processing program according to the present invention, if a movie data item and a plurality of still image data items have been extracted, the editing process can generate the data item for playback so as to display the images corresponding to the plurality of still image data items, before a starting time point of playback, or after an ending time point of playback, of an image corresponding to the movie data item.

The editing process of the image processing program according to the present invention can further include process to link together a plurality of separate movie data items that have been read by the reading means into one continuous program. These editing process extracts a plurality of still image data items of which dates and times of photography are overlapped the same time band with those of the plurality of movie data items before the program editing process, and generates the data item for playback so as to display images corresponding to the plurality of still image data items that have been extracted, before a starting time point of playback, or after an ending time point of playback, of the program.

The editing process of the image processing program according to the present invention may include following (i) though (iv):

(i) If a still image data item and a movie data item that is accompanied by audio have been extracted, the editing process can generate the data item for playback so as to display an image corresponding to the still image data item, and so as to play back the audio corresponding to the movie data item that is accompanied by audio. In this case, it is preferred that the audio that is output during display of the image corresponding to the still image data item corresponds to a movie data item accompanied by audio that has been photographed with a camera designated by the user.

(ii) If a movie data item accompanied by audio and a still image data item have been extracted, the editing process may generate the data item for playback so as, while displaying an image that corresponds to the still image data item, to play back the audio corresponding to the movie data item accompanied by audio, the audio being played back directly before starting the display of the image corresponding to the still image data item.

(iii) If a still image data item accompanied by audio and a movie data item have been extracted, the editing process may generate the data item for playback so as to play back the audio corresponding to the still image data item accompanied by audio, while displaying an image corresponding to the movie data item.

(iv) The editing process may generate the data item for playback so as to create and play back a sound effect, when the display of the plurality of images changes over.

An image processing device according to the present invention comprises: a reading unit that reads a plurality of image data items that have been photographed and acquired by a plurality of cameras; and an editing unit that extracts image data items of which dates and times of photography overlap within a same time band from among the plurality of image data items that have been read, and generates a data item for playback by editing the plurality of extracted image data items. The image processing device further comprises a selection unit that selects one editing mode from a plurality of editing modes, according to a selection command output from an actuation member. The editing unit generates the data item for playback by editing the image data item according to the editing mode selected by the selection unit.

It is preferred that the editing unit of the image processing device described above may include: an image data item selection unit that selects a single image data item as a selected image data item from the plurality of image data items that have been extracted; and a data item for playback generation unit that generates a data item for playback so as to display an image based upon the selected image data item as one screen. And, if a still image data item and a movie data item that is accompanied by audio have been extracted, the editing unit may generate the data item for playback so as to display an image corresponding to the still image data item, and so as to play back the audio corresponding to the movie data item accompanied by audio. Furthermore, if a still image data item accompanied by audio and a movie data item have been extracted, the editing unit of the image processing device can generate the data item for playback so as to display an image corresponding to the movie data item, and so as to play back the audio corresponding to the still image data item accompanied by audio.

An image processing method according to the present invention comprises: reading a plurality of image data items that have been photographed and acquired by a plurality of cameras; extracting image data items of which dates and times of photography overlap within a same time band from among the plurality of image data items that have been read; and generating a data item for playback by editing the plurality of extracted image data items.

Effect of the Invention

According to the present invention, it is possible to generate a data item for playback by extracting image data items for which the date and time of photography are overlapped within the same time band.

BRIEF DESCRIPTION OF THE DRAWINGS

FIG. 3 is a figure for explanation of one example of a menu screen;

FIG. 5 is a time chart showing movie that is displayed in a combined display mode of a camera priority setting mode;

FIG. 6 is a time chart showing movie that is displayed in a display one only mode of the camera priority setting mode;

FIG. 7 is a time chart showing movie that is displayed in a combined display mode of a long time period priority mode;

FIG. 8 is a time chart showing movie that is displayed in a display one only mode of the long time period priority mode;

FIG. 9 is a time chart showing movie that is displayed in a scene start priority mode;

FIG. 10 is a time chart showing movie that is displayed in a fixed interval changeover mode;

FIG. 11 is a time chart showing movie that is displayed in a parallel display mode;

FIG. 12 is a time chart showing movie that is displayed in a camera priority setting mode of a small screen display mode;

FIG. 13 is a time chart showing movie that is displayed in a scene start priority mode of the small screen display mode;

FIG. 15 is a time chart showing movie and still images that are displayed in a combined display mode of a camera priority setting mode FIG. 16 is a time chart showing movie and still images that are displayed in a display one only mode of the camera priority setting mode;

FIG. 17 is a time chart showing movie and still images that are displayed in a combined display mode of a long time period priority mode;

FIG. 18 is a time chart showing movie and still images that are displayed in a display one only mode of the long time period priority mode;

FIG. 21 is a time chart showing movie and still images that are displayed in a parallel display mode;

FIG. 22 is a time chart showing movie and still images that are displayed in a camera priority setting mode of a small screen display mode;

FIG. 23 is a time chart showing movie and still images that are displayed in this camera priority setting mode of the small screen display mode;

FIG. 24 is a time chart showing movie and still images that are displayed in a scene start priority mode of the small screen display mode;

FIG. 25 is a timing chart showing movie and still images that are displayed in a movie before or after aggregated mode;

FIG. 26 is a timing chart showing a program and still images that are displayed in a program before or after aggregated mode;

FIG. 27 is a timing chart showing audio that is played back in a movie audio setting mode;

FIG. 34 is a time chart showing movie that is displayed in a display one only mode of the short time period priority mode;

FIG. 35 is a time chart showing movie that is displayed in a scene start priority mode of a variant embodiment.

BEST MODES FOR CARRYING OUT THE INVENTION

Figure 1:
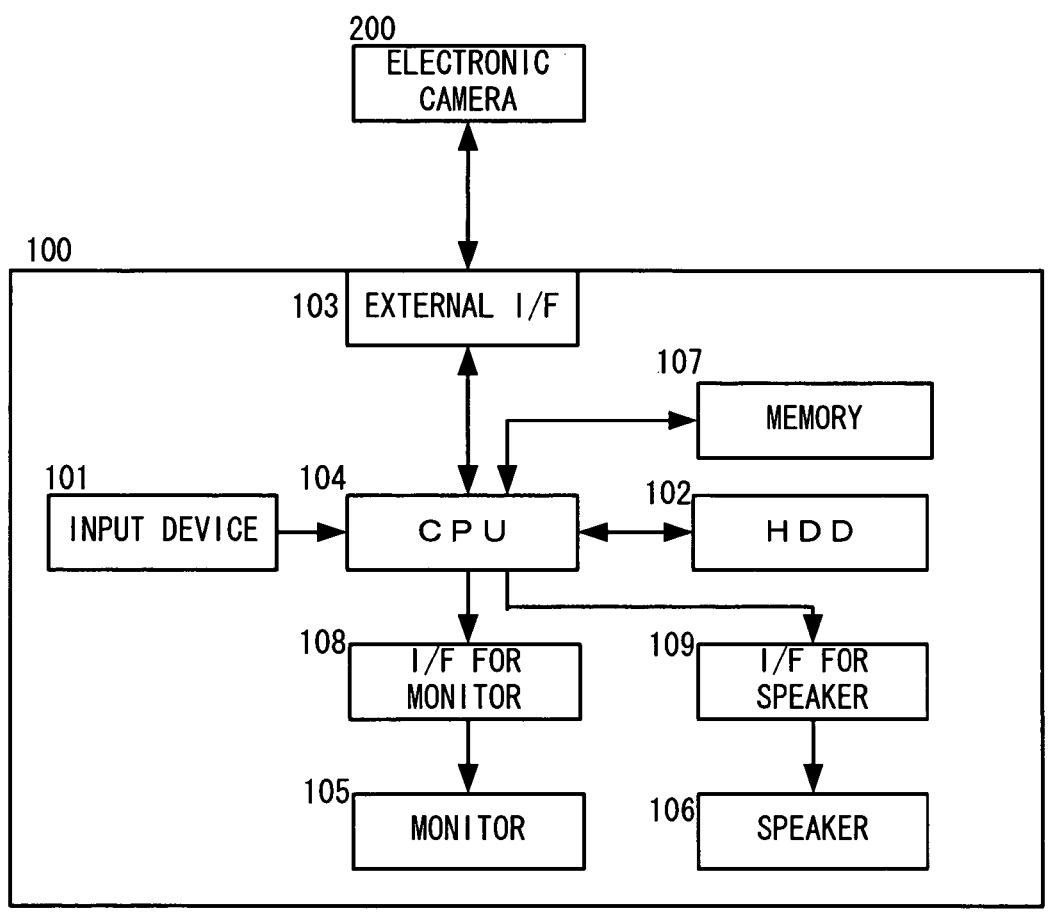
FIG. 1 is a block diagram for explanation of the structure of the principal portions of an image processing device according to an embodiment.

An embodiment of the present invention will now be described with reference to the drawings. FIG. 1 is a block diagram for explanation of the structure of the principal portions of an image processing device according to an embodiment. This image processing device 100 includes an input device 101, a HDD (hard disk drive) 102, an external interface 103, a CPU 104, a monitor 105, a speaker 106, a memory 107, a monitor interface 108, and a speaker interface 109.

The input device 101 is actuated by the user, and may include, for example, a keyboard and/or a mouse or the like. And, for example, image data items corresponding to movie and still images photographed by an electronic camera 200 and so on are stored upon the HDD 102. The external interface 103 is a USB interface for connecting, for example, an electronic camera 200 or the like to this image processing device 100. The image processing device 100 reads image files and so on from such an external device via the external interface 103. And the image files that have been read are stored upon the HDD 102 by the CPU 104.

Figure 2:
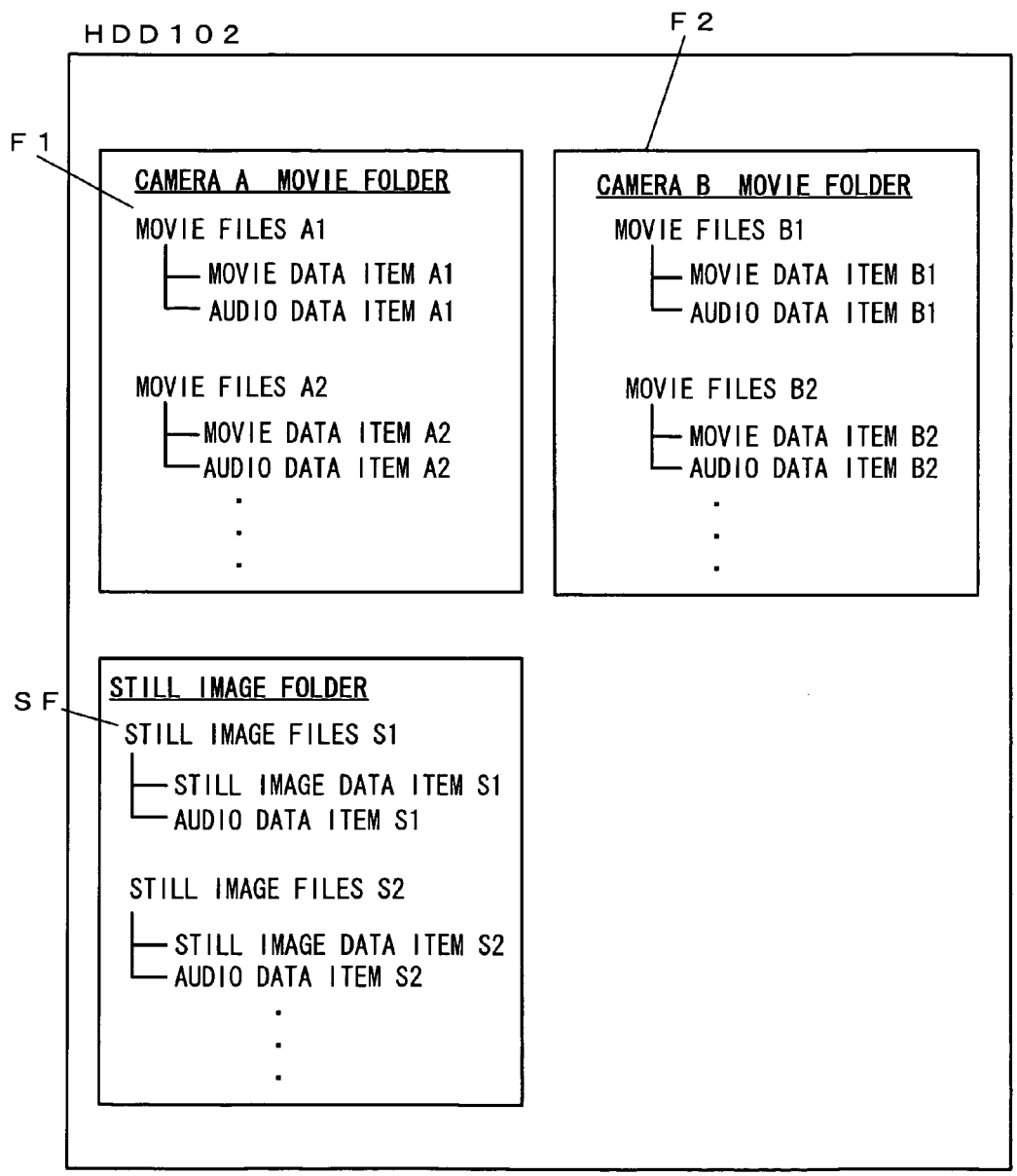
FIG. 2 is a figure showing a summary of an images folder, that is stored in this image processing device according to the embodiment.

Among the image files that have been input, movie data items and audio data items that is appended to those movie data items are stored in folders on the HDD 102 that are specific to each camera device. On the HDD 102 shown in FIG. 2, a movie folder F1 for a camera A and a movie folder F2 for a camera B have been created. Moreover, still image data items and audio data items that are appended to those still image data items are stored in a still image folder SF, irrespective of camera device.

The CPU 104 is a microcomputer that performs control of this image processing device. The CPU 104 executes an image editing program that is recorded in a ROM, and edits image data items stored upon the HDD 102 and generates a data item for playback. The memory 107 is a working memory for the CPU 104, and may, for example, consist of a SDRAM. The monitor 105 may be, for example, a liquid crystal monitor or a CRT monitor. Images corresponding to data items for playback and menu screens related to image editing and so on are displayed upon this monitor 105. Moreover, if an audio data item is set to correspond to an image data item, then audio is played back by the speaker 106 on the basis of this audio data item.

Next, the image editing processing will be explained. When the user actuates the input device 101 and starts the image editing program upon the CPU 104, this image editing processing starts. With the image processing device 100 according to this embodiment, it is possible to execute movie editing processing, still image editing processing, and audio editing processing. The CPU 104 combines these different types of editing processing in an appropriate combination, and thereby generates the data item for playback. Setting actuation for the above described various types of editing processing is performed via the screen of the monitor 105. For example, independent menu screens like the one shown in FIG. 3 may be displayed upon the monitor 105, and settings for the various types of editing processing may be performed thereon via the input device 101. The menu screen of FIG. 3 will be described hereinafter.

The image data items for image editing are selected by the user actuating the input device 101 upon an editing subject image selection screen that is not shown in the figures. The movie data items that the user wishes to designate as the subject of editing are read from the specific folder that has been established upon the HDD 102 for each camera. And the still image data items that the user wishes to designate as the subject of editing are read from the still image folder SF upon the HDD 102. These movie data items and still image data items are temporarily stored in the memory 107. The CPU 104 refers to the EXIF information of these image data items that are stored in the memory 107, reads out the dates and times of photography of the image data items, and extracts image data items for which the dates and times of photography are overlapped in the same time band. If only movie data items or only still image data items are selected, the editing subject consists only of movies or only of still images, and the playback data item after editing will be a movie playback data item. But if both movie data item and still image data item are selected, the playback data item will consist of movie and still images mixed together.

EXIF information is information appended to an image file, in which various types of information about the image is recorded according to the EXIF standard. This EXIF information includes a region in which the date and time of photography are recorded, a region in which photographic conditions of various types are recorded, an optional region that can be used by each vendor as desired, and so on. It should be understood that a movie data item consists of a plurality of frames of still image data item that have been shot at a certain predetermined frame rate. Accordingly, by taking the movie starting time point as a reference, time points partway through photography and the end time point of photography may be calculated from the number of still image frames and the frame rate. Moreover, it would also be acceptable to record the length of time taken for photography of the movie data item in the movie tag information.

When a plurality of image data items for which the dates and times of photography overlap in the same time band have been extracted, the CPU 104 generates a playback data item by editing the image data items according to movie editing processing, still image editing processing, and audio editing processing as will be described hereinafter. The CPU 104 generates a data item for playback for display upon the monitor 105, on the basis of the image data items that have been selected. And the image data items that were selected, in other words the data item for playback, is displayed by the CPU 104 as an image upon the monitor 105 via the monitor interface 108. Moreover, if an audio data item is appended to any selected image data item, then the CPU 104 plays back audio through the speaker 106 via the speaker interface 109.

In the following, the various types of editing processing will be explained in detail. First, the movie editing processing will be explained.

—Movie Editing Processing—

Figure 4:
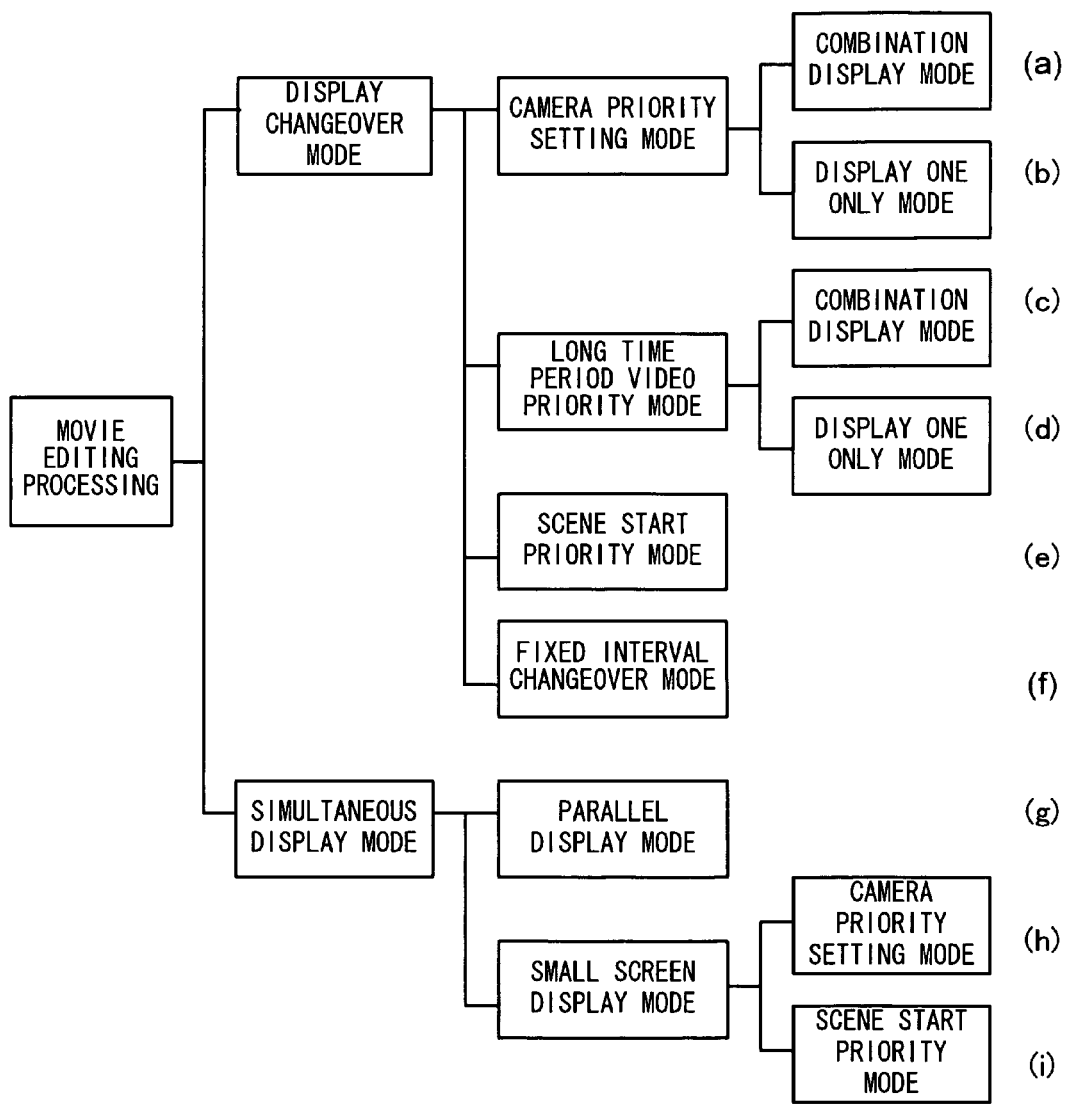
FIG. 4 is a figure for explanation of the relationship between various modes of movie editing processing.

As shown in FIGS. 3 and 4, the movie editing processing is broadly classified into the following two modes; either of these modes may be selected by actuation of the input device 101:

A: A display changeover mode
B: A simultaneous display mode

In the display changeover mode, the CPU 104 generates the data item for playback so as to display one image upon the monitor 105 as a single screen. And, in the simultaneous display mode, the CPU 104 generates the data item for playback so as to display two images upon the monitor 105 as a double screen. It should be understood that the various modes for the movie editing processing are shown in FIG. 4.

—A: The Display Changeover Mode—

This display changeover mode is further classified into the following four modes:

A1: a camera priority setting mode
A2: A long time period movie priority mode
A3: a scene start priority mode
A4: a fixed interval changeover mode The selection and setting of each of these modes is performed upon a menu screen that is displayed upon the monitor 105, as shown in FIG. 3, by actuating the input device 101. In this display changeover mode, editing is performed upon the image that is the subject of editing, according to the four modes described above.

A1: The Camera Priority Setting Mode of the Display Changeover Mode

The camera priority setting mode is a mode in which, if the dates and times of photography of items of movie data that have been photographed with a plurality of cameras are overlapped, the highest priority level movie data item is selected.

As shown in FIG. 4(a), this camera priority setting mode includes the following two modes:

A1-1: A combined display mode

A1-2: A display one only mode

A case in which a priority camera A and a non-priority camera B are set will be explained. It should be understood that, in the following, a case will be explained in which the CPU 104 performs editing processing upon the image data item that is the subject of editing while taking, as a reference, the information specifying the date and time of photography that is included in this image data item, in other words its time point of photography, and performs playback display of the playback image upon the monitor 105.

(A1-1: The Combined Display Mode)

In the combined display mode, if the dates and times of photography of items of movie data that have been photographed by the cameras A and B overlap in the same time band, the CPU 104 selects the movie data item of the priority camera A as the playback image data item. Furthermore, if the dates and times of photography of items of movie data that have been photographed by the cameras A and B do not overlap in the same time band, the CPU 104 selects that movie data item that is present by itself in that time band.

Although this matter will be described hereinafter, it should be understood that, in the display one only mode, the CPU 104 selects only the movie data item of the priority camera A as the playback image data item. Accordingly, movie data item from the non-priority camera B for which the time point of photography is overlapped in the same time band is not selected, even if it is present by itself. But movie data item from the non-priority camera B for which the time point of photography does not overlap in the same time band is selected as the playback image.

The setting of the priority camera is performed on a menu screen displayed on the monitor 105 by the user actuating the input device 101. When the camera priority setting display mode of FIG. 3(a) is selected, and a pull down menu for the first priority camera is actuated, the screen display changes to that shown in FIG. 3(b). The first priority camera may be set by selecting any one of 1 through 4 on the screen of FIG. 3(b). And, in a similar manner as well, when the pull down menu for the second priority camera is actuated, the screen display changes over to that shown in FIG. 3(b). And the second priority camera may be set by selecting any one of 1 through 4 on the screen of FIG. 3(b).

In this combined display mode, the CPU 104 selects between a plurality of items of movie data whose dates and times of photography are overlapped in the same time band, according to the priority level that has been set. The movie data item that is alternatively selected in some time band is the movie data item from the non-priority camera, and if photography of some movie data item whose priority level is higher is started before the end time point of that movie, the CPU 104 selects the movie data item whose priority level is the highest after that start time point. The combined display mode in the camera priority setting mode will now be explained with reference to FIG. 5. It should be understood that, in FIG. 5, the horizontal axis is the time axis, the movie data item A is a movie data item that has been photographed by an electronic camera 200A, the movie data item B is a movie data item that has been photographed by an electronic camera 200B, and the movie data item C is a movie data item that has been photographed by an electronic camera 200C.

(An Example of the Combined Display Mode)

FIG. 5(a) shows a case in which no other movie data item overlapping the movie data item A in the same time band exists. In this case, the movie data item A is selected as the playback image data item by the CPU 104, and the movie A that corresponds to this movie data item A is displayed upon the monitor 105.

FIGS. 5(b) through 5(d) are figures for explanation of the playback image selection processing when the electronic camera 200A has been selected as the priority camera, in other words when the movie data item A is the priority data item.

In the example shown in FIG. 5(b), the movie data item A is an image data item that was photographed between the time points t2 and t3, and the movie data item B is an image data item that was photographed between the time points t1 and t4. It should be understood that, in the movie data item B, the movie data item that corresponds to the interval between the time points t1 and t2 is termed Ba, the movie data item that corresponds to the interval between the time points t2 and t3 is termed Bb, and the movie data item that corresponds to the interval between the time points t3 and t4 is termed Bc. In other words, in the example of FIG. 5(b), the movie data items A and Bb are overlapped during the interval between the time points t2 and t3.

At the photographic time point t1 the movie data item Ba is selected by the CPU 104, and the movie data item Ba is displayed upon the monitor 105 until the time point t2 that photography of the movie data item A starts. The time point t2 is the start time point of photography of the movie data item A, and, after this time point t2, the movie data item A that has higher priority than the movie data item B is selected by the CPU 104, so that the movie A is displayed upon the monitor 105 until the time point t3 that the photography of this movie data item A ends. When the movie data item A ends at the time point t3, in the interval between the time points t3 and t4, the movie data item Bc is selected by the CPU 104, and thus the movie Bc is displayed upon the monitor 105. In other words, the CPU 104 selects the movie data item A when the time point arrives of the start of photography of the movie data item A of which priority level is higher when the movie data item B was selected. Accordingly the movie A is displayed upon the monitor 105, inserted into the movie B that was being displayed corresponding to the movie data item B.

In FIG. 5(c), the movie data item A is an image data item that was photographed between the time points t1 and t4, and the movie data item B is an image data item that was photographed between the time points t2 and t3. It should be understood that, in the movie data item A, the movie data item that corresponds to the interval between the time points t1 and t2 is termed Aa, the movie data item that corresponds to the interval between the time points t2 and t3 is termed Ab, and the movie data item that corresponds to the interval between the time points t3 and t4 is termed Ac. In other words, in the example of FIG. 5(c), the movie data items Ab and B are overlapped during the interval between the time points t2 and t3.

Since the movie data item A has priority over the movie data item B, even though the movie Ab and the movie B overlap between the time points t2 and t3, the movie data item A is still selected by the CPU 104, and the movie A is displayed upon the monitor 105 during the interval between the photographic time points t1 and t4.

In FIG. 5(d), the movie data item A is an image data item that was photographed between the time points t1 and t3, and the movie data item B is image data item that was photographed between the time points t2 and t4. It should be understood that, in the movie data item A, the movie data item that corresponds to the interval between the time points t1 and t2 is termed Aa, and the movie data item that corresponds to the interval between the time points t2 and t3 is termed Ab.

Moreover, in the movie data item B, the movie data item that corresponds to the interval between the time points t2 and t3 is termed Ba, and the movie data item that corresponds to the interval between the time points t3 and t4 is termed Bb. In other words, in the example of FIG. 5(d), the movie data items Ab and Ba are overlapped during the interval between the time points t2 and t3.

The movie data item A has priority over the movie data item B. Thus, even though the movie Ab and the movie Ba are overlapped between the time points t2 and t3, the movie data item A is still selected by the CPU 104 between the photographic time points t1 and t3. Since the movie data item A does not exist after the time point t3, therefore the movie data item Bb is selected by the CPU 104 until the time point t4. Accordingly the movie A that corresponds to the movie data item A whose priority level is higher is displayed upon the monitor 105 between the time points t1 and t3, while the movie Bb that corresponds to the movie data item Bb is displayed between the time points t3 and t4. In other words, the movie B is displayed from partway through the photographic time period.

FIGS. 5(e) and 5(f) show a case in which three movie data items A through C that have been photographed with three cameras A through C are the subjects of editing, and the movie data item A has the first priority, while the movie data item B has the second priority. Thus the movie data item A has priority over the movie data item B, and the movie data item B has priority over the movie data item C.

In FIG. 5(e), the movie data item A that has the first priority A is an image data item that was photographed between the time points t3 and t4, the movie data item B is an image data item that was photographed between the time points t1 and t5, and the movie data item C is an image data item that was photographed between the time points t2 and t6. In other words, the movie data items B and C are overlapped during the interval between the time points t2 and t5, and the movie data items A, B, and C are overlapped during the interval from the time point t3 to the time point t4.

It should be understood that, in the movie data item B, the movie data item that corresponds to the interval between the time points t1 and t3 is termed Ba, the movie data item that corresponds to the interval between the time points t3 and t4 is termed Bb, and the movie data item that corresponds to the interval between the time points t4 and t5 is termed Bc.

Moreover, in the movie data item C, the movie data item that corresponds to the interval between the time points t2 and t3 is termed Ca, the movie data item that corresponds to the interval between the time points t3 and t4 is termed Cb, the movie data item that corresponds to the interval between the time points t4 and t5 is termed Cc, and the movie data item that corresponds to the interval between the time points t5 and t6 is termed Cd.

At the time point t1, the movie data item B is selected by the CPU 104. Since the priority level of the movie data item B is higher than that of the movie data item C, the movie data item B continues to be selected by the CPU 104 at the time point t2, even though this is the starting time point of photography of the movie data item C. And, at the starting time point t3 of photography of the movie data item A whose priority level is higher than that of the movie data item B, the movie data item A is selected by the CPU 104 instead of the movie data item B. At the time point t4 that photography of the movie data item A ends, the movie data item Bc that has second priority over the movie data item C is selected by the CPU 104. And at the time point t5 that the photography of the movie data item B ends, the movie data item Cd is selected by the CPU 104, since neither of the data items A and B that have higher priority levels is present. Subsequently, until the time point t6 at which the photography of the movie data item C ends, the movie data item C is selected by the CPU 104, so that the movie Cd that corresponds to this movie data item Cd is displayed upon the monitor 105.

In FIG. 5(f), the movie data item A that has the first priority A is an image data item that was photographed between the time points t3 and t4, the movie data item B is an image data item that was photographed between the time points t1 and t6, and the movie data item C is an image data item that was photographed between the time points t2 and t5. In other words, the movie data items B and C are overlapped during the interval between the time points t2 and t5, and the movie data items A, B, and C are overlapped during the interval from the time point t3 to the time point t4.

It should be understood that, in the movie data item B, the movie data item that corresponds to the interval between the time points t1 and t3 is termed Ba, the movie data item that corresponds to the interval between the time points t3 and t4 is termed Bb, and the movie data item that corresponds to the interval between the time points t4 and t6 is termed Bc.

Moreover, in the movie data item C, the movie data item that corresponds to the interval between the time points t2 and t3 is termed Ca, the movie data item that corresponds to the interval between the time points t3 and t4 is termed Cb, and the movie data item that corresponds to the interval between the time points t4 and t5 is termed Cc.

At the time point t1 the movie data item B is selected by the CPU 104. The movie data item B is set to have a higher priority level than the movie data item C. Thus at the time point t2, even though this is the starting time point of photography of the movie data item C, the movie data item B still continues to be selected by the CPU 104. At the time point t3 of starting of the photography of the movie data item A whose priority level is higher than that of the movie data item B, the movie data item A is selected by the CPU 104. And, at the time point t4 that the photography of the movie data item A ends, the movie data item Bc that is second priority is selected by the CPU 104; and, although in the interval between the time points t4 and t5, the movie data item C whose priority level is lower overlaps it, the movie data item Bc continues to be selected by the CPU 104. And, subsequently, until the time point t6 that the photography of the movie data item B ends, the movie data item Bc continues to be selected by the CPU 104.

(A1-2: The Display One Only Mode)

Next, the display one only mode shown in FIG. 4(b) will be explained. In this display one only mode, if a plurality of items of movie data whose dates and times of photography are overlapped within the same time band, the CPU 104 does not select any movie data item that has not been selected as a priority data item. In other words, only that movie among the plurality of movies whose priority level is the highest is displayed upon the monitor 105; and this is different from the case with the combined display mode. The display one only mode in the camera priority setting mode will now be explained with reference to FIG. 6.

(An Example of the Display One Only Mode)

FIG. 6(a) shows a case in which, similarly to FIG. 5(a), no other movie data item exists that overlaps the movie data item A in the same time band. In this case, the movie data item A is selected by the CPU 104, and the movie A that corresponds to the movie data item A is playback displayed upon the monitor 105.

In the example shown in FIG. 6(b), similarly to the case of FIG. 5(b), the movie data item A, that is the priority data item, is an image data item that was photographed between the time points t2 and t3, while the movie data item B that is a non-priority data item, is an image data item that was photographed between the time points t1 and t4. In this case, at the time point t1 that is the starting time point of photography of the movie data item B whose priority level is low, the movie data item B is not selected by the CPU 104, and the image B is not displayed upon the monitor 105. When the time reaches the time point t2 that is the starting time point of photography of the movie data item A that is the priority data item, the movie data item A is selected by the CPU 104. And, when the time reaches the time point t3 that is the end time point of photography of the movie data item A, the selection of the movie data item A by the CPU 104 terminates. In other words, the display of the movie A upon the monitor 105 terminates. Although the movie data item B is present subsequent to the time point t3 as well, since its priority level is low, the movie data item Bc is not selected by the CPU 104. Accordingly, only the movie A whose priority level is high is displayed by the CPU 104 upon the monitor 105 during the interval between the time points t2 and t3.

In the example shown in FIG. 6(c), similarly to the case of FIG. 5(d), the movie data item A is a data item that was photographed between the time points t1 and t3, while the movie data item B is an image data item that was photographed between the time points t2 and t4. In this case, at the time point t1 that is the starting time point of photography of the movie data item A that is the priority data item, the movie data item A is selected by the CPU 104. And, when the time reaches the time point t2, although this is the starting time point of photography of the movie data item B, the selection of the movie data item Ab whose priority level is higher is continued by the CPU 104. And when the time reaches the time point t3 that is the ending time point of photography of the movie data item A, the selection of the movie data item A by the CPU 104 ends. In other words, the display of the movie A upon the monitor 105 ends. At this time, although the time period of photography of the movie data item B continues, the movie data item Bb is not selected by the CPU 104, since its priority level is low. Accordingly, in a similar manner to the case of FIG. 6(b), only the movie A whose priority level is high is displayed upon the monitor 105.

FIG. 6(d) shows a case in which the photographic time period for the movie data item A that is selected as priority data item is the interval between the time points t1 and t2, while the photographic time period for the movie data item B is the interval between the time points t3 and t4, so that the movie data items A and B do not overlap one another. The movie data item A that is present between the time points t1 and t2, and the movie data item B that is present between the time points t3 and t4, are selected by the CPU 104. In this case, the image of the movie data item A and the image of the movie data item B are displayed in succession upon the monitor 105. In other words, even though this is the case in which the display one only mode has been set, if it is not the case that a plurality of items of movie data overlap one another at the same moment, the movies that correspond to these items of movie data are playback displayed as successive image segments.

In the example shown in FIG. 6(e), similarly to the case of FIG. 5(e), the movie data item A that has the first priority is a data item that was photographed between the time points t3 and t4, the movie data item B that has the second priority is an image data item that was photographed between the time points t1 and t5, and the movie data item C that is anon-priority data item is an image data item that was photographed between the time points t2 and t6. Even when the time reaches the time point t1 that is the starting time point of photography of the movie data item B whose priority level is lower than that of the movie data item A that is the first priority data item, or the time point t2 that is the starting time point of photography of the non-priority movie data item C, these movie data items are not selected by the CPU 104. During the interval between the time points t3 and t4, the first priority movie data item A is selected. And between the time points t4 and t5, an overlap is present between the movie data item B that is the second priority and the non-priority movie data item C, while between the time points t5 and t6, only the non-priority image data item C is present. However, since the image data items B and C are image data items that overlap the image data item A that has the first priority, neither of these image data items is selected by the CPU 104. In other words, in the example of FIG. 6(e), between the time points t3 and t4, only the movie A is selected by the CPU 104 and is displayed.

FIG. 6(f) shows a case in which the photographic time period for the movie data item A, that has been selected as the first priority data item, is during the interval between the time points t1 and t2, the photographic time period for the movie data item B, that has been selected as the second priority data item, is during the interval between the time points t4 and t6, and the photographic time period for the non-priority movie data item C is during the interval between the time points t3 and t5. In this case, the movie data item A is selected between the time points t1 and t2. While only the non-priority image data item C exists between the time points t3 and t4, since the image data item C overlaps with the image data item B that is of the second priority between the time points t4 and t5, it is not selected by the CPU 104. During the interval between the time points t5 and t6, only the movie data item B exists. The movie data item B has priority over the movie data item C, and the movie data item B and the movie data item A do not overlap one another in any time band. Accordingly, the movie data item B that is present between the time points t4 and t6 is selected by the CPU 104. After the time point t1, the movies A and B are playback displayed by the CPU 104 as sequential movie images.

FIG. 6(g) shows a case in which the photographic time period for the movie data item A, that has been selected as the first priority data item, is between the time points t1 and t2, the photographic time period for the movie data item B, that has been selected as the second priority data item, is between the time points t5 and t6, and the photographic time period for the movie data item C is between the time points t3 and t4; in other words, there are not of these three items of movie data that overlap one another within the same time band. In this case, the movie data item A is selected by the CPU 104 between the time points t1 and t2; the movie data item C is selected between the time points t3 and t4; and the movie data item B is selected between the time points t5 and t6. In other words, even in this case in which the display one only mode is set, if there is no overlapping plurality of items of movie data whose dates and times of photography are in the same time band, each of these items of movie data is selected by the CPU 104, irrespective of the priority data item settings.

A2: The Long Time Period Movie Priority Mode of the Display Changeover Mode

The long time period movie priority mode is a mode in which, if a plurality of items of movie data whose dates and times of photography are in the same time band overlap one another, the movie data item whose playback time period is the longer is selected as a priority. As shown in FIG. 4(c), this long time period movie priority mode further includes two modes, that are selected and set via the input device 101.

A2-1: A combined display mode
A2-2: A display one only mode (A2-1: A Combined Display Mode)

The combined display mode of the long time period movie priority mode will now be explained with reference to FIG. 7. When the starting time point of photography arrives of that movie data item, from among a plurality of movie data items that overlap in the same time band, whose time period of photography is the longest, the CPU 104 changes over the selection to that movie data item. The calculation of the length of time of photography may, for example, be performed by multiplying together the number of still image data frames that make up that movie data item, and the frame rate of these still images. If the ending time point of photography is recorded, this calculation may be performed by subtracting the starting time point of photography from the ending time point of photography. In the following, the explanation will presume that information giving the length of time of photography is recorded. It should be understood that the playback time period for the image data item after editing is equal to the time period of photography of the image data item.

(An Example of the Combined Display Mode)

In FIG. 7(a), similarly to the cases of FIGS. 5(a) and 6(a), a case is shown in which no movie data item other than the movie data item A exists that overlaps with it in the same time band. In this case, the movie data item A is selected by the CPU 104, and the movie A that corresponds to this movie data item A is playback displayed upon the monitor 105.

In the example shown in FIG. 7(b), similarly to the cases of FIGS. 5(b) and 6(b), the movie data item A is an image data item that was photographed between the time points t2 and t3, while the movie data item B is an image data item that was photographed between the time points t1 and t4. At the time point t1, the movie data item B is selected by the CPU 104. And, at the time point t2, the starting time point of photography of the movie data item A arrives. The CPU 104 compares together the lengths of time of photography in the tag information of the movie data items A and B. Since the result of this comparison is that the photographic time period of the movie data item B is the longer, accordingly the selection of the movie data item B is prioritized by the CPU 104. Subsequently, the selection of the movie data item B by the CPU 104 is continuously maintained until the time point t4. Accordingly, the movie data item A is not selected by the CPU 104.

In the example shown in FIG. 7(c), similarly to the cases of FIGS. 5(d) and 6(c), the movie data item A is an image data item that was photographed between the time points t1 and t3, while the movie data item B is an image data item that was photographed between the time points t2 and t4. At the time point t1, the movie data item A is selected by the CPU 104. And the movie data items A and B overlap between the time points t2 and t3. The CPU 104 compares together the time periods of photography of the movie data items A and B, as described above, and, since the photographic time period of the movie data item A is the longer, the movie data item A is selected as a priority by the CPU 104. Between the time points t3 and t4 only the image data item B exists, so the CPU 104 determines that the movie data item B is the movie data item that has the longest time period of photography, and selects the movie data item B. Thus the movie A that corresponds to the movie data item A is displayed during the interval between the time points t1 and t3, while the movie Bb that corresponds to the movie data item Bb is displayed during the interval between the time points t3 and t4.

In the example shown in FIG. 7(d), there are shown two different movie data items A1 and A2 that have been photographed with the electronic camera 200A, and a movie data item B that has been photographed with the electronic camera 200B. The photographic time period of the movie data item A1 is the interval between the time points t1 and t3, while the photographic time period of the movie data item B is the interval between the time points t2 and t5 and the photographic time period of the movie data item A2 is the interval between the time points t4 and t6. Thus, the movie data item A1 and the movie data item B overlap one another between the time points t2 and t3, and the movie data item A2 and the movie data item B overlap one another between the time points t4 and t5.

In this example shown in FIG. 7(d), at the time point t1, the movie data item A1 is selected by the CPU 104. When the time point t2 arrives that is the starting time point of photography of the movie data item B, the CPU 104 compares together the photographic time periods of the movie data item A1 and the movie data item B. The result of this comparison is that the movie data item B that has the longer photographic time period is selected by the CPU 104. And, when the time point t4 that is the starting time point of photography of the movie data item A2 arrives, the CPU 104 compares together the photographic time periods of the movie data item A2 and the movie data item B. The result of this comparison is that the movie data item A2, that has a longer photographic time period than the movie data item B, is selected by the CPU 104. And, subsequently, since no movie data item exists whose photographic time period is longer than that of the movie data item A2, the selection of the movie data item A2 by the CPU 104 is continued until the time point t6. In other words, if at some time point a plurality of items of movie data overlap one another, that movie data item whose time period of photography is the longest is selected by the CPU 104 as a priority.

FIG. 7(e) shows a case in which the time period of photography of the movie data item A is between the time points t3 and t4, the time period of photography of the movie data item B is between the time points t1 and t5, and the time period of photography of the movie data item C is between the time points t2 and t6, so that the photographic time period of the movie data item C is the longest among these three items of movie data. The movie data item B and the movie data item C are overlapped between the time points t2 and t5, while the movie data item A, the movie data item B, and the movie data item C are all overlapped between the time points t3 and t4.

In this example shown in FIG. 7(e), the movie data item B is selected by the CPU 104 at the time point t1. At the time point t2 that is the starting time point of photography of the movie data item C, the movie data item C whose photographic time period is the longest is selected by the CPU 104. Subsequently, since no movie data item exists whose time period of photography is longer than that of the movie data item C, the selection of the movie data item C by the CP 104 is continued until the time point t6.

FIG. 7(f) shows an example like FIG. 5(f). In FIG. 7(f), the movie data item A is an image data item that has been photographed between the time point t3 and the time point t4, while the movie data item B is an image data item that has been photographed between the time point t1 and the time point t6, and the movie data item C is an image data item that has been photographed between the time point t2 and the time point t5. In other words, the movie data items B and C are overlapped during the interval between the time points t2 and t5, while the movie data items A, B, and C are all overlapped during the interval between the time points t3 and t4. At the time point t1, no movie data item exists whose time period of photography is longer than that of the movie data item B, that is selected by the CPU 104. Accordingly, during the entire interval between the time points t1 and t6, the selection of the movie data item B by the CPU 104 is continued. Thus the movie data items A and C are not selected by the CPU 104.

(A2-2: The Display One Only Mode)

The case in which the display one only mode is set in the long time period movie priority mode will now be explained with reference to FIG. 8. In this case, if a plurality of items of movie data overlap in the same time band, the CPU 104 selects only that movie data item whose time period of photography is the longest, and no other movie data items are playback displayed.

FIG. 8(a), similarly to the cases of FIGS. 5(a) through 7(a), shows a case in which no movie data item other than the movie data item A exists that overlaps the movie data item A in the same time band. In this case, the movie data item A is selected by the CPU 104, and the movie A that corresponds to this movie data item A is playback displayed upon the monitor 105.

In the example shown in FIG. 8(b), similarly to the cases of FIGS. 5(b) through 7(b), the movie data item A is an image data item that was photographed between the time points t2 and t3, and the movie data item B is an image data item that was photographed between the time points t1 and t4. The CPU 104 compares together the photographic time periods of the movie data items A and B that overlap one another in the same time band. As a result of this comparison the movie data item B, whose photographic time period is the longer, is selected by the CPU 104. In other words, the movie data item B is selected by the CPU 104 at the time point t1. Subsequently, this selection of the movie data item B by the CPU 104 is continued until the time point t4. In other words, the movie data item A is not selected by the CPU 104.

In the example shown in FIG. 8(c), similarly to the cases of FIGS. 5(d), 6(c), and 7(c), the movie data item A is an image data item that was photographed between the time points t1 and t3, and the movie data item B is an image data item that was photographed between the time points t2 and t4. The CPU 104 compares together the photographic time periods of the movie data items A and B that overlap one another in the same time band. As a result of this comparison the movie data item A, whose photographic time period is the longest, is selected by the CPU 104. In other words, the movie data item A is selected by the CPU 104 at the time point t1. Subsequently, this selection of the movie data item A by the CPU 104 is continued until the time point t3. FIG. 8(c) is an example in which the display one only mode is set, and at the time point t3 the movie data item B is not selected by the CPU 104; and this is different from the case of the combination mode of FIG. 7(c). In other words, the movie data item B is not selected by the CPU 104.

In the example shown in FIG. 8(d), similarly to the case of FIG. 7(d), there are shown two different items of movie data A1 and A2 that have been photographed by the electronic camera 200A, and a movie data item B that has been photographed by the electronic camera 200B. The photographic time period for the movie data item A1 is the interval between the time points t1 and t3, the photographic time period for the movie data item B is the interval between the time points t2 and t5, and the photographic time period for the movie data item A1 is the interval between the time points t4 and t6. The movie data item A1 and the movie data item B are overlapped between the time points t2 and t3, while the movie data item A2 and the movie data item B are overlapped between the time points t4 and t5.

The CPU 104 compares together the photographic time periods of the movie data items A1, A2, and B that are overlapped in the same time band. The result of this comparison is that the movie data item A2 whose photographic time period is the longest is selected by the CPU 104. Accordingly, the movie data items A1 and B are not selected by the CPU 104, even though the starting time point of photography of the movie data item A1 is the time point t1, and the starting time point of photography of the movie data item B is the time point t2. When the time reaches the time point t4 that is the starting time point of photography of the movie data item A2, the movie data item A2 is selected by the CPU 104. Subsequently, the selection of the movie data item A2 by the CPU 104 is continued until the time point t6. In other words, selection of the items of movie data A2 and B whose photographic time periods are shorter is not performed by the CPU 104.

In the example shown in FIG. 8(e), similarly to the case of FIG. 7(e), a case is shown in which the movie data item A is an image data item that was photographed between the time points t3 and t4, the movie data item B is an image data item that was photographed between the time points t1 and t5, and the movie data item C is an image data item that was photographed between the time points t2 and t6; so that the photographic time period of the movie data item C is the longest among these three items of movie data. The movie data item B and the movie data item C overlap between the time points t2 and t5, while the movie data item A, the movie data item B, and the movie data item C overlap between the time points t3 and t4.

In this example shown in FIG. 8(e), the CPU 104 compares together the movie data items A, B, and C that overlap one another in the same time band. The result of this comparison is that the movie data item C, whose photographic time period is the longest, is selected by the CPU 104. Accordingly, when the time reaches the time point t1 that is the starting time point of photography of the movie data item B, the movie data item B is not selected by the CPU 104, and moreover, when the time reaches the time point t3 that is the starting time point of photography of the movie data item A, the movie data item A is not selected by the CPU 104. But, when the time reaches the time point t2 that is the starting time point of photography of the movie data item C, the movie data item C is selected by the CPU 104. Subsequently, this selection of the movie data item C by the CPU 104 is continued until the time point t6. Accordingly, selection of the items of movie data A and B whose photographic time periods are shorter is not performed by the CPU 104.

The example shown in FIG. 8(f) shows a case in which the relationship between the movie data items A, B, and C is similar to that of FIGS. 5(f) and 7(f). In other words, the movie data item A is an image data item that was photographed between the time points t3 and t4, the movie data item B is an image data item that was photographed between the time points t1 and t6, and the movie data item C is an image data item that was photographed between the time points t2 and t5. The movie data items B and C overlap one another during the interval between the time point t2 and the time point t5, and the movie data items A, B, and C overlap one another during the interval between the time points t3 and t4.

The CPU 104 compares together the photographic time periods of the movie data items A, B, and C that overlap one another in the same time band. The result of this comparison is that the movie data item B, whose photographic time period is the longest, is selected by the CPU 104. Subsequently, this selection of the movie data item B by the CPU 104 is continued until the time point t6. Accordingly the items A and C of movie data, whose photographic time periods are the shorter, are not selected by the CPU 104.

A3: The Scene Start Priority Mode of the Display Changeover Mode

The scene start priority mode will now be explained with reference to FIG. 9. In this mode, with a plurality of movie data items that overlap in the same time band, the CPU 104 selects as a priority that image data item whose starting time point of photography is the most recent. In other words, when a movie is being displayed upon the monitor 105, and when the time reaches the starting time point of photography of some other movie that overlaps this one in this time band, the CPU 104 selects that other movie. Thus, the display of the movie upon the monitor 105 changes over to the movie whose starting time point of photography is the latest one.

FIG. 9(a), similarly to the cases of FIGS. 5(a) through 8(a), shows a case in which, apart from the movie data item A, no other movie data item exists that overlaps it in the same time band. In this case, the movie data item A is selected by the CPU 104, and the movie A that corresponds to this movie data item A is playback displayed upon the monitor 105.

In the example shown in FIG. 9(b), similarly to the cases of FIGS. 5(b) through 8(b), the movie data item A is an image data item that was photographed between the time points t2 and t3, and the movie data item B is an image data item that was photographed between the time points t1 and t4. At the time point t1, the movie data item B is selected by the CPU 104. And, at the time point t2, since the time has reached the starting time point of photography of the movie data item A, the movie data item A is selected by the CPU 104. When the time reaches the time point t3 that is the ending time point of photography of the movie data item A, then the selection of the movie data item A by the CPU 104 terminates. Subsequently to this time point t3, there is no movie data item whose playback is started. In other words, the movie data item Bc is not selected by the CPU 104.

In the example shown in FIG. 9(c), similarly to the cases of FIGS. 5(d) and 6(c) through 8(c), the movie data item A is an image data item that was photographed between the time points t1 and t3, and the movie data item B is an image data item that was photographed between the time points t2 and t4. At the time point t1, the movie data item A is selected by the CPU 104. And, at the time point t2, since the starting time point of photography of the movie data item B has arrived, the movie data item B is selected by the CPU 104. And when, at the time point t4, the ending time point of photography of the movie data item B has arrived, then the selection of the movie data item B by the CPU 104 terminates.

In FIG. 9(d), similarly to the case of FIG. 6(d), a case is shown in which the movie data item A is an image data item that was photographed between the time points t1 and t2, and the movie data item B is an image data item that was photographed between the time points t3 and t4, so that the movie data items A and B do not overlap one another. The movie data item A that is present between the time point t1 and the time point t2, and the movie data item B that is present between the time point t3 and the time point t4, are selected by the CPU 104. In this case, the movie A that corresponds to the movie data item A and the movie B that corresponds to the movie data item B are displayed successively upon the monitor 105. In other words, if there are not a plurality of items of movie data that are mutually overlapped at the same moment, the movies that correspond to these items of movie image data item are edited and playback displayed as successive images.

In FIG. 9(e), similarly to the cases of FIGS. 7(e) and 8(e), there are shown a movie data item A whose photographic time period is between the time points t3 and t4, a movie data item B whose photographic time period is between the time points t1 and t5, and a movie data item C whose photographic time period is between the time points t2 and t6. The movie data item B and the movie data item C are overlapped between the time points t2 and t5, and the movie data item A, the movie data item B, and the movie data item C are overlapped between the time points t3 and t4.

At the time point t1, the movie data item B is selected by the CPU 104. When the time point t2 that is the starting time point of photography of the movie data item C arrives, the movie data item C is selected by the CPU 104. And, when the time reaches the time point t3 that is the starting time point of photography of the movie data item A, the movie data item A is selected by the CPU 104. When the time point t4 that is the ending time point of photography of the movie data item A arrives, the selection of the movie data item A by the CPU 140 is terminated. Since no movie data item that has a newer starting time point of photography is present after the time point t4, no selection of any movie data item by the CPU 104 is performed.

In the example shown in FIG. 9(f), similarly to the cases of FIGS. 5(f) through 8(f), the movie data item A is an image data item that was photographed between the time points t3 and t4, the movie data item B is an image data item that was photographed between the time points t1 and t6, and the movie data item C is an image data item that was photographed between the time points t2 and t5. In other words, the movie data item B and the movie data item C are overlapped between the time point t2 and the time point t5, and the movie data items A, B, and C are overlapped between the time point t3 and the time point t4.

At the time point t1, the movie data item B is selected by the CPU 104. When the time reaches the time point t2 that is the starting time point of photography of the movie data item C, the movie data item C is selected by the CPU 104. And, when the time point t3 arrives that is the starting time point of photography of the movie data item A, the movie data item A is selected by the CPU 104. When the time reaches the ending time point of photography of the movie data item A at the time point t4, the selection of the movie data item A by the CPU 104 is terminated. And, since subsequently to the time point t4 no movie data item is present that has a more recent starting time point of photography, selection of movie data item by the CPU 104 is not performed.

In FIG. 9(g), there are shown a movie data item A having a photographic time period between the time points t1 and t2, a movie data item B having a photographic time period between the time points t4 and t6, and a movie data item C having a photographic time period between the time points t3 and t5. In this case, although the movie data items B and C overlap one another in the interval between the time point t4 and the time point t5, the movie data item A does not overlap any other image data item. Thus, between the time points t1 and t2, the movie data item A is selected by the CPU 104. Moreover, since no movie data item exists between the time point t2 and the time point t3, no selection of movie data item is performed by the CPU 104. When the time reaches the time point t3 that is the starting time point of photography of the movie data item C, the movie data item C is selected by the CPU 104. And, when the time reaches the time point t4 that is the starting time point of photography of the movie data item B, the movie data item B is selected by the CPU 104. When the time reaches the ending time point of photography of the movie data item B at the time point t6, the selection of the movie data item B by the CPU 104 is terminated.

The image data items A through C that are selected as described above are edited so that the movie C is displayed by the CPU 104 following on from the movie A, and the movie B is displayed following on from the movie C.

A4: The Fixed Interval Changeover Mode

The fixed interval changeover mode will now be explained with reference to FIG. 10. If a plurality of items of movie data are overlapped in the same time band, in the time period of overlap, the CPU 104 changes over the movie data item that is selected each time a changeover time period tm elapses. This changeover time period tm is set from a menu screen by the user actuating the input device 101. The sequence for the display of the movies that correspond to the movie data item to change over is determined on the basis of the starting time points of photography of the respective movie data items. It should be understood that, if the time period over which some movie data item was photographed within the overlapping time period is less than the changeover time period tm, the CPU 104 does not select that movie data item.

FIG. 10(*a*), similarly to the cases of FIGS. 5(*a*) through 9(*a*), shows a case in which, apart from the movie data item A, no other movie data item exists that overlaps it in the same time band. In this case, the movie data item A is selected by the CPU 104, and the movie A that corresponds to this movie data item A is playback displayed upon the monitor 105.

In the example shown in FIG. 10(*b*), similarly to the cases of FIGS. 5(*b*) through 9(*b*), the movie data item A is an image data item that was photographed between the time points t2 and t3, and the movie data item B is an image data item that was photographed between the time points t1 and t4. At the time point t1, the movie data item Ba is selected by the CPU 104. At the time point t2 that is the starting time point of photography of the movie data item A, the movie data item Aa is selected by the CPU 104. And, at the time point t2*a* when the changeover time period tm has elapsed from the time point t2, the movie data item Bc is selected by the CPU 104, instead of the movie data item Aa. Then at the time point t3*a* when the changeover time period tm has elapsed from the time point t2*a*, the CPU 104 compares together the remaining time period of the movie data item Ac (t3−t3*a*) and the changeover time period tm. Since the result of this comparison is that the remaining time period is less than the changeover time period tm, the selection of the movie data item B by the CPU 104 is continued. And, at the time point t4 that is the ending time point of photography of the movie data item B, the selection of the movie data item B by the CPU 104 is terminated.

In the example shown in FIG. 10(*c*), similarly to the cases of FIGS. 5(*b*) through 9(*b*), the movie data item A is an image data item that was photographed between the time points t2 and t3, and the movie data item B is an image data item that was photographed between the time points t1 and t4. Between the time point t1 and the time point t3*a*, in a similar manner to the case shown in FIG. 10(*b*), the movie data items Ba, Aa, and Bc are selected by the CPU 104 in that sequence. Then, at the time point t3*a*, as described above, the CPU 104 compares together the remaining time period (t3−t3*a*) of the movie data item Ac and the changeover time period tm. Since the result of this comparison is that the remaining time period and the changeover time period tm are equal, the movie data item Ac is selected by the CPU 104. And, at the time point t4*a* that the changeover time period tm has elapsed from the time point t3*a* (i.e. at the time point t3), the movie data item Be is selected by the CPU 104. Subsequently, until the time point t4, this selection of the movie data item Be by the CPU 104 is continued.

In FIG. 10(*f*), similarly to the cases of FIGS. 7(*e*) through 9(*e*), there are shown a movie data item A having a photographic time period between the time points t3 and t4, a movie data item B having a photographic time period between the time points t1 and t5, and a movie data item C having a photographic time period between the time points t2 and t6. The movie data item B and the movie data item C are overlapped between the time point t2 and the time point t5, and the movie data item A, the movie data item B, and the movie data item C are overlapped between the time points t3 and t4. Accordingly, in the overlapped time period, the sequence in which the movie data item selected by the CPU 104 is changed over each time the changeover time period tm elapses becomes: the movie data item B, the movie data item C, and the movie data item A. Moreover, in FIG. 10(*d*), it is supposed that the time period (t3−t2)<tm, the time period (t4−t3*a*)<tm, and the time period (t5−t5*a*)<tm.

At the time point t1, the movie data item B is selected by the CPU 104. When the time arrives at the time point t2 that is the starting time of photography of the movie data item C, the movie data item C is selected by the CPU 104. Although the starting time point of photography of the movie data item A arrives at the time point t3, the changeover time period tm from the time point t2 has not yet elapsed. Accordingly, the movie data item C is selected by the CPU 104. At the time point t2*a* at which the changeover time period tm has elapsed from the time point t2, the movie data item Ab is selected by the CPU 104. Then, at the time point t3*a* at which the changeover time period tm has elapsed from the time point t2*a*, the movie data item Be is selected by the CPU 104. And, at the time point t4*a* that the changeover time period tm has elapsed from the time point t3*a*, the movie data item Cf is selected by the CPU 104. Then at the time point t5*a* that the changeover time period tm has elapsed from the time point t4*a*, since the remaining time period of the movie data item Bh is less than the changeover time period tm, the selection of the movie data item C by the CPU 104 is continued.

—B: The Simultaneous Display Mode—

In the simultaneous display mode, the further two following modes may be set:

B1: A parallel display mode

B2: A small screen mode

In the parallel display mode, two screen display regions are set upon the monitor 105, and two images whose time bands of photography overlap one another are displayed in parallel. If three or more items of movie data are overlapped in the same time band, two different movies to be displayed in parallel are selected by actuation of the input device 101. This movie selection operation is performed upon a menu screen that is displayed upon the monitor 105. Moreover, upon which of a left and a right screen of the monitor 105 the selected images should be displayed, may also be set upon this menu screen.

In the small screen mode, a large screen display region and a small screen display region are set upon the monitor 105, and one of two images that overlap within a photographic time band is displayed in the large screen display region, while the other is displayed in the small screen display region. These two modes will be described below in detail.

(B1: The Parallel Display Mode)

The Parallel Display Mode Will Now be Explained with reference to FIG. 11. It should be understood that, in FIG. 11, it will be supposed that settings are established so that the movie A is displayed on the left of the screen of the monitor 105, while the movie B is displayed on the right of the screen of the monitor 105.

FIG. 11(*a*), similarly to the cases of FIGS. 5(*a*) through 10(*a*), shows a case in which, apart from the movie data item A, no other movie data item exists that overlaps it in the same time band. In this case, the movie data item A is selected by the CPU 104, and the movie A that corresponds to this movie data item A is playback displayed upon the monitor 105, on its left screen. Since no movie exists to be displayed on the right screen of the monitor 105, a black screen is displayed.

In the example shown in FIG. 11(*b*), similarly to the cases of FIGS. 5(*b*) through 10(*b*), the movie data item A is an image data item that was photographed between the time points t2 and t3, and the movie data item B is an image data item that was photographed between the time points t1 and t4. At the time point t1, the movie data item B is selected by the CPU 104 as an image data item to be displayed at the right of the screen. Thus the movie B that corresponds to this selected movie data item B is displayed by the CPU 104, via the monitor interface 108, on the right screen of the monitor 105. The selection of the movie data item B by the CPU 104 is continued until the time point t4, that is the ending time point of photography of the movie data item B. And, during the interval between the time points t1 and t2, no image data item exists that is overlapped over the movie data item B. Accordingly, a black screen is displayed by the CPU 104 on the left screen of the monitor 105.

When the time arrives at the time point t2 that is the starting time point of photography of the movie data item A, the movie data item A is selected by the CPU 104 as an image data item to be displayed on the left of its screen. The movie A corresponding to this movie data item A that has been selected is accordingly displayed by the CPU 104, via the monitor interface 108, upon the left of the monitor 105. At this time point, the selection of the movie data item B by the CPU 104 is continued as well. In other words, the movie B that corresponds to this movie data item B is still displayed on the right of the screen of the monitor 105. At the time point t3 that is the ending time point of photography of the movie data item A, the selection of the movie data item A by the CPU 104 is ended. Accordingly, subsequent to this time point t3, in a similar manner to the case for the interval between the time point t1 and the time point t2 as previously described, a black screen is displayed by the CPU 104 on the left of the screen of the monitor 105.

In the example shown in FIG. 11(*c*), similarly to the cases of FIGS. 5(*d*) and 6(*c*) through 9(*c*), the movie data item A is an image data item that was photographed between the time points t1 and t3, and the movie data item B is an image data item that was photographed between the time points t2 and t4. At the time point t1, the movie data item A is selected by the CPU 104 as a display image data item for the left of the screen. Thus, the movie A corresponding to this movie data item A that has been selected is displayed by the CPU 104, via the monitor interface 108, upon the left of the screen of the monitor 105. This selection of the movie data item A by the CPU 104 is continued until the time point t3, that is the ending time point of photography of the movie data item A. Between the time point t1 and the time point t2, no image data item exists that is overlapped with the movie data item A. Accordingly, a black screen is displayed by the CPU 104 on the right of the screen of the monitor 105.

At the time point t2 that is the starting time point of photography of the movie data item B, the movie data item B is selected by the CPU 104 as an image data item to be displayed on the right of the screen, and this selection is continued until the time point t4, that is the ending time point of photography of the movie data item B. Thus, the movie B corresponding to this movie data item B that has been selected is displayed by the CPU 104, via the monitor interface 108, at the right of the screen of the monitor 105. In other words, between the time point t2 and the time point t3, an image of the movie data item A is displayed at the left of the screen, and an image of the movie data item B is displayed at the right of the screen; while, subsequent to the time point t3, a black screen is displayed at the left of the screen of the monitor 105.

In the example shown in FIG. 11(*d*), similarly to the cases of FIGS. 7(*e*) through 9(*e*), there are shown a movie data item A having a photographic time period between the time points t3 and t4, a movie data item B having a photographic time period between the time points t1 and t5, and a movie data item C having a photographic time period between the time points t2 and t6. The movie data item B and the movie data item C are overlapped during the time period between the time point t2 and the time point t5, while the movie data item A, the movie data item B, and the movie data item C are overlapped during the time period between the time point t3 and the time point t4. Moreover, it will be supposed that a setting is established for the movies A and B to be displayed upon the monitor 105. In other words, the movie data item C is not selected by the CPU 104. Accordingly, the movie A and the movie B are displayed in parallel on the left and right of the screen of the monitor 105, in a similar manner to FIG. 11(*b*).

(B2: The Small Screen Display Mode)

In the small screen display mode, the following two further modes can be set:

B2-1: A priority camera mode

B2-2: A scene start priority mode

In the priority camera mode, if a plurality of items of movie data are overlapped in the same time band, then the CPU 104 displays the movie corresponding to the movie data item that has been selected as a priority data item in a large screen display region upon the monitor 105. Moreover, a non-priority image data item is displayed in a small screen display region upon the monitor 105. This small screen display region is displayed as superimposed upon the large screen display region, in a predetermined position upon the monitor 105.

The setting of the camera priority setting display mode in the small screen display mode of the simultaneous display mode is performed upon a menu screen displayed upon the monitor 105 by the user actuating the input device 101. When the camera priority setting display mode of FIG. 3(*a*) is selected, and a pull down menu for the first priority camera is actuated, the screen changes to the display shown in FIG. 3(*b*). The first priority camera is set by selecting any one of 1 through 4 upon the screen of FIG. 3(*b*). In a similar manner, when the pull down menu for the second priority camera is actuated, the screen changes to the display shown in FIG. 3(*b*). The second priority camera is set by selecting any one of 1 through 4 upon the screen of FIG. 3(*b*).

In the scene start priority mode of the small screen display mode, among a plurality of items of movie data that are overlapped in the same time band, the CPU 104 selects as a priority that image data item whose starting time point of photography is the most recent, and displays an image corresponding to the image data item that has thus been selected in a large screen upon the monitor 105. In other words, if a movie is being displayed in a large screen upon the monitor 105, when the starting time point of some other movie data item that is overlapped in the same time band arrives, the CPU 104 selects that other movie data item. That is, the display in the large screen upon the monitor 105 changes over to an image of the movie data item whose starting time point of photography is the later, and the movie that was being displayed in the large screen up until that time point is now displayed in a small screen.

B2-1: The Priority Camera Mode of the Small Screen Display Mode

In FIG. 12(*a*), similarly to the cases of FIGS. 5(*a*) through 10(*a*), there is shown a case in which, apart from the movie data item A, no other movie data item exists that overlaps it in the same time band. In this case, the movie data item A is selected by the CPU 104, and the movie A that corresponds to this movie data item A is playback displayed upon the monitor 105, in a large screen display region thereof. It should be understood that, in this case, no small screen display region is displayed upon the monitor 105.

In the example shown in FIG. 12(*b*), similarly to the cases of FIGS. 5(*b*) through 11(*b*), the movie data item A that is the priority data item is an image data item that was photographed between the time points t2 and t3, and the movie data item B that is a non-priority data item is an image data item that was photographed between the time points t1 and t4. At the time point t1, the movie data item B is selected by the CPU 104 as the large screen display image data item. Thus, the movie Ba corresponding to the movie data item Ba that has been selected is displayed by the CPU 104 in a large screen display region upon the monitor 105. At this time, no small screen display region is displayed upon the monitor 105. When the time arrives at the time point t2 that is the starting time point of photography of the movie data item A whose priority level is the higher, the movie data item A is selected by the CPU 104 as the large screen display image data item, and the movie A that corresponds to this movie data item A is displayed in the large screen display region upon the monitor 105. Moreover, the movie data item Bb is selected by the CPU 104 as the small screen display image data item, and the movie Bb that corresponds to this movie data item Bb is displayed in a small screen display region. When the time reaches the time point t3 that is the ending time point of photography of the movie data item A, the selection of the movie data item A by the CPU 104 terminates. Accordingly, the movie Bc that corresponds to the movie data item Bc is displayed in the large screen display region upon the monitor 105. Subsequent to the time point t3, no small screen display region is displayed upon the monitor 105.

In the example shown in FIG. 12(*c*), similarly to the case of FIG. 5(*c*), the movie data item A, that is set as the priority data item, is an image data item that was photographed between the time points t4 and t4, and the movie data item B that is a non-priority data item is an image data item that was photographed between the time points t2 and t3. In other words, in the example of FIG. 12(*c*), the movie data items Ab and B are overlapped between the time point t2 and the time point t3.

At the time point t1, the movie data item A that is the priority data item is selected by the CPU 104 as the large screen display image data item. And the movie A that corresponds to this movie data item A is displayed by the CPU 104 in the large screen display region upon the monitor 105. At this time no display is provided by the CPU 104 in the small screen display region of the monitor 105, since no movie data item exists that is overlapped with the movie data item A. Moreover, since no image data item exists whose priority level is higher than that of the movie data item A, the movie A is displayed by the CPU 104 in the large screen display region of the monitor 105 until the time point t4. When the time reaches the time point t2 that is the starting time point of photography of the movie data item B, the movie data item B that is a non-priority data item is selected by the CPU 104 as the small screen display image data item, and the movie B that corresponds to this movie data item B is displayed in the small screen display region of the monitor 105. When the time reaches the time point t3 that is the ending time point of photography of the movie data item B, the display by the CPU 104 of the movie data item B in the small screen display region of the monitor 105 is terminated. Subsequently, no display is provided in the small screen display region upon the monitor 105. Accordingly, only the movie A corresponding to the movie data item A that is the priority data item is displayed by the CPU 104 in the large screen display region upon the monitor 105.

In the example shown in FIG. 12(*d*), similarly to the cases of FIGS. 5(*d*) and 6(*c*) through 9(*c*), the movie data item A that is the priority data item is an image data item that was photographed between the time points t1 and t3, and the movie data item B that is a non-priority data item is an image data item that was photographed between the time points t2 and t4. At the time point t1, the movie data item A that is the priority data item is selected by the CPU 104 as the large screen display image data item. And the movie A that corresponds to this movie data item A is displayed in the large screen display region upon the monitor 105. At this time no display is provided in the small screen display region of the monitor 105, since no movie data item exists that is overlapped with the movie data item A. Moreover, since no image data item exists whose priority level is higher than that of the movie data item A, the movie A is displayed by the CPU 104 in the large screen display region of the monitor 105 until the time point t3. When the time point t2 arrives that is the starting time point of photography of the movie data item B, the movie data item B that is the non-priority data item is selected by the CPU 104 as the small screen display image data item, and the movie Ba that corresponds to this movie data item Ba is displayed in the small screen display region of the monitor 105. When the time reaches the time point t3 that is the ending time point of photography of the movie data item A, the display by the CPU 104 of the movie data item A in the large screen display region of the monitor 105 is terminated. Accordingly, the movie Bb that corresponds to the movie data item Bb is displayed in the large screen display region of the monitor 105. Subsequently to the time point t3, no display is provided in the small screen display region upon the monitor 105.

In the example shown in FIG. 12(*e*), similarly to the cases of FIGS. 5(*e*) through 9(*e*), there are shown a first priority movie data item A that was photographed between the time points t3 and t4, a second priority movie data item B that was photographed between the time points t1 and t5, and a non-priority movie data item C that was photographed between the time points t2 and t6.

At the time point t1, the movie data item B is selected by the CPU 104 as the large screen display image data item. And the movie B corresponding to this movie data item B that has been selected is displayed by the CPU 104 in the large screen display region of the monitor 105. At this time, no display is provided in the small screen display region upon the monitor 105. When the time point t2 arrives that is the starting time point of photography of the movie data item C, this movie data item C that is a non-priority data item is selected by the CPU 104 as the small screen display image data item, and the movie Ca that corresponds to this movie data item Ca is displayed in the small screen display region of the monitor 105. And, when the time reaches the time point t3 that is the starting time point of photography of the movie data item A, this movie data item A that is the first priority is selected by the CPU 104 as the large screen display image data item, and the movie A that corresponds to this movie data item A is displayed in the large screen display region of the monitor 105. Moreover, the movie data item Bc that is the second priority data item is selected by the CPU 104 as the small screen display image data item, and the movie Bc that corresponds to this movie data item Bc is displayed in the small screen display region of the monitor 105. Thus the movie C that corresponds to the movie data item C is not displayed by the CPU 104.

At the time point t4 that is the ending time point of photography of the movie data item A, the display of the movie A in the large screen display region of the monitor 105 is terminated. And the movie data item Bd that is the second priority is selected by the CPU 104 as the large screen display image data item, and the movie Bd that corresponds to this second priority movie data item Bd is displayed in the large screen display region of the monitor 105. Moreover, the movie data item Cc that is the non-priority data item is selected by the CPU 104 as the small screen display image data item, and the movie Cc that corresponds to this movie data item Cc is displayed in the small screen display region of the monitor 105. Then, at the time point t5 that is the ending time point of photography of the movie data item B, the display of the movie Bd in the large screen display region of the monitor 105 by the CPU 104 is terminated. And the movie data item Cd is selected by the CPU 104 as the large screen display image data item, and the movie Cd that corresponds to this movie data item Cd is displayed in the large screen display region of the monitor 105. This display of the movie Cd by the CPU 104 in the large screen display region of the monitor 105 is continued until the time point t6 that is the ending time point of photography of the movie data item C. It should be understood that, after the time point t5, no display is provided in the small screen display region of the monitor 105.

In the example shown in FIG. 12(*f*), similarly to the cases of FIGS. 5(*f*) through 9(*f*), there are shown a first priority movie data item A that was photographed between the time points t3 and t4, a second priority movie data item B that was photographed between the time points t1 and t6, and a non-priority movie data item C that was photographed between the time points t2 and t5. In other words, the movie data items B and C are overlapped during the interval between the time point t2 and the time point t5, and the movie data items A, B, and C are overlapped during the interval between the time point t3 and the time point t4.

At the time point t1, the movie data item B that is the second priority is selected by the CPU 104 as the large screen priority image data item. And the movie Ba corresponding to this movie data item Ba that has been selected is displayed by the CPU 104 in the large screen display region of the monitor 105. At this time, no display is provided upon the monitor 105 in its small screen display region. When the time reaches the time point t2 that is the starting time point of photography of the movie data item C that is a non-priority data item, this movie data item C that is a non-priority data item is selected by the CPU 104 as the small screen display image data item, and the movie Ca that corresponds to this movie data item Ca is displayed in the small screen display region of the monitor 105. And, when the time reaches the time point t3 that is the starting time point of photography of the movie data item A that is the first priority, this movie data item A whose priority level is the highest is selected by the CPU 104 as the large screen display image data item, and the movie A that corresponds to this movie data item A is displayed in the large screen display region of the monitor 105. Moreover, the movie data item Bc that is the second priority data item is selected by the CPU 104 as the small screen display image data item, and the movie Bc that corresponds to this movie data item Bc is displayed in the small screen display region of the monitor 105. The movie C that corresponds to the movie data item C is not displayed by the CPU 104.

At the time point t4 that is the ending time point of photography of the movie data item A, the display of the movie A in the large screen display region of the monitor 105 by the CPU 104 is terminated. And the movie data item Bd is selected by the CPU 104 as the large screen display image data item, and the movie Bd that corresponds to this movie Bd is displayed in the large screen display region of the monitor 105. Moreover, the movie data item Cc is selected by the CPU 104 as the small screen display image, and the movie Cc that corresponds to this movie data item Cc is displayed in the small screen display region of the monitor 105. And, at the time point t5 that is the ending time point of photography of the movie data item C, the display by the CPU 104 of the movie Cc that corresponds to the movie data item Cc in the small screen display region of the monitor 105 is terminated. Subsequent to the time point 5, no display is provided in the small screen display region of the monitor 105. However, the display of the movie B by the CPU 104 in the large screen display region of the monitor 105 is maintained until the time point t6 that is the ending time point of photography of the movie data item B.

B2-1: The Scene Start Priority Mode of the Small Screen Display Mode

Next, the case in which the scene start priority mode is set in the small screen display mode will be explained with reference to FIG. 13. In FIG. 13(*a*), similarly to the case of FIG. 12(*a*), since no other movie data item exists that overlaps it in the same time band apart from the movie image data item A, the movie A that corresponds to this movie data item A is playback displayed upon the monitor 105, in a large screen display region thereof. It should be understood that, in this case, no small screen display region is displayed upon the monitor 105.

In the example shown in FIG. 13(*b*), similarly to the cases of FIGS. 5(*b*) through 11(*b*), the movie data item A is an image data item that was photographed between the time points t2 and t3, and the movie data item B is an image data item that was photographed between the time points t1 and t4.

At the time point t1, the movie data item B is selected by the CPU 104 as the large screen display image data item, and the movie Ba that corresponds to the movie data item Ba is displayed upon the monitor 105 in a large screen display region. At this time, no small screen display region is displayed upon the monitor 105. When the time reaches the time point t2 that is the starting time point of photography of the movie data item A, the movie data item A is selected by the CPU 104 as the large screen display image data item, and the movie A that corresponds to the movie data item A is displayed in the large screen display region upon the monitor 105, instead of the image Ba of the movie data item Ba. Moreover, the movie data item Bb is selected by the CPU 104 as the small screen display image data item, and the movie Bb that corresponds to this movie data item Bb is displayed in the small screen display region upon the monitor 105. When the time reaches the time point t3 that is the ending time point of photography of the movie data item A, the display of the movie A by the CPU 104 in the large screen display region of the monitor 105 is terminated. And the movie data item Bc is selected by the CPU 104 as the large screen display image data item, so that the movie Bc that corresponds to this movie data item Bc is displayed in the large screen display region of the monitor 105. Subsequent to the time point t3, no small screen display region is displayed upon the monitor 105.

In the example shown in FIG. 13(*c*), similarly to the cases of FIGS. 5(*d*), 6(*c*) through 9(*c*), 11(*c*), and 12(*d*), the movie data item A is an image data item that was photographed between the time points t1 and t3, and the movie data item B is an image data item that was photographed between the time points t2 and t4.

At the time point t1, the movie data item A is selected by the CPU 104 as the large screen display image data item. And the movie Aa that corresponds to the movie data item Aa is displayed upon the monitor 105 in the large screen display region. At this time, no small screen display region is displayed by the CPU 104 upon the monitor 105, since no movie data item exists that is overlapped with the movie data item A. When the time reaches the time point t2 that is the starting time point of photography of the movie data item B, the movie data item B is selected by the CPU 104 as the large screen display image data item, and the movie Ba that corresponds to this movie data item Ba is displayed in the large screen display region upon the monitor 105. Moreover, the movie data item Ab is selected by the CPU 104 as the small screen display image data item, and the movie Ab that corresponds to this movie data item Ab is displayed in the small screen display region upon the monitor 105. When the time reaches the time point t3 that is the ending time point of photography of the movie data item A, the display of the movie Ab by the CPU 104 in the small screen display region of the monitor 105 is terminated. Subsequently, no small screen display region is displayed upon the monitor 105. Moreover, no movie data item exists, photography of which was started after the starting time point of photography of the movie data item B. Accordingly, the display of the movie Bb that corresponds to the movie data item Bb in the large screen display region of the monitor 105 by the CPU 104 is continued until the time point t4.

In FIG. 13(*d*), similarly to the case with FIGS. 7(*e*) through 9(*e*), there are shown a movie data item A that has a photographic time period from the time point t3 to the time point t4, a movie data item B that has a photographic time period from the time point t1 to the time point t5, and a movie data item C that has a photographic time period from the time point t2 to the time point t6. The movie data item B and the movie data item C are overlapped during the interval between the time point t2 and the time point t5, while the movie data item A, the movie data item B, and the movie data item C are all mutually overlapped during the interval between the time point t3 and the time point t4.

At the time point t1, the movie data item B is selected by the CPU 104 as the large screen display image data item. And the movie Ba that corresponds to the movie data item Ba is displayed by the CPU 104 upon the monitor 105 in a large screen display region. At this time, no small screen display region is displayed by the CPU 104 upon the monitor 105, since no movie data item exists that is overlapped with the movie data item B. When the time reaches the time point t2 that is the starting time point of photography of the movie data item C, the movie data item C is selected by the CPU 104 as the large screen display image data item, and the movie Ca that corresponds to the movie data item Ca is displayed in the large screen display region upon the monitor 105. Moreover, the movie data item Bb is selected as the small screen display image data item, and is displayed by the CPU 104 in the small screen display region upon the monitor 105. When the time reaches the time point t3 that is the starting time point of photography of the movie data item A, the movie data item A is selected by the CPU 104 as the large screen display image data item, and the movie A that corresponds to this movie data item A is displayed in the large screen display region of the monitor 105. Moreover, the movie data item Cb is selected by the CPU 104 as the small screen display image data item, and the display in the small screen display region of the monitor 105 is changed over to display of the movie Cb that corresponds to this movie data item Cb. Furthermore, the movie Bc that corresponds to the movie data item Bc is not displayed by the CPU 104.

At the time point t4 that is the ending time point of photography of the movie data item A, the display by the CPU 104 of the movie A in the large screen display region of the monitor 105 is terminated. Moreover the movie data item Cc that has a date and time of photography that are later than those of the movie data item B is selected by the CPU 104 as the large screen display image data item, and the movie Cc that corresponds to this movie data item Cc is displayed in the large screen display region of the monitor 105. And the movie Bd corresponding to the movie data item Bd that has been selected by the CPU 104 as the small screen display image data item is displayed by the CPU 104 in the small screen display region of the monitor 105. At this time, among the plurality of movie data items, the CPU 104 selects that movie data item whose remaining photographic time period is the longest, as the large screen display image data item. Subsequent to the time point t4, the remaining photographic time period of the movie data item B is the period (t5−t4), while the remaining time period for the movie data item C is (t6−t4). Accordingly, the CPU 104 selects the movie data item C whose remaining time period is the longer, as the large screen display image data item. And, at the time point t5 that is the ending time point of photography of the movie data item B, the display of the small screen display region on the monitor 105 by the CPU 104 is terminated. Subsequent to the time point t5, no small screen display region is displayed upon the monitor 105. When the time reaches the time point t6 that is the ending time point of photography of the movie data item C, the display by the CPU 104 of the movie Cd that corresponds to the movie data item Cd in the large screen display region on the monitor 105 is terminated.

In the example shown in FIG. 13(*e*), a relationship between the movie data items A, B, and C is shown that is similar to the cases of FIGS. 5(*f*) and 7(*f*). In other words, the movie data item A is an image data item that was photographed between the time points t3 and t4, the movie data item B is an image data item that was photographed between the time points t1 and t6, and the movie data item C is an image data item that was photographed between the time points t2 and t5. The movie data items B and C are overlapped during the interval between the time point t2 and the time point t5, while the movie data items A, B, and C are overlapped during the interval between the time point t3 and the time point t4.

At the time point t1, the movie data item B is selected by the CPU 104 as the large screen display image data item. And the movie B that corresponds to the movie data item B is displayed by the CPU 104 upon the monitor 105 in a large screen display region. At this time, no small screen display region is displayed by the CPU 104 upon the monitor 105, since no movie data item exists that is overlapped with the movie data item B. When the time reaches the time point t2 that is the starting time point of photography of the movie data item C, the movie data item C is selected by the CPU 104 as the large screen display image data item, and the movie C that corresponds to the movie data item Ca is displayed in the large screen display region upon the monitor 105. Moreover, the movie data item Bb is selected as the small screen display image data item, and the movie Bb that corresponds to this movie data item Bb is displayed by the CPU 104 in the small screen display region upon the monitor 105. When the time reaches the time point t3 that is the starting time point of photography of the movie data item A, the movie data item A is selected by the CPU 104 as the large screen display image data item, and the movie A that corresponds to this movie data item A is displayed in the large screen display region of the monitor 105. Moreover, the display in the small screen display region of the monitor 105 is changed over by the CPU 104 to display of the movie Cb corresponding to the movie data item Cb that has been selected as the small screen display image data item.

At the time point t4 that is the ending time point of photography of the movie data item A, the display by the CPU 104 of the movie A in the large screen display region of the monitor 105 is terminated. As described above, subsequent to the time point t4, the movie data item B whose photographic time period is the longest is selected by the CPU 104 as the large screen display image data item. In other words, at the time point t4, the movie Bd that corresponds to the movie data item Bd is displayed by the CPU 104 in the large screen display region of the monitor 105. Moreover, the movie data item Cc is selected by the CPU 104 as the small screen display image data item, and the movie Cc that corresponds to this movie data item Cc is displayed in the small screen display region of the monitor 105. And, at the time point t5 that is the ending time point of photography of the movie data item C, the display of the small screen display region on the monitor 105 by the CPU 104 is terminated. When the time reaches the time point t6 that is the ending time point of photography of the movie data item B, the display by the CPU 104 of the movie Be that corresponds to the movie data item Be in the large screen display region on the monitor 105 is terminated.

In the above, the case has been explained in which two or more items of movie data whose dates and times of photography overlap have been read as editing subject image data items. In the following, cases will be explained in which editing subject image data items have been read that include, not only movie data items, but also still image data items.

—Still Image Editing Processing—

Figure 14:
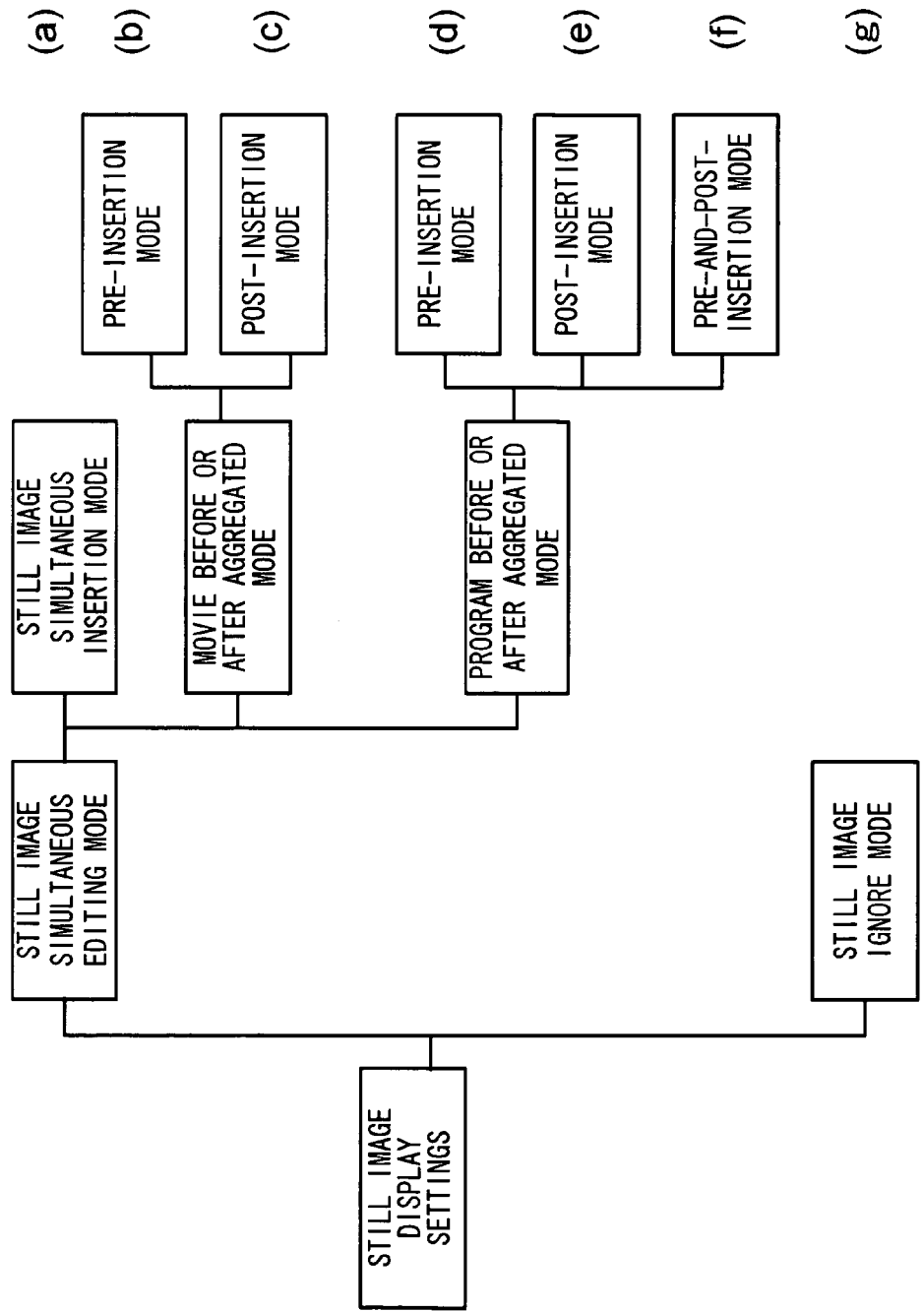
FIG. 14 is a figure for explanation of the relationship between various modes during still image editing processing.

As shown in FIG. 14, the still image editing processing is broadly classified into the following two modes, either of which may be selected by actuation of the input device 101.

(C) A still image simultaneous editing mode (D) A still image ignore mode

The still image simultaneous editing mode is a mode in which data item for playback is generated, and is displayed, on the basis of editing subject image data items that include still image data items. Moreover, the still image ignore mode is a mode in which no still image data items are displayed.

—The Still Image Simultaneous Editing Mode—

This still image simultaneous editing mode is further classified into the following three modes:

C1: A still image simultaneous insertion mode
C2: A movie before or after aggregated mode
C3: A program before or after aggregated mode The selection and setting of each of these modes is performed by actuation of the input device 101 upon a menu screen (not shown in the figures) that is displayed when the tag for still image editing processing shown in FIG. 3 is selected. In this still image simultaneous editing mode, editing is performed upon the images that become subjects for editing according to the three modes described above.

C1: The Still Image Simultaneous Insertion Mode

In the still image simultaneous insertion mode, still image data items are displayed by the CPU 104 along with movie data items by changing the mover upon the monitor 105, according to the various modes set for the movie editing processing as previously described. The image editing when editing subject image data item including still image data items that have been read will now be explained for each of the following nine editing modes below, into which it may be classified.

C1-1: The Camera Priority Setting Mode of the Display Changeover Mode (a) The still image simultaneous insertion mode when the combined display mode is selected will be explained with reference to FIG. 15.

(b) The still image simultaneous insertion mode when the display one only mode is selected will be explained with reference to FIG. 16.

C1-2: The Long Time Period Movie Priority Mode of the Display Changeover Mode (a) The still image simultaneous insertion mode when the combined display mode is selected will be explained with reference to FIG. 17.

(b) The still image simultaneous insertion mode when the display one only mode is selected will be explained with reference to FIG. 18.

Figure 19:
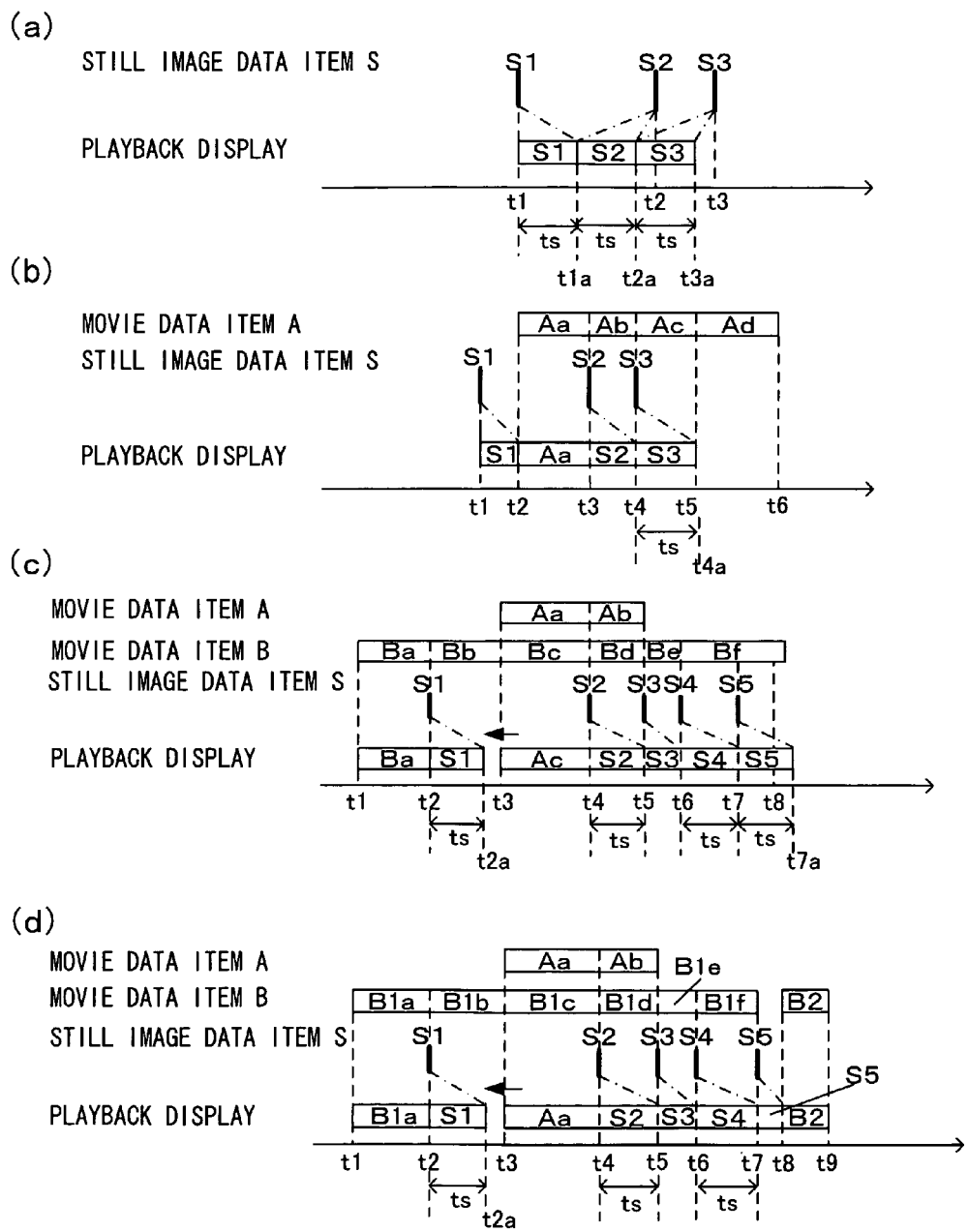
FIG. 19 is a time chart showing movie and still images that are displayed in a scene start priority mode.

C1-3:

The still image simultaneous insertion mode when the scene start priority mode of the display changeover mode is selected will be explained with reference to FIG. 19.

C1-4:

The still image simultaneous insertion mode when the fixed interval changeover mode of the display changeover mode is selected will be explained with reference to FIG. 20.

C1-5:

The still image simultaneous insertion mode when the parallel display mode of the simultaneous display mode is selected will be explained with reference to FIG. 21.

C1-6:

The still image simultaneous insertion mode when the camera priority setting mode is selected in the small screen display mode of the simultaneous display mode will be explained with reference to FIGS. 22 and 23.

C1-7:

The still image simultaneous insertion mode when the scene start priority mode of the simultaneous display mode is selected will be explained with reference to FIG. 24.

C1-1 (*a*):

(a) The still image simultaneous insertion mode when the combined display mode is selected in the camera priority setting mode of the display changeover mode will now be explained with reference to FIG. 15.

It should be understood that the combined display mode is a mode in which while, with two image data items whose dates and times of photography or photographic time points overlap, only the priority image data item is displayed, on the other hand, if there is no such overlap, the non-priority data item is also displayed.

Moreover it should be understood that, when a still image data item is to be selected as the priority data item, then, as previously described, this is set by selecting the field "still image" that is displayed on the pull down menu shown in FIG. 3 on the menu screen that is displayed upon the monitor 105.

FIG. 15(*a*) shows a case when items of still image data S1, S2, and S3 having the respective photographic time points t1, t2, and t3 have been selected as the editing subject image data items. In this case, the still image data items S1, S2, and S3 are selected by the CPU 104, and are edited so that each of them is displayed in succession for a playback time period ts.

In the example shown in FIG. 15(*b*), the movie data item A is the priority data item, and the still image data items are non-priority data items. And the photographic time period of the movie data item A is the interval between the time points t2 and t5, while the respective photographic time points of the still image data items S1, S2, and S3 are the time points t1, t3, and t4. Since only the still image data item S1 exists between the time points t1 and t2, at the time point t1 the still image data item S1 is selected by the CPU 104, and the still image S1 that corresponds to this still image data item S1 is displayed upon the monitor 105. At the time point t2 that is the starting time point of photography of the movie data item A whose priority level is the higher, the movie data item A that is the priority data item is selected by the CPU 104, although the playback time period ts has not yet elapsed from the time point t1. Accordingly, the movie A that corresponds to this movie data item A is displayed upon the monitor 105 by the CPU 104. Subsequently, at the time points t3 and t4, the time arrives at the photographic time points of the still image data items S2 and S3. However, the selection by the CPU 104 of the movie data item A whose priority level is the higher is continued until the time point t5 that is the ending time point of photography of the movie data item A.

In this manner, in the example shown in FIG. 15(*b*), if the time arrives at the starting time point of photography of some movie data item whose priority level is higher even before the playback time period of the still image that is being displayed upon the first monitor 105 elapses, the movie that corresponds to this movie data item is displayed as a priority.

In the example shown in FIG. 15(*c*), the movie data item A is set as a non-priority data item, and the still image data items are set as priority data items. And the photographic time period of the movie data item A is the interval between the time point t2 and the time point t5, while the photographic time points of the still image data items S1, S2, and S3 are the time points t1, t3, and t4 respectively.

At the time point t1, the still image data item S1 is selected by the CPU 104, and the still image S1 that corresponds to this still image data item S1 is displayed upon the monitor 105. Even at the time point t2 that is the starting time point of photography of the movie data item A, the display by the CPU 104 of the still image S1 that corresponds to the still image data item S1 whose priority level is the higher is continued. And, at the time point t1*a* when the playback time period ts has elapsed from the time point t1, the display by the CPU 104 of the still image S1 is terminated. And the movie data item Ab is selected by the CPU 104, and the movie Ab that corresponds to this movie data item Ab is displayed upon the monitor 105.

At the time point t3 that is the photographic time point of the still image data item S2 whose priority level is high, the still image data item S2 is selected by the CPU 104 instead of the movie Ab, and the still image S2 that corresponds to this still image data item S2 is displayed upon the monitor 105. Since the time point t4, at which the playback time period ts has not elapsed from the time point t3, is the photographic time point of the still image data item S3, the still image data item S3 is selected by the CPU 104 instead of the still image data item S2 at this time point t4, and the still image S3 that corresponds to this still image data item S3 is displayed upon the monitor 105. This still image S3 is displayed by the CPU 104 upon the monitor 105 during the playback time period ts.

In this manner, in the example shown in FIG. 15(*c*), if the time has reached the photographic time point of a still image whose photographic time point is later than that of the still image that is being displayed upon the first monitor 105, this still image whose photographic time point is the later is displayed, even if this is before the playback time period ts has elapsed.

In the example shown in FIG. 15(*d*), the movie data item A is the first priority data item, and the movie data item B is the second priority data item. The photographic time period of the movie data item A is between the time point t3 and the time point t5, while the photographic time period of the movie data item B is between the time point t1 and the time point t8. Moreover, the respective photographic time points of the still image data items S1, S2, S3, S4, and S5 are the time points t2, t4, t5, t6, and t7.

In this case, since the still image data items S1 through S5 are overlapped with the movie data item B that is the second priority data item, the still image data items S1 through S5 are not selected by the CPU 104. The image data items that are selected by the CPU 104 are the movie data items A and B. In other words, the images that are displayed by the CPU 104 upon the monitor 105 are similar to those in the case shown in FIG. 5(*b*).

In the example shown in FIG. 15(*e*), the still image data items are the first priority data items, the movie data item A is the second priority data item, and the movie data item B1 that consists of the movie data items B1*a* through B1*d* and the movie data item B2 are non-priority data items. The photographic time period of the movie data item A is between the time point t3 and the time point t5, the photographic time period of the movie data item B1 is between the time point t1 and the time point t7, and the photographic time period of the movie data item B2 is between the time point t8 and the time point t9. Moreover, the respective photographic time points of the still image data items S1, S2, S3, S4, and S5 are the time points t2, t4, t5, t6, and t7.

At the time point t1, the movie data item B1 is selected by the CPU 104, and the movie B1*a* that corresponds to the movie data item B1*a* is displayed upon the monitor 105. And, at the photographic time point of the still image data item S1 that is a first priority data item, this still image data item S1 is selected by the CPU 104. Thus the still image S1 is displayed upon the monitor 105 by the CPU 104, instead of the movie B1*a*. At the time point t2*a* at which the playback time period ts has elapsed from the time point t2, the display upon the monitor 105 of the still image S1 by the CPU 104 is terminated. And the movie data item B1*c* is selected by the CPU 104, and the movie B1*c* that corresponds to this movie data item B1*c* is displayed upon the monitor 105 by the CPU 104, instead of the still image S1.

At the time point t3 that is the starting time point of photography of the movie data item A that is the second priority data item, this movie data item A is selected by the CPU 104, and the movie Aa is displayed upon the monitor 105, instead of the movie B1*c*. Then, at the photographic time point t4 of the still image data item S2 whose priority level is higher than that of the movie data item Aa, this still image data item S2 is selected by the CPU 104, and the still image S2 is displayed by the CPU 104 upon the monitor 105, instead of the movie Aa. And, at the time point t5 when the playback time period ts has elapsed from the time point t4, since this is the photographic time point of the still image data item S3 whose priority level is high, this still image data item S3 is selected by the CPU 104. In this case, the still image S3 is displayed by the CPU 104 upon the monitor 105, instead of the still image S2.

And, at the time point t6 at which the playback time period ts has not elapsed from the time point t5, since this is the photographic time point of the still image data item S4, this still image data item S4 is selected by the CPU 104, and the still image S4 is displayed by the CPU 104 upon the monitor 105, instead of the still image S3. Then, at the time point t7 when the playback time period ts has elapsed from the time point t6, since this is the photographic time point of the still image data item S5, this still image data item S5 is selected by the CPU 104, and the still image S5 is displayed upon the monitor 105, instead of the still image S4. Then, at the time point t9 at which the playback time period ts has elapsed from the time point t7, the display of the still image S5 upon the monitor 105 by the CPU 104 is terminated. At the starting time point of photography of the movie data item B2, the movie data item B2 is not selected by the CPU 104, since the playback time period ts of the still image S5 has not yet elapsed.

In the example shown in FIG. 15(f), the movie data item A is the first priority data item, the still image data item is the second priority data item, and the movie data item B is a non-priority data item. The overlapping relationship of the movie data item A, the movie data item B, and the still images S1 through S5 is the same as in FIG. 15(e).

At the time point t1, the movie data item B1 is selected by the CPU 104, and the movie B1a that corresponds to the movie data item B1a is displayed upon the monitor 105. At the photographic time point t2 of the still image data item S1 that is the second priority data item, this still image data item S1 is selected by the CPU 104, and the still image S1 is displayed upon the monitor 105, instead of the movie B1a. And, at the time point t2a at which the playback time period has elapsed from the time point t2, the display of the still image S1 upon the monitor 105 by the CPU 104 is terminated. And the movie data item B1c is selected by the CPU 140, and the movie B1c is displayed upon the monitor 105, instead of the still image S1.

At the time point t3 that is the starting time point of photography of the movie data item A that is the first priority data item, this movie data item A is selected by the CPU 104, and the movie Aa is displayed upon the monitor 105, instead of the movie B1c. Even at the time point t4 that is the photographic time point of the still image data item S2 that is a second priority data item, the movie data item A that is the first priority data item is selected by the CPU 104, so that the display of the movie A upon the monitor 105 is continued. In other word, the still image S2 is not displayed upon the monitor 105 by the CPU 104. At the time point t5 that is the ending time point of photography of the movie data item A, and that also is the photographic time point of the still image data item S3, the still image data item S3 that is a second priority data item is selected by the CPU 104, although the movie data item B that is a non-priority data item exists. Subsequently, the image that is displayed upon the monitor 105 is changed over by the CPU 104, in a similar manner to the case in FIG. 15(e).

C1-1 (b):

The still image simultaneous insertion mode when, in the movie editing mode setting, the display one only mode has been selected in the camera priority setting mode of the display changeover mode will now be explained with reference to FIG. 16. It should be understood that this display one only mode is a mode in which, among two image data items whose dates and times of photography or photographic time points overlap one another, only the priority image data item is displayed, and, even in a time band in which they do not overlap one another, still the non-priority data item is not displayed.

The example shown in FIG. 16(a) shows a case in which, in a similar manner to the example shown in FIG. 15(a), still image data items S1, S2, and S3 that have respective photographic time points t1, t2, and t3 have been selected as editing subject image data items. In this case, the still image data items S1, S2, and S3 are selected by the CPU 104, and are edited as successive image data items each of which is displayed in succession for a playback time period ts.

The example shown in FIG. 16(b) shows a case in which the movie data item A is set as the priority data item and still image data items are set as non-priority items, and in which the relationship between the movie data item A and the still image data items S1 through S3 is similar to that of FIG. 15(b). At the time point t1, the still image data item S1 is selected by the CPU 104, and the still image S1 is displayed upon the monitor 105. At the time point t2 that is the starting time point of photography of the data item A whose priority level is the highest, although the playback time period ts has not elapsed from the time point t1, the movie data item A is selected by the CPU 104, and the movie A is displayed upon the monitor 105 instead of the still image S1. Subsequently, at the time points t3 and t4, the time reaches the photographic time points of the still image data items S2 and S3. However the selection by the CPU 104 of the movie data item A whose priority level is higher is continued. This selection of the movie data item A by the CPU 104 is continued until the time point t5 that is the ending time point of photography of the movie data item A. In this manner, although the movie data item A and the still image data items S2 and S3 are overlapped within the same time band, subsequent to the time point t2, only the movie data item A that has been selected as being the priority data item is selected by the CPU 104.

In the example shown in FIG. 16(c), the movie data item A is set as a non-priority data item, and the still image data items are set as priority data items. And, in a similar manner to FIG. 15(c), the photographic time period for the movie data item A is the interval between the time point t2 and the time point t5, and the respective photographic time points of the movie items S1, S2, and S3 are the time points t1, t3, and t4.

In this example, since the display one only mode is selected, the still image data items S1 through S3 that are the priority data items are selected by the CPU 104, and the movie data item A is not selected. In FIG. 16(c), in the section between the time point t1a and the time point t3, there is a gap between the still image data items S1 and S2 that have been selected. However, the three still image data items S1 through S3 that are played back are edited as still image data items that follow one another in sequence.

In the example shown in FIG. 16(d), the movie data item A is the first priority data item, the movie data item B is the second priority data item, and the still image data items are non-priority data items. And, in the same manner as in FIG. 15(d), the photographic time period of the movie data item A is between the time point t3 and the time point t5, and the photographic time period of the movie data item B is between the time point t1 and the time point t8. Moreover, the respective photographic time points of the still image data items S1, S2, S3, S4, and S5 are the time points t2, t4, t5, t6, and t7.

This example is an example in which the display one only mode in the movie editing mode setting has been selected. Among the movie data item B and the still image data items S1 through S5 that overlap one another in the section between the time points t1 and t8, the movie data item B is prioritized over the still image data items S1 through S5. However, since the movie data item B that is the second priority data item and the movie data item A that is the first priority data item are overlapped in the section between the time points t3 and t5, the movie data item A that is the first priority data item is prioritized over the movie B. Thus, in the section between the time point t1 and the time point t8, only the movie data item A that has the length of time of photography from the time point t3 to the time point t5 is selected by the CPU 104.

In the example shown in FIG. 16(e), in a similar manner to the example shown in FIG. 15(e), the still image data items are the first priority data items, the movie data item A is the second priority data item, and the movie data item B1 that consists of the movie data items B1*a* through B1*d* and the movie data item B2 are non-priority data items. And the photographic time period of the movie data item A is between the time point t3 and the time point t5, the photographic time period of the movie data item B1 is between the time point t1 and the time point t7, and the photographic time period of the movie data item B2 is between the time point t8 and the time point t9. Moreover, the respective photographic time points of the still image data items S1, S2, S3, S4, and S5 are the time points t2, t4, t5, t6, and t7.

This example shown in FIG. 16(*e*) is an example in which the display one only mode has been selected in the movie editing mode setting. For the movie data item B1 and the still image data items S1 through S5 that overlap one another in the section between the time point t1 and the time point t8, the still image data items S1 through S5 that are first priority data items are prioritized over the movie data item B1 that is a non-priority data item, and are accordingly selected by the CPU 104. And, for the movie data item A and the movie data item B1 that overlap one another in the section between the time point t3 and the time point t4, the movie data item A that is a second priority data item is prioritized over the movie data item B1 that is a non-priority data item. However, since the priority of the movie data item A is lower than those of the still image data items S2 and S3 that are overlapped with it in the section between the time point t4 and the time point t5, in the section between the time point t3 and the time point t4, the movie data item A is selected by the CPU 104. In the section between the time point t4 and the time point t5, the still image data items S2 and S3 are selected by the CPU 104. Finally, in the section between the time point t1 and the time point t8, only the still images S1 through S5 are selected by the CPU 104. Since only the movie data item B2 exists between the time point t8 and the time point t9, this movie data item B2 that has a length of time of photography from the time point t8 to the time point t9 is selected by the CPU 104.

It should be understood that, although the movie data item B1*c* exists during the interval between the time point t2*a* and the time point t3, it is not selected by the CPU 104, since the priority level of the movie data item B is lower than those of the still image data items. Moreover, since the photographic time point of the still image S4 arrives within the playback time period of the still image S3, the playback time period of this still image S3 becomes between the time point t5 and the time point t6 (that is less than ts). Yet further, since the starting time point of photography of the movie B2 arrives within the playback time period of the still image S5, the playback time period of this still image S5 becomes between the time point t7 and the time point t8 (that is less than ts).

In FIG. 16(*e*), in the section between the time point t2*a* and the time point t4, there is a gap between the still image data items S1 and S2 that have been selected. However, as explained in FIG. 16(*c*), the five still image data items S1 through S3 each of which is played back for the time period ts are edited as still image data items that follow one another in sequence.

In the example shown in FIG. 16(*f*), the movie data item A is the first priority data item, the still image data item is the second priority data item, and the movie data item B is a non-priority data item. The overlapping relationship of the movie data item A, the movie data item B, and the still images S1 through S5 is the same as in FIG. 16(*e*).

This example shown in FIG. 16(*f*) is an example in which the display one only mode has been selected during the movie editing mode setting. Among the movie data item B1 and the still image data items S1 through S5 that overlap one another in the section from the time point t1 to the time point t8, the still image data items S1 through S5 that are second priority data items are selected by the CPU 104 as a priority over the movie data item B1 that is a non-priority data item. And, among the movie data item A and the movie data item B1 that overlap one another in the section from the time point t3 to the time point t4, the movie data item A that is the first priority data item is selected by the CPU 104 as a priority over the movie data item B1 that is a non-priority data item. Since the priority level of this movie data item A that is the first priority data item is higher than those of the still image data items S1 and S2 that are second priority data items and that overlap it in the section between the time point t3 and the time point t5, this movie data item A is selected by the CPU 104 in the section from the time point t3 to the time point t5. Finally, in the section from the time point t1 to the time point t8, the still image S1, the movies Aa and Ab, and the still images S3, S4, and S5 are selected by the CPU 104. Since only the movie data item B2 exists between the time point t8 and the time point t9, this movie data item B2 that has a length of time of photography from the time point t8 to the time point t9 is selected by the CPU 104.

It should be understood that, in a similar manner to the case of FIG. 16(*e*), although the movie data item B1*c* exists during the interval between the time point t2*a* and the time point t3, it is not selected by the CPU 104, since the priority level of the movie data item B is lower than those of the still image data items. Moreover, since the photographic time point of the still image S4 arrives within the playback time period of the still image S3, the playback time period of this still image S3 becomes between the time point t5 and the time point t6 (that is less than ts). Yet further, since the starting time point of photography of the movie B2 arrives within the playback time period of the still image S5, the playback time period of this still image S5 becomes between the time point t7 and the time point t8 (that is less than ts).

In FIG. 16(*f*), in the section between the time point t2*a* and the time point t3, there is a gap between the still image data item S1 and the movie data item Aa that have been selected. However, as explained in FIG. 16(*c*), the still image data item S1 and the movie data item Aa are edited as data items that follow one another in sequence.

C1-2 (*a*):

The still image simultaneous insertion mode when, in the movie editing mode setting, the combined display mode has been selected in the long time period movie priority mode of the display changeover mode will now be explained with reference to FIG. 17.

The example shown in FIG. 17(*a*) shows a case in which, in a similar manner to the example shown in FIG. 15(*a*), still image data items S1, S2, and S3 that have respective photographic time points t1, t2, and t3 have been selected as editing subject image data items. In this case, the still image data items S1, S2, and S3 are selected by the CPU 104, and are edited as successive data items, so as each to be displayed in succession for the playback time period ts.

The example shown in FIG. 17(*b*) shows a case in which the combined display mode is set in the long time period display mode, and in which the overlapping relationship in the same time band between the movie data item A and the still image data items S1 through S3 is similar to that shown in FIG. 15(*b*). It should be understood that, in this example, the movie data item has a predetermined length of time of photography, and is prioritized over the still image data items. During the interval from the time point t1 to the time point t2, only the still image data item S1 exists. Since in this example the combination display mode is set, the still image data item S1 that does not overlap the image data item A is selected by the CPU 104. In the interval between the time point t2 and the time point t5, the movie data item A that is the long time period movie data item is prioritized over the still image data items S2 and S3, and is selected by the CPU 104.

It should be understood that, since the starting time point of photography of the movie data item A arrives within the playback time period of the still image S1, the playback time period of the still image S1 is shorter than ts.

FIG. 17(c) shows a case in which the combined display mode is set in the long time period display mode, and in which the overlapping relationship in the same time band between the movie data items A and B and the still image data items S1 through S5 is similar to that shown in FIG. 15(d). In this case, the movie item B whose photographic time period is the longest is selected by the CPU 104 during the interval between the time point t1 and the time point t8. In other words, since the photographic time periods of the movie data item A and of the still image data items S1 through S5 are shorter than that of the movie data item B, they are not selected by the CPU 104.

FIG. 17(d) shows a case in which the combined display mode is set in the long time period display mode, and in which the overlapping relationship in the same time band between the movie data items A and B and the still image data items S1 through S5 is similar to that shown in FIG. 15(e) or (f) In this case, between the time point t1 and the time point t7, the movie data item B1 whose photographic time period is the longest is selected by the CPU 104. The movie data item A and the still image data items S1 through S4 are not selected by the CPU 104. At the time point t7 that is the ending time point of photography of the movie data item B1, the still image data item S5 is selected by the CPU 104, and the still image S5 is displayed upon the monitor 105, instead of the movie B1. And, at the time point t8 that is the starting time point of photography of the movie data item B2, the movie data item B2 is selected by the CPU 104, and the movie B2 is displayed upon the monitor 105 during the interval between the time point t8 and the time point t9, instead of the still image data item S5. In other words, since this movie data item B2 and the movie data item A and the still image data items S1 through S5 do not overlap one another, the setting for long time period priority is not applied.

The example shown in FIG. 17(e) shows a case in which the combined display mode is set in the long term priority mode, and the length of time of photography that the movie data item A has between the photographic time points t1 and t5 is longer than the length of time of photography that the movie data item B has between the photographic time points t3 and t6. Moreover, the respective photographic time points of the still image data items S1, S2, and S3 are the time points t2, t4, and t7. In this case, the movie data item A and the movie data item B are overlapped during the interval between the time point t3 and the time point t5. Moreover, the still image data items S1 and S2 are overlapped with the movie data item A at the time point t2 and the time point t4. During the interval between the time point t1 and the time point t6, in a similar manner to the case for FIG. 7(c), the movies A and B are displayed upon the monitor 105 while being changed over by the CPU 104. And, at the time point t7, the still image data item S3 is selected by the CPU 104, and the still image S3 is displayed upon the monitor 105 during the playback time period ts.

It should be understood that, in FIG. 17(e), in the section between the time point t6 and the time point t7, there is a gap between the movie data item B and the still image data item S3 that have been selected. However, as explained in FIG. 16(c), the still image data item S3 is edited as a still image data item that follows on in sequence from the movie data item Bb.

C1-2 (b):

The still image simultaneous insertion mode when, in the movie editing mode setting, the display one only mode has been selected in the long time period movie priority mode of the display changeover mode will now be explained with reference to FIG. 18.

The example shown in FIG. 18(a) shows a case in which, in a similar manner to the example shown in FIG. 15(a), still image data items S1, S2, and S3 that have respective photographic time points t1, t2, and t3 have been selected as editing subject image data items. In this case, the still image data items S1, S2, and S3 are selected by the CPU 104, and are edited as successive data items, so as each to be displayed in succession for the playback time period ts.

The example shown in FIG. 18(b) shows a case in which the display one only mode is set in the long time period display mode of the display changeover mode, and in which the relationship between the movie data item A and the still image data items S1 through S3 is similar to that shown in FIG. 17(b). The movie data item has a predetermined length of time of photography, and is prioritized over the still image data items. Between the time point t1 and the time point t2, only the still image data item S1 is present. Although the display one only mode is set in this example, that is different from the combination display mode of FIG. 17(b), the still image S1 that does not overlap with the image data item A is selected by the CPU 104. In the period between the time point t2 and the time point t5, the movie data item A that is a long time period movie data item is selected by the CPU 104 as a priority over the still image data items S2 and S3. It should be understood that, since the starting time point of photography of the movie data item A arrives within the playback time period of the still image S1, the playback time period of the still image S1 is shorter than the playback time period ts.

The example shown in FIG. 18(c) shows a case in which the display one only mode is set in the long time period display mode of the display changeover mode, and in which the relationship between the movie data items A and B and the still image data items S1 through S5 is similar to that shown in FIG. 17(c). In this case as well, the movie data item B is selected by the CPU 104 during the interval from the time point t1 to the time point t8, in a similar manner to the case in FIG. 17(c).

The example shown in FIG. 18(d) shows a case in which the display one only mode is set in the long time period display mode of the display changeover mode, and in which the relationship between the movie data items A, B1, and B2 and the still image data items S1 through S5 is similar to that shown in FIG. 17(d). In this case as well, in a similar manner to the case with FIG. 17(d), the movie data item B1 whose photographic time period is the longest is selected by the CPU 104 during the period from the time point t1 to the time point t7. Thus, the movie data item A and the still image data items S1 through S4 are not selected by the CPU 104. The movie B1 is displayed upon the monitor 105 by the CPU 104 during the interval from the time point t1 to the time point t7. At the time point t7 that is the ending time point of photography of the movie data item B1, the still image data item S5 is selected by the CPU 104, and the still image S5 is displayed upon the monitor 105, instead of the movie B1. And, at the time point t8 that is the starting time point of photography of the movie data item B2, the movie data item B2 is selected by the CPU 104, and the movie B2 is displayed upon the monitor 105 during the interval from the time point t8 to the time point t9.

It should be understood that, since the starting time point of photography of the movie data item B2 arrives during the playback time period of the still image S5, the playback time period of the still image S5 is shorter than ts.

The example shown in FIG. 18(e) shows a case in which the combined display mode is set in the long time period priority mode of the display changeover mode, and in which the relationship between the movie data items A and B and the still image data items S1 through S3 is similar to that shown in FIG. 17(e). In this case, between the time point t1 and the time point t5, in a similar manner to the case for FIG. 8(c), the movie data item A is selected by the CPU 104, and the movie A is displayed upon the monitor 105 until the time point t5. And, at the time point t7, the still image data item S3 is selected by the CPU 104, and the still image S3 is displayed upon the monitor 105 during the playback time period ts from the time point t7.

It should be understood that, in FIG. 18(e), in the section between the time point t5 and the time point t7, there is a gap between the movie data item A and the still image data item S3 that have been selected. However, as explained in FIG. 16(c), the still image data item S3 is edited as a still image data item that follows on in sequence from the movie data item Ab.

C1-3:

The still image simultaneous insertion mode when the scene start priority mode of the display changeover mode in the movie editing mode setting has been selected will now be explained with reference to FIG. 19.

FIG. 19(a) shows a case in which still image data items S1, S2, and S3 that have respective photographic time points t1, t2, and t3 have been selected as the editing subject data items. In this case, the still image data items S1, S2, and S3 are selected by the CPU 104, and editing is performed so that each of them is displayed in succession for the playback time period ts.

FIG. 19(b) shows a case in which the movie data item A is present during the interval between the photographic time points t2 and t6, and the still image data items S1, S2, and S3 are present at the respective photographic time points t1, t3, and t4. At the time point t1, the still image data item S1 is selected by the CPU 104, and the still image S1 is displayed upon the monitor 105. And, at the time point t2 that is the starting time point of photography of the movie data item A, although the playback time period ts has not elapsed from the time point t1, the movie data item A is selected by the CPU 104 instead of the still image data item S1, and the movie Aa that corresponds to this movie data item Aa is displayed upon the monitor 105. At the time point t3 that is the photographic time point of the still image data item S2, the still image data item S2 is selected by the CPU 104, and the still image S2 is displayed upon the monitor 105, instead of the movie Aa. When the photographic time point t4 of the still image data item S3 arrives before the playback time period ts for the still image S2 has elapsed, the still image data item S3 is selected by the CPU 104. The still image S3 is displayed upon the monitor 105 by the CPU 104 during the photographic time period ts, since no image data item exists whose playback is started subsequently.

FIG. 19(c) shows a case in which the scene start priority mode is set in the display changeover mode, and in which the overlapping relationship in the same time band between the movie data items A and B and the still image data items S1 through S5 is similar to that shown in FIGS. 15(d) and 17(c). At the time point t1, the movie data item B is selected by the CPU 104, and the movie B is displayed upon the monitor 105. At the time point t2, the still image data item S1 is selected by the CPU 104, and the display of the still image S1 upon the monitor 105 is started, instead of the movie B. The still image S1 is displayed over the playback time period ts from the time point t2. At the time point t2a when the playback time period ts has elapsed from the time point t2, since no image data item exists whose playback is to be newly started, no image data item is selected by the CPU 104. When the time reaches the time point t3, the movie data item Ac is selected by the CPU 104, and the movie Ac is displayed upon the monitor 105 continuing on from the still image S1. Subsequently the CPU 104 selects: at the time point t4, the still image data item S2; at the time point t5, the still image data item S3; at the time point t6, the still image data item S4; and, at the time point t7, the still image data item S5.

It should be understood that, since the still image data item S4 is selected by the CPU 104 at the time point t6 during the playback of the still image S3 that has the photographic time point t5, the playback time period of the still image S3 is shorter than the playback time period ts. Moreover, since no image data item exists whose playback is to be started after the time point t8, the still image S5 is displayed by the CPU 104 upon the monitor 105 during the playback time period ts.

FIG. 19(d) shows a case in which the scene start priority mode is set in the display changeover mode, and in which the overlapping relationship in the same time band between the movie data items A and B and the still image data items S1 through S5 is similar to that shown in FIG. 15(e) or (f), or in FIG. 17(d). In this case, in a similar manner to the case shown in FIG. 19(c), the movie data item B1a, the movie data item Aa, and the still image data items S1 through S5 are selected by the CPU 104 in the interval between the time point t1 and the time point t8. And, when the time reaches the time point t8, since this is the starting time point of photography of the movie data item B2, the movie data item B2 is selected by the CPU 104, and the movie B2 is displayed upon the monitor 105 during the interval until the time point t9.

It should be understood that, in FIG. 19(d), in the section between the time point t2a and the time point t3, there is a gap between the still image data item S1 and the movie data item A that have been selected. However, as explained in FIG. 16(c), the still image data item S1 and the movie data item Aa are edited as playback image data items that follow on in sequence.

C1-4:

The still image simultaneous insertion mode when, in the movie editing mode setting, the fixed interval changeover mode of the display changeover mode has been selected will now be explained with reference to FIG. 20. It should be understood that, as previously described, this explanation supposes that the changeover time period for the movie data item is tm.

The example shown in FIG. 20(a) shows a case in which, in a similar manner to the example shown in FIG. 15(a), still image data items S1, S2, and S3 that have respective photographic time points t1, t2, and t3 have been selected as editing subject image data items. In this case, the still image data items S1, S2, and S3 are selected by the CPU 104, and are edited as successive data items, so as each to be displayed in succession for the playback time period ts.

FIG. 20(b) shows a case in which the movie data item A is present during the interval between the photographic time points t2 and t4, while the still image data items S1 and S2 are present at the photographic time points t1 and t3, so that the movie data item A and the still image data item S2 are overlapped within the same time band. At the time point t1, the still image data item S1 is selected by the CPU 104, and the still image S1 is displayed upon the monitor 105. At the time point t2, the movie data item A is selected by the CPU 104, and the movie A is displayed upon the monitor 105. And, at the time point t3, the still image data item S2 is selected by the CPU 104, and the still image S2 is displayed upon the monitor 105, instead of the movie A. Subsequently, this still image data item S2 is playback displayed during the playback time period ts. In other words, the playback time period ts is applied as the display time period for the still image S2 that is overlapped with the movie A.

Figure 20:
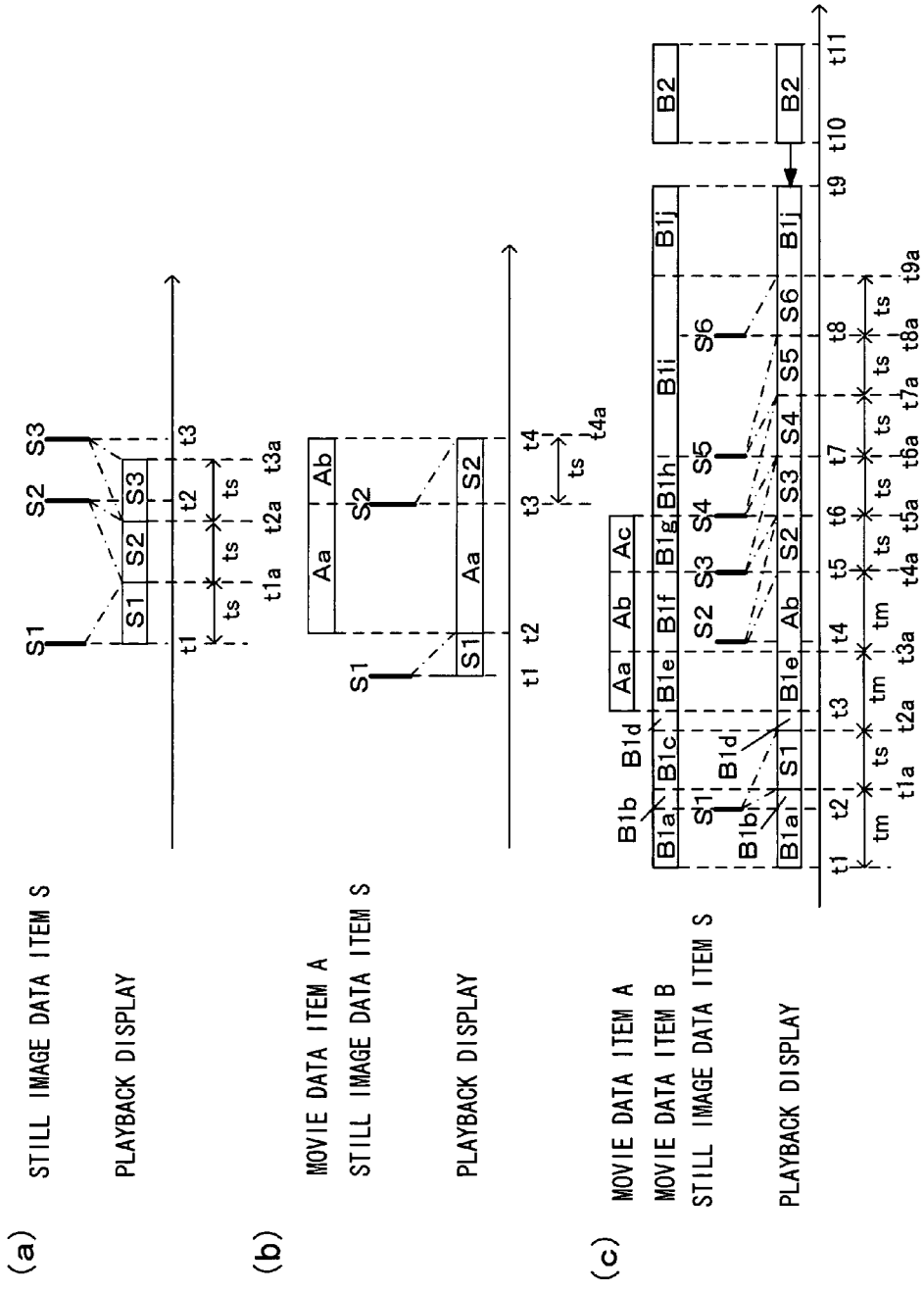
FIG. 20 is a time chart showing movie and still images that are displayed in a fixed interval changeover mode.

In the example shown in FIG. 20(*c*), there are shown a movie data item A, a movie data item B1, a movie data item B2, and still image data items S1 through S6. The photographic time period of the movie data item A is between the time point t3 and the time point t6, while the photographic time period of the movie data item B1 is between the time point t1 and the time point t9. And the photographic time period of the movie data item B2 is between the time point t10 and the time point t11. The respective photographic time points of the still image data items S1, S2, S3, S4, S5, and S6 are the time points t2, t4, t5, t6, t7, and t8. The movie data item A and the movie data item B1 are overlapped between the time point t3 and the time point t6, while the still image data items S1 through S6 and the movie data item B1 are mutually overlapped.

At the time point t1, the movie data item B1 is selected by the CPU 104, and the movie B1 is displayed upon the monitor 105 during the changeover time period tm. At the time point t2 that is the photographic time point of the still image data item S1, the changeover time period tm has not elapsed from the time point t1. Accordingly, the still image data item S1 is not selected by the CPU 104, and the selection of the movie data item B1 is continued. And the movie B1*b* that corresponds to the movie data item B1*b* is displayed upon the monitor 105. At the time point t1*a* at which the changeover time period tm has elapsed from the time point t1, the still image data item S1 whose photographic time point has been reached at the time point t2 is selected by the CPU 104, and, instead of the movie B1*b*, the still image S1 is displayed upon the monitor 105 during the playback time period ts.

At the time point t2*a* at which the playback time period ts has elapsed from the time point t1*a*, the movie data item B1*d* is selected by the CPU 104, and, instead of the still image S1, the movie B1*d* is displayed upon the monitor 105 during the changeover time period tm. And, at the time point t3 that is the starting time point of photography of the movie data item A, the changeover time period tm has not elapsed from the time point t2*a*. Accordingly, the movie data item A is not selected by the CPU 104, but rather the selection of the movie data item B1 is continued. At the time point t3*a* at which the changeover time period tm has elapsed from the time point t2*a*, the movie data item A whose starting time point of photography has been reached at the time point t3 is selected by the CPU 104, and the movie Ab that corresponds to this movie data item Ab is displayed upon the monitor 105 during the changeover time period tm. At the time point t4*a* at which the changeover time period tm has elapsed from the time point t3*a*, the still image data item S2 whose photographic time point has been reached at the time point t4 is selected by the CPU 104, and, instead of the movie Ab, the still image S2 is displayed upon the monitor 105 during the playback time period ts. And, at the time point t5*a* at which the playback time period ts has elapsed from the time point t4*a*, the still image data item S3 whose photographic time point has been reached at the time point t5 is selected by the CPU 104, and the still image S3 is displayed upon the monitor 105 during the playback time period ts.

Then at the time point t7*a* at which the playback time period ts has elapsed from the time point t6*a*, the still image data item S5 whose photographic time point has been reached at the time point t7 is selected by the CPU 104, and the still image S5 is displayed upon the monitor 105 during the playback time period ts. And, the time point t8*a* at which the playback time period ts has elapsed from the time point t7*a*, the still image data item S6 whose photographic time point has been reached at the time point t8 is selected by the CPU 104, and the still image S6 is displayed upon the monitor 105 during the playback time period ts. At the time point t9*a* at which the playback time period ts has elapsed from the time point t8*a*, the movie data item B1*j* is selected by the CPU 104, and the movie B1*j* is displayed upon the monitor 105 until the time point t9. And at the time point t10 the movie data item B2 is selected by the CPU 104, and the movie B2 is displayed upon the monitor 105 until the time point t11.

It should be understood that, in FIG. 20(*c*), in the section between the time point t9 and the time point t10, there is a gap between the movie data item B1 and the movie data item B2 that have been selected. However, as explained in FIG. 16(*c*), the movie data item B1*j* and the movie data item B2 are edited as playback image data items that follow on in sequence.

C1-5:

The still image simultaneous insertion mode when the parallel display mode of the simultaneous display mode in the movie editing mode setting has been selected will now be explained with reference to FIG. 21.

Images corresponding to a plurality of image data items whose dates and times of photography overlap one another in the same time band are displayed in parallel on the monitor 105 in two screens. If three or more image data items are overlapped within the same time band, the two different images that are to be displayed in parallel are selected by actuation of the input device 101. The selection of the images that are displayed in parallel is performed upon a menu screen that is displayed upon the monitor 105, as described above. Moreover, it is also possible to select which of the selected images is to be displayed on the left of the screen of the monitor 105, and which on the right.

In the example explained here, it will be supposed that the photographic time point t100 of some still image data item is a specified time period tr before the starting time point of photography t200 of a movie data item, and that the display of the still image is started from a predetermined time period ta before the movie display, in other words from a time point t300 that is given by (the movie starting time point of photography 200−the predetermined time point ta). And the display screen control before the movie display is performed as follows, according to the relationship between the lengths of the time period tr and the predetermined time period ta.

(a) If the time period tr is longer than the predetermined time period ta, the CPU 104 displays a black screen upon the monitor 105 from the photographic time point t100 until the time point t300. Moreover, the CPU 104 displays a still image that corresponds to the still image data item during the predetermined time period ta from the time point t300 until the movie starting time point of photography t200.

(b) If the time period tr is shorter than the predetermined time period ta, the CPU 104 displays a still image that corresponds to the still image data item during the time period tr from the still image photographic time point t100 until the movie starting time point of photography t200.

Next, the still image simultaneous insertion mode when the parallel display mode of the simultaneous display mode has been selected will be explained in detail with reference to FIG. 21. In FIG. 21, it will be supposed that a setting has been established for movies to be displayed upon the left screen of the monitor 105, and for still images to be displayed upon the right screen of the monitor 105.

In the example shown in FIG. 21(*a*), in a similar manner to the example shown in FIG. 15(*a*), still images S1, S2, and S3 that respectively correspond to still image data items S1, S2, and S3 are displayed by the CPU 104 in a screen on the right of the screen of the monitor 105, while being changed over each time the playback time period ts has elapsed. A black screen is displayed in a screen on the left of the monitor 105.

In the example shown in FIG. 21(*b*), the photographic time period of the movie data item A is the interval between the time point t2 and the time point t5, and the respective photographic time points of the still image data items S1, S2, and S3 are the time points t1, t3, and t4, so that the movie data item A and the still image data items S2 and S3 are mutually overlapped. Moreover, it will be supposed that the time period length tr of the interval between the photographic time point t1 of the still image data item S1 and the starting time point t2 of photography of the movie data item A (that=t2−t1) is shorter than the predetermined time period ta, in other words that (t2−t1<ta). Accordingly, at the time point t1, the still image data item S1 is selected by the CPU 104 as the data item to be displayed on the right of the screen of the monitor 105, and the still image S1 that corresponds to this still image data item S1 is displayed upon the right of its screen. Moreover, a black screen is displayed by the CPU 104 on the left of the screen of the monitor 105.

At the time point t2, the movie data item A is selected by the CPU 104 as the image data item to be displayed upon the left of the screen, and the display on the left screen of the monitor 105 changes over from a black screen to the movie A. And the movie A is displayed by the CPU 104 on the left screen of the monitor 105 until the time point t5 that is the ending time point of photography of the movie data item A. At the time point t3, the still image data item S2 is selected by the CPU 104 as the image data item to be displayed upon the right of the screen, and the display on the right screen of the monitor 105 changes over from the still image S1 to the still image S2. At the time point t4, the still image data item S3 is selected by the CPU 104 as the image data item to be displayed upon the right of the screen, and the display on the right screen of the monitor 105 changes over from the still image S2 to the still image S3. This display by the CPU 104 of the still image S3 on the right of the screen of the monitor 105 is terminated at the time point t5 that is the ending time point of photography of the movie data item A.

In the example shown in FIG. 21(*c*), there are shown movie data items A and B and still image data items S1 through S7. The photographic time period of the movie data item A is the interval between the time point t3 and the time point t6, while the photographic time period of the movie data item B is the interval between the time point t1 and the time point t9. And the respective photographic time points of the still image data items S1 through S7 are the time points t2, t4, t5, t6, t7, t8, and t10. In this case, the movie data items A and B overlap one another between the time point t3 and the time point t6, the still image data items S2 through S3 are overlapped with both of the movie data items A and B, and the still image data items S1 through S6 are overlapped with the movie data item B. Moreover, the time period tr between the photographic time point t2 of the still image data item S1 and the starting time point of photography t3 of the movie data item A (that=t3−t2) is longer than the predetermined time period ta; in other words, (t3−t2>ta). Furthermore, it will be supposed that a setting has been established, by actuation of the input device 101, so that the still images S are to be displayed upon the right screen of the monitor 105, while the movie A is to be displayed upon its left screen.

At the time point t1, the time reaches the starting time point of photography of the movie data item B, but the movie B is not set to be displayed upon the monitor 105. Accordingly, the movie data item B is not selected by the CPU 104. At the time point t2, the time reaches the photographic time point of the still image data item S1, but, since tr>ta, at this time point t2, the still image data item S1 is not selected by the CPU 104. At a time point t2*a* that is a time point the predetermined time period ta before the time point t3, the still image data item S1 is selected by the CPU 104 as the image data item to be displayed at the right of the screen, and the still image S1 is displayed at the right screen of the monitor 105. Moreover, a black screen is displayed at the left screen of the monitor 105.

At the time point t3, the movie data item A is selected by the CPU 104 as the image data item to be displayed at the left of the screen, and the movie A is displayed upon the left screen of the monitor 105. At the time point t4, the still image data item S2 is selected by the CPU 104 as the image data item to be displayed at the right of the screen, and the right screen of the monitor 105 changes over from displaying the still image S1 to displaying the still image S2. Furthermore, at the time point t5, the still image data item S3 is selected by the CPU 104 as the image data item to be displayed at the right of the screen, and the right screen of the monitor 105 changes over from displaying the still image S2 to displaying the still image S3. The still image data items S4 through S7 do not overlap the movie data item A. Accordingly, these still images S are displayed by the CPU 104 upon the right screen of the monitor 105 while being changed over each time the playback time period ts elapses. And, at the time point t6, the display of the movie A by the CPU 104 is terminated. Subsequent to the time point t6, until the time point t9*a* at which the display of the still image S7 on the right of the screen of the monitor 105 ends, a black screen is displayed by the CPU 104 at the left screen of the monitor 105.

In the example shown in FIG. 21(*d*), there are shown a movie data item A, a movie data item B, and still image data items S1 through S5. The photographic time period of the movie data item A is the interval between the time point t3 and the time point t5, while the photographic time period of the movie data item B is the interval between the time point t1 and the time point t8. And the respective photographic time points of the still image data items S1 through S5 are the time points t2, t4, t5, t6, and t7. In this case, the movie data items A and B overlap one another between the time point t3 and the time point t5, and the still image data items S1 through S5 are overlapped with the movie data item B. Moreover, it will be supposed that a setting has been established by actuation of the input device 101, such that the still images S are to be displayed upon the right screen of the monitor 105, while the movie B is to be displayed upon its left screen.

At the time point t1, the movie data item B is selected by the CPU 104 as the image data item to be displayed on the left of the screen, and the movie B is displayed on the left of the screen of the monitor 105. Subsequently, the movie B is displayed by the CPU 104 on the left screen of the monitor 105 until the time point t8. On the other hand, at the time point t1, a black screen is displayed by the CPU 104 on the right screen of the monitor 105. At the time point t2, the still image data item S1 is selected by the CPU 104 as the image data item to be displayed on the right screen, and the still image S1 is displayed upon the right screen of the monitor 105. And, at the time point t4 that is the photographic time point of the still image data item S2, the still image data item S2 is selected by the CPU 104 as the image data item to be displayed upon the right screen, and the display on the right screen of the monitor 105 changes over from the still image S1 to the still image S2. At the time point t5 that is the photographic time point of the still image data item S3, the still image data item S3 is selected by the CPU 104 as the image data item to be displayed upon the right screen, and the display on the right screen of the monitor 105 changes over from the still image S2 to the still image S3. Then, at the time point t6 that is the photographic time point of the still image data item S4, the still image data item S4 is selected by the CPU 104 as the image data item to be displayed upon the right screen, and the display on the right screen of the monitor 105 changes over from the still image S3 to the still image S4. And, at the time point t7 that is the photographic time point of the still image data item S5, the still image data item S5 is selected by the CPU 104 as the image data item to be displayed upon the right screen, and the display on the right screen of the monitor 105 changes over from the still image S4 to the still image S5. Subsequent to the time point t7, the still image S5 is displayed by the CPU 104 on the right screen of the monitor 105, until the time point t8 at which the display of the movie B on the left screen of the monitor 105 ends.

C1-6:

The still image simultaneous insertion mode when the camera priority setting mode in the movie editing mode setting has been selected in the small screen display mode of the simultaneous display mode will now be explained with reference to FIGS. 22 and 23.

If a plurality of image data items are overlapped with one another in the same time band, the CPU 104 selects, as the priority data item, that image data item that has been photographed with the electronic camera 200, which has been selected by the user as the priority camera. The image that corresponds to the image data item that has been selected as the priority data item is displayed by the CPU 104 in a large screen display region upon the monitor 105. And an image of a data item that is not selected as a priority data item is displayed by the CPU 104 in a small screen display region upon the monitor 105.

The selection of the priority camera is made by selecting one of the cameras pull down displayed upon a menu screen that has been displayed upon the monitor 105, as previously described. Moreover, it is possible to establish a setting relating to still images, so that such still images are always playback displayed in the small screen display region. This setting also is performed by actuating the input device 101 from a menu screen that is displayed upon the monitor 105.

Furthermore, if the photographic time point of some still image data item is earlier than the time point that is calculated by (starting time point of photography of a movie data item– the predetermined time period ta), the CPU 104 changes the time point at which the display of this still image starts, in a similar manner to the case of the parallel display mode. However, if a setting is established to perform display of still images in the small screen display region, the CPU 104 starts the display of the still image and the display of the movie at the same time.

Next, the explanation will refer to the concrete examples of FIGS. 22 and 23. In the example shown in FIG. 22(*a*), in a similar manner to the example shown in FIG. 21(*a*), still image data items S1, S2, and S3 are displayed by the CPU 104 in a large screen display region of the monitor 105, while being changed over each time the playback time period ts has elapsed. No small screen display region is displayed upon the monitor 105.

The example shown in FIG. 22(*b*) is one example of a case in which a movie data item has been set as the priority data item, while still image data items have been set as non-priority data items. A case is shown in which the photographic time period of the movie data item A that has been selected as the priority data item is the interval between the time point t3 and the time point t5, while the respective photographic time points of the still image data items S1, S2, S3 and S4 are the time points t1, t3, t4, and t6. Thus, the movie data item A is overlapped with the still image data items S2 and S3. Moreover, the photographic time point t1 of the still image data item S1 is earlier than the time point that is calculated by (the starting time point t2 of photography of the movie data item A—the predetermined time period ta). Accordingly, at the time point t1, the still image S1 is not displayed by the CPU 104 in the large screen display region of the monitor 105. At a time point t2a that is earlier than the time point t2 by just the time period ta, the still image data item S1 is selected by the CPU 104 as the image data item to be displayed in the large screen, and the still image S1 that corresponds to this still image data item S1 is displayed in the large screen display region of the monitor 105. At this time, no display is provided in the small screen display region of the monitor 105.

At the time point t2, the movie data item A is selected by the CPU 104 as the image data item to be displayed in the large screen display region. And the movie A is displayed by the CPU 104 in the large screen display region of the monitor 105, instead of the still image S1. The still image S1 corresponding to the still image data item S1 that has been selected by the CPU 104 as the image data item for small screen display is displayed in the small screen display region of the monitor 105. And, at the time point t3, the still image data item S2 is selected by the CPU 104 as the image data item to be displayed in the small screen display region, and the display in the small screen display region of the monitor 105 changes over from the still image S1 to the still image S2. Moreover, at the time point t4, the still image data item S3 is selected by the CPU 104 as the image data item to be displayed in the small screen display region, and the display in the small screen display region of the monitor 105 changes over from the still image S2 to the still image S3. And, at the time point t5 that is the ending time point of photography of the movie data item A, the display by the CPU 104 of the movie A in the large screen display region of the monitor 105 is terminated. Furthermore, at this time point t5, the display of the small screen display region of the monitor 105 by the CPU 104 is also terminated. At this time, the still image data item S4 whose photographic time point is the time point t6 is selected by the CPU 104 as the image data item for display in the large screen display region. Accordingly, the still image S4 is displayed in the large screen display region of the monitor 105 during the playback time period is from the time point t5, so as to continue on from the movie A.

The example shown in FIG. 22(*c*) is one example of a case in which still image data items have been set as priority data items, while a movie data item has been set as a non-priority data item; and a case is shown in which the overlapping relationship between a movie data item A and still image data items S1 through S4 is similar to that shown in FIG. 22(*b*).

Accordingly, in a similar manner to the case of FIG. 22(*b*), at a time point t2a that is just the time period ta before the time point t2, the still image data item S1 is selected by the CPU 104 as the image data item for large screen display, and the still image S1 that corresponds to this still image data item S1 is displayed in the large screen display region of the monitor 105. The still image S1 is displayed in the large screen display region until the time point t3. At this time, no display is provided in the small screen display region of the monitor 105. And, at the time point t2, the movie data item A is selected by the CPU 104 as the image data item to be displayed in the small screen display region, and the movie A whose priority level is low is displayed in the small screen display region of the monitor 105. This display of the movie A in the small screen display region of the monitor 105 is continued by the CPU 104 until the time point t5 that is the ending time point of photography of this movie data item A. And, after the time point t5, the small screen display region of the monitor 105 is not displayed.

At the time point t3, the still image data item S2 is selected by the CPU 104 as the image data item to be displayed in the large screen display region, and the display in the large screen display region of the monitor 105 changes over from the still image S1 to the still image S2. And, at the time point t4, the still image data item S3 is selected by the CPU 104 as the image data item to be displayed in the large screen display region, and the display in the large screen display region of the monitor 105 changes over from the still image S2 to the still image S3. At a time point t4a at which the playback time period ts has elapsed from the time point t4, the still image data item S4 whose photographic time point is the time point t6 is selected by the CPU 104 as the image data item to be displayed in the large screen display region. Accordingly, until the time point t5a at which the playback time period ts has elapsed from the time point t4a, the still image S4 is displayed in the large screen display region of the monitor 105, so as to continue on from the still image S3.

The example shown in FIG. 22(d) is an example in which a setting has been established for the still images to be always displayed upon the monitor 105 in a small screen display region, and shows a case in which the overlapping relationship between a movie data item A and still image data items S1 through S4 is similar to that shown in FIG. 22(b).

At the time point t1, the still image data item S1 is not selected by the CPU 104. At the time point t2, the movie data item A is selected by the CPU 104 as the image data item to be displayed upon the large screen, and the movie A is displayed in the large screen display region of the monitor 105. Moreover, the still image data item S1 is selected by the CPU 104 as the image data item for display upon the small screen, and the still image S1 is displayed in the small screen display region of the monitor 105. At the time point t3, the still image data item S2 is selected by the CPU 104 as the image data item for display upon the small screen, and the display in the small screen display region of the monitor 105 is changed over from the still image S1 to the still image S2. And, at the time point t4, the still image data item S3 is selected by the CPU 104 as the image data item for display upon the small screen, and the display in the small screen display region of the monitor 105 is changed over from the still image S2 to the still image S3.

At the time point t5 that is the ending time point of photography of the movie data item A, the final frame included in the movie data item A is selected by the CPU 104, and this final frame included in the movie data item A is selected by the CPU 104 is displayed as a still image in the large screen display region of the monitor 105. Here, the movie data item A is an image data item in which a plurality of still image data items succeed one another, and its final frame is the final one of this plurality of still image data items.

On the other hand, the still image data item S4 selected by the CPU 104 as the image data item to be displayed on the small screen at the playback time point that corresponds to the photographic time point t5, and, at this playback time point that corresponds to the photographic time point t5, the still image S4 whose photographic time point is supposed to be the time point t6 is displayed by the CPU 140 upon the monitor 105. This still image S4 is displayed by the CPU 104 in the small screen display region of the monitor 105 during the playback time period ts. At a time point t6a when the playback time period ts has elapsed from the time point t6, the display of the still image S4 by the CPU 104 in the small screen display region of the monitor 105 is terminated. Moreover, the display by the CPU 104 of the final frame of the movie data item A in the large screen display region of the monitor 105 as a still image is also terminated.

The example shown in FIG. 22(e) is one example of a case in which a setting has been established for a movie data item A to be a first priority data item, a movie data item B to be a second priority data item, and still image data items to be non-priority data items. Moreover, this FIG. 22(e) shows a case in which the overlapping relationship between the movie data items A and B and still image data items S1 through S5 is similar to that shown in FIG. 15(d).

At the time point t1, the movie data item B is selected by the CPU 104 as the image data item to be displayed in the large screen display region, and the movie B is displayed in the large screen display region of the monitor 105. At this time, the small screen display region of the monitor 105 is not displayed. At the time point t2 that is the photographic time point of the still image data item S1, the display by the CPU 104 in the large screen display region of the monitor 105 of the movie B whose priority level is the higher is continued. Moreover, at this time point t2, the still image data item S1 is selected by the CPU 104 as the image data item to be displayed in the small screen display region, and the still image S1 is displayed by the CPU 104 in the small screen display region of the monitor 105. And, at the time point t3 that is the starting time point of photography of the movie data item A, the movie data item A is selected by the CPU 104 as the image data item to be displayed in the large screen display region, and the display in the large screen display region of the monitor 105 is changed over to the movie A whose priority is the highest. Moreover, the movie data item B is selected by the CPU 104 as the image data item to be displayed in the small screen display region, and the display of the still image S1 in the small screen display region of the monitor 105 is changed over by the CPU 104 to the movie Bb corresponding to the movie data item Bb that is the second priority data item. In other words, the still image S1 is no longer displayed by the CPU 104.

At the time point t4, the displays by the CPU 104 of the movie A in the large screen display region of the monitor 105 and of the movie Bb in the small screen display region of the monitor 105 are continued. In other words, the still image S2 whose priority level is low is not displayed by the CPU 104 upon the monitor 105. And at the time point t5, the display by the CPU 140 of the movie A in the large screen display region of the monitor 105 is terminated. At this time the CPU 104, along with selecting the movie data item Bc as the image data item to be displayed in the large screen display region, also selects the still image data item S3 as the image data item to be displayed in the small screen display region. As a result, the display by the CPU 104 of the movie A in the large screen display region of the monitor 105 is changed over to the movie Bc corresponding to the movie data item Bc that is the second priority data item. Moreover, the display of the movie Bb in the small screen display region of the monitor 105 is changed over by the CPU 104 to the still image S3. Subsequently, the display by the CPU 104 of the movie Bc whose priority level is the higher in the large screen display region of the monitor 105 is continued.

At the time point t6, the still image data item S4 is selected by the CPU 104 as the image data item to be displayed in the small screen display region, and the display in the small screen display region of the monitor 105 is changed over from the still image S3 to the still image S4. And, at the time point t7, the still image data item S5 is selected by the CPU 104 as the image data item to be displayed in the small screen display region, and the display in the small screen display region of the monitor 105 is changed over from the still image S4 to the still image S5. Finally, at the time point t8 that is the ending time point of photography of the movie data item B, the displays by the CPU 104 of the movie Bc in the large screen display region of the monitor 105, and of the still image S5 in the small screen display region of the monitor 105, are terminated.

The example shown in FIG. 22(*f*) is one example of a case in which a setting has been established for a movie data item A to be a first priority data item, still image data items to be second priority data items, and a movie data item B to be a non-priority data item. The photographic time period of the movie data item A is between the time point t3 and the time point t5, and the photographic time period of the movie data item B1 is between the time point t1 and the time point t7, while the photographic time period of the movie data item B2 is between the time point t9 and the time point t10. Moreover, the respective time points of the still image data items S1, S2, S3, S4, and S5 are the time points t2, t4, t5, t6, and t8. In this case, the movie data items A and B1 overlap one another in the interval between the time point t3 and the time point t5, while the still image data items S1 through S4 are overlapped with the movie data item B1.

At the time point t1, the movie data item B1 is selected by the CPU 104 as the image data item to be displayed in the large screen display region, and playback display of the movie B1*a* that corresponds to the movie data item B1*a* is started in the large screen display region of the monitor 105. At this time, the small screen display region is not displayed upon the monitor 105. At the time point t2, the still image data item S1 is selected by the CPU 104 as the image data item to be displayed in the large screen display region, and the movie data item B1*b* is selected as the image data item to be displayed in the small screen display region. As a result, at the time point t2, the still image S1 that corresponds to the still image data item S1 whose priority level is the higher is displayed by the CPU 104 in the large screen display region of the monitor 105, instead of the movie B1*a*. Moreover, the movie B1*b* is displayed by the CPU 104 in the small screen display region of the monitor 105. At a time point t2*a* at which the playback time period ts has elapsed from the time point t2, the display by the CPU 104 of the still image S1 in the large screen display region of the monitor 105 is terminated. And the movie B1*c* corresponding to the movie data item B1*c* that has been selected by the CPU 104 as the image data item to be displayed in the large screen display region is displayed in the large screen display region of the monitor 105, instead of the still image S1. Furthermore, the display by the CPU 104 of the movie B1*b* in the small screen display region of the monitor 105 is terminated. In other words, the small screen display region is not displayed upon the monitor 105.

At the time point t3, the movie data item A is selected by the CPU 104 as the image data item to be displayed in the large screen display region, and the display in the large screen display region of the monitor 105 is changed over from the movie B1 to the movie A that corresponds to the movie data item A whose priority level is the higher. Subsequently, the movie A is displayed by the CPU 104 in the large screen display region of the monitor 105 until the time point t5 that is the ending time point of photography of this movie data item A. Moreover, at the time point t3, the movie data item B1*d* is selected by the CPU 104 as the image data item to be displayed in the small screen display region, and the movie B1*d* is displayed in the small screen display region of the monitor 105.

At the photographic time point t4 of the still image data item S2 that has been selected as a second priority data item, the still image data item S2 is selected by the CPU 104 as the image data item to be displayed in the small screen display region, and the display in the small screen display region of the monitor 105 is changed over from the movie B1*d* to the still image S2. And, at the time point t5, the display by the CPU 104 of the movie A in the large screen display region of the monitor 105 is terminated. Moreover, since this time point t5 is also the photographic time point of the still image data item S3 that is a second priority data item, the still image data item S3 is selected by the CPU 104 as the image data item to be displayed in the large screen display region, and the still image S3 is displayed in the large screen display region of the monitor 105, instead of the movie Ab. Furthermore, at this time point t5, the movie data item B1*f* is selected by the CPU 104 as the image data item to be displayed in the small screen display region, and the display in the small screen display region of the monitor 105 is changed over by the CPU 104 from the still image S2 to the movie B1*f*. Then at the time point t6 that is the photographic time point of the still image data item S4, the still image data item S4 is selected by the CPU 104 as the image data item to be displayed in the large screen display region, and the display in the large screen display region of the monitor 105 is changed over by the CPU 104 from the still image S3 to the still image S4. Meanwhile, the display by the CPU 104 of the movie B1*f* in the small screen display region of the monitor 105 is continued.

At the time point t7 at which the playback time period ts has elapsed from the time point t6, the still image data item S5 is selected by the CPU 104 as the image data item to be displayed in the large screen display region, and the display of the still image S4 in the large screen display region of the monitor 105 is changed over by the CPU 104 to the still image S5 whose photographic time point is the time point t8. In other words, the still image S5 is edited by the CPU 104 as the playback image that continues on from the still image S4. Moreover, since this time point t7 is the ending time point of photography of the movie data item B1, the display by the CPU 104 of the movie B1*f* in the small screen display region of the monitor 105 is terminated. Furthermore, the movie data item B2 is selected by the CPU 104 as the image data item to be displayed in the small screen display region, and the movie B2 whose starting time point of photography is the time point t9 is displayed in the small screen display region of the monitor 105.

In other words, the CPU 104 brings forward the start of the display of the still image S5, in order to ensure that no time period occurs in which no image is displayed in the large screen display region of the monitor 105. Moreover, along with this bringing forward of the start of display of the still image S5, the CPU 104 also brings forward the starting time point of display of the movie data item B2 from the time point t9 to the time point t7, in order to ensure for a still image not to be displayed in the large screen display region of the monitor 105 by itself.

At the time point t7*a* at which the time period (t10–t9) that is the photographic time period of the movie data item B2 has elapsed from the time point t7, the display by the CPU 104 of the movie B2 in the small screen display region of the monitor 105 is terminated. It should be understood that it is supposed that the time period (t10–t9) is less than ts. Moreover, although the playback time period ts has not elapsed from the time point t7, still the display of the still image S5 by the CPU 104 in the large screen display region of the monitor 105 is terminated. Accordingly, it does not happen than only a still image is displayed in the large screen display region of the monitor 105.

The example shown in FIG. 23(a) is one example of a case in which a setting has been established for still image data items to be first priority data items, a movie data item A to be a second priority data item, and a movie data item B to be a non-priority data item. Moreover, in FIG. 23(a), a case is shown in which the overlapping relationship between the movie data items A, B1, and B2 and the still image data items S1 through S5 is the same as in the case of FIG. 22(f).

In the interval from the time point t1 to the time point t4, in a similar manner to the case for FIG. 22(f), the display by the CPU 104 of images in both the large screen display region and also the small screen display region of the monitor 105 is performed. At the time point t4 that is the photographic time point of the still image data item S2 that is a first priority data item, the still image data item S2 is selected by the CPU 104 as the image data item to be displayed in the large screen display region, and the movie data item Ab is selected as the image data item to be displayed in the small screen display region. As a result, the display by the CPU 104 in the large screen display region of the monitor 105 is changed over from the movie Aa to the still image S2. Moreover, the display by the CPU 104 in the small screen display region of the monitor 105 is changed over from the movie B1d to the movie Ab corresponding to the movie data item Ab that is the second priority data item. Subsequent to the time point t5, display of images is performed by the CPU 104 in both the large screen display region of the monitor 105 and also in its small screen display region, in a similar manner to the case shown in FIG. 22(f).

In the example shown in FIG. 23(b), the photographic time period of the movie data item A that has been selected as the priority data item is the interval between the time point t3 and the time point t5, and the photographic time period of the movie data item B1 is the interval between the time point t1 and the time point t7, while the photographic time period of the movie data item B2 is the interval between the time point t9 and the time point t10. Moreover, the respective time points of the still image data items S1, S2, S3, S4, S5, S6, and S7 are the time points t2, t4, t5, t6, t8, t11, and t12. In this case, the movie data items A and B1 overlap one another in the interval between the time point t3 and the time point t5, while the still image data items S1 through S4 are overlapped with the movie data item B1. Moreover, it will be supposed that a setting has been established for the still images to be displayed in the small screen display region of the monitor 105.

At the time point t1, the movie data item B1a is selected by the CPU 104 as the image data item to be displayed in the large screen display region, and the movie B1a is displayed in the large screen display region of the monitor 105. At this time, the small screen display region is not displayed upon the monitor 105. At the time point t2, the still image data item S1 is selected by the CPU 104 as the image data item to be displayed in the small screen display region, and the still image S1 is displayed in the small screen display region of the monitor 105. The display by the CPU 104 of the movie B1 in the large screen display region of the monitor 105 is continued. Even when the playback time period ts has elapsed from the time point t2, the display by the CPU 104 of the still image S1 in the small screen display region of the monitor 105 is continued. At the time point t3 that is the starting time point of photography of the movie data item A that is the first priority data item, the movie data item A whose priority level is higher than that of the movie data item B is selected by the CPU 104 as the image data item to be displayed in the large screen display region, and the display in the large screen display region of the monitor 105 is changed over by the CPU 104 from the movie B1 to the movie A. At this time, in the small screen display region of the monitor 105, the display is continued of the still image S1 corresponding to the still image data item S1 that has been selected by the CPU 104 as the image data item to be displayed in this small screen display region.

At the time point t4, the still image data item S2 is selected by the CPU 104 as the image data item to be displayed in the small screen display region, and the display by the CPU 104 in the small screen display region of the monitor 105 is changed over from the still image S1 to the still image S2. It should be understood that the display by the CPU 104 of the movie A in the large screen display region of the monitor 105 is continued. At the time point t5 that is the ending time point of photography of the movie data item A, the movie data item B1e is selected by the CPU 104 as the image data item to be displayed in the large screen display region, and the display by the CPU 104 in the large screen display region of the monitor 105 is changed over from the movie Ab to the movie B1e. Moreover, since this time point t5 is the photographic time point of the still image data item S3, the still image data item S3 is selected by the CPU 104 as the image data item to be displayed in the small screen display region, and the display by the CPU 104 in the small screen display region of the monitor 105 is changed over from the still image S2 to the still image S3. And similarly, at the time point t6, the display by the CPU 104 in the small screen display region of the monitor 105 is changed over from the still image S3 to the still image S4. It should be understood that the display by the CPU 104 of the movie B1e in the large screen display region of the monitor 105 is continued. At the time point t7 that is the ending time point of photography of the movie data item B1, the display by the CPU 104 of the movie B1e in the large screen display region of the monitor 105 is terminated. Moreover, the display of the still image S4 in the small screen display region of the monitor 105 is terminated by the CPU 104 at the time point t7.

At the time point t8, the time reaches the photographic time point of the still image data item S5. However, since the starting time point of photography of the movie data item B2 is the time point t9 and the time period (the time point t9–the time point t8) is shorter than the predetermined time period ta, the still image S5 that corresponds to the still image data item S5 is not selected by the CPU 104. When the time reaches the time point t9 that is the starting time point of photography of the movie data item B2, the movie data item B2 is selected by the CPU 104 as the image data item to be displayed in the large screen display region, and the still image data item S5 is selected as the image data item to be displayed in the small screen display region. As a result, the movie B2 is displayed by the CPU 104 in the large screen display region of the monitor 105, while the still image S5 is displayed in the small screen display region of the monitor 105.

Subsequent to the time point t9, at the time point t9a at which the playback time period ts has elapsed, the still image S6 that has the photographic time point t11 is displayed by the CPU 104 in the small screen display region of the monitor 105. And, at the time point t10a at which the playback time period ts has elapsed from the time point t9a, the still image S7 that has the photographic time point t12 is displayed by the CPU 104 as the image in the small screen display region of the monitor 105. Then, at the time point t11*a* at which the playback time period ts has elapsed from the time point t10*a*, the display of the still image S7 in the small screen display region of the monitor 105 by the CPU 104 is terminated. Moreover, in the large screen display region of the monitor 105, at the time point t10, the time reaches the ending time point of photography of the movie data item B2. However, since the display of the still images S5, S6, and S7 in the small screen display region of the monitor 105 is continued, the final frame of the movie data item B2 continues to be displayed as a still image by the CPU 104, as the display image in the large screen display region of the monitor 105. This still image is displayed by the CPU 104 in the large screen display region of the monitor 105, until the time point t11*a* at which the display of the still image S7 in the small screen display region of the monitor 105 ends.

By doing this, the image data items that are selected after the time point t9 as display images in the large screen display region and in the small screen display region are edited so that, on each of the screens, to be displayed as continuing on from the images that end at the time point t7.

C1-7:

The still image simultaneous insertion mode when the scene start priority mode of the simultaneous display mode in the movie editing mode setting has been selected will now be explained with reference to FIG. 24. In this mode setting, if a plurality of data items are mutually overlapped in the same time band, an image that corresponds to the image data item whose starting time point is the latest is displayed in the large screen region of the monitor 105. In other words, when the time reaches the starting time point of that image data item whose starting time point of photography is the latest, the CPU 104 displays an image that corresponds to that image data item whose starting time point of photography is the latest in the large screen display region of the monitor 105. Moreover, the CPU 104 displays the image that, up until now, was being displayed in the large screen display region of the monitor 105, in the small screen display region of the monitor 105. In other words, the display in the large screen display region of the monitor 105 is changed over to display of the image whose starting time point of photography is the latest.

In the example that is explained here, it will be supposed that some still image data item exists having a photographic time point t400 that is more early than the time period tr before a movie data item that has a starting time point of photography t500. And display screen control before movie display is performed as follows, according to the relationship between the lengths of the time period tr and the playback time period ts.

(a) If the time period tr is longer than the predetermined playback time period ts, the CPU 104 displays the still image that corresponds to the still image data item during the playback time period ts, from a time point t600 that is calculated (the starting time point of photography t500–the playback time period ts), to the movie starting time point of photography t500.

(b) If the time period tr is shorter than the predetermined playback time period ts, the CPU 104 displays the still image that corresponds to the still image data item during the time period tr from the still image photographic time point t400 to the movie starting time point of photography t500.

Next, the still image simultaneous insertion mode when the scene start priority mode of the simultaneous display mode has been selected will be explained in detail with reference to FIG. 24. In the case shown in FIG. 24(*a*), in a similar manner to the case shown in FIG. 22(*a*), still image data items S1, S2, and S3 are displayed by the CPU 104 in the large screen display region of the monitor 105, while being changed over each time the playback time period ts has elapsed. No small screen display region is displayed upon the monitor 105.

FIG. 24(*b*) shows a case in which the relationship of the movie data item A and the still image data items S1 through S4 is similar to that of FIG. 22(*b*). It should be understood that it will be supposed that the time period tr, that=(t2–t1), is less than ts. At the time point t1, the still image data item S1 is selected by the CPU 104 as the image data item to be displayed in the large screen display region, and display of the still image S1 in the large screen display region of the monitor 105 is started. The small screen display region upon the monitor 105 is not displayed. At the time point t2 that is the starting time point of photography of the movie data item A, the movie data item Aa is selected by the CPU 104 as the image data item to be displayed in the large screen display region, and the display in the large screen display region of the monitor 105 is changed over from the still image S1 to the movie Aa. Moreover, the still image data item S1 is selected by the CPU 104 as the image data item to be displayed in the small screen display region, and the still image S1 is displayed in the small screen display region of the monitor 105. At the time point t3 that is the photographic time point of the still image data item S2, this still image data item S2 is selected as the image data item to be displayed in the large screen display region, and the playback display in the large screen display region of the monitor 105 is changed over from the movie Aa to the still image S2. Moreover, the movie data item Ab is selected by the CPU 104 as the image data item to be displayed in the small screen display region, and the display in the small screen display region of the monitor 105 is changed over by the CPU 104 from the still image S1 to the movie Ab.

At the time point t4 that is the starting time point of photography of the still image data item S3, the still image data item S3 is selected by the CPU 104 as the image data item to be displayed in the large screen region, and the display in the large screen display region of the monitor 105 is changed over by the CPU 104 from the still image S2 to the still image S3. The display of the movie Ab in the small screen display region of the monitor 105 by the CPU 104 is continued. And, at the time point t5 that is the ending time point of photography of the movie data item A, the display of the movie Ab in the small screen display region of the monitor 105 is terminated by the CPU 104. Subsequently, the small screen display region is not displayed upon the monitor 105. Moreover, the display of the still image S3 in the large screen display region of the monitor 105 by the CPU 104 is continued. At the time point t4*a* at which the playback time period ts has elapsed from the time point t4, the still image data item S4 whose photographic time point is the time point t6 is selected by the CPU 104 as the image data item to be displayed in the large screen display region of the monitor 105. In other words, the image data items are edited so that the display is changed over from the still image S3 to the still image S4 continuously at the time point t4. Subsequently, the still image S4 is displayed by the CPU 104 in the large screen display region of the monitor 105 until the playback time period ts elapses.

FIG. 24(*c*) shows a case in which the relationship of the movie data item A and the still image data items S1 through S4 is similar to that of FIG. 24(*b*). It will be supposed that the time period tr, that=(t2–t1), is greater than ts. Although the time reaches the photographic time point of the still image data item S1 at the time point t1, display of the still image S1 that corresponds to the still image data item S1 is not started by the CPU 104, since (t2–t1)>ts as described above. At the time point t1*a* that is just the playback time period ts earlier than the time point t2 (i.e. that equals t2−ts), the still image data item S1 is selected by the CPU 104 as the image data item to be displayed in the large screen display region, and display of the still image S1 in the large screen display region of the monitor 105 is started. Moreover, the small screen display region on the monitor 105 is not displayed. Subsequent to the time point t2, the images that are displayed in both the large screen display region and the small screen display region of the monitor 105 are changed over by the CPU 104 in a similar manner to the case shown in FIG. 24(*b*).

In the example shown in FIG. 24(*d*), the photographic time period of the movie data item A is the interval between the time point t3 and the time point t5, the photographic time period of the movie data item B1 is the interval between the time point t1 and the time point t8, and the photographic time period of the movie data item B2 is the interval between the time point t10 and the time point t11. Moreover, the respective photographic time points of the still image data items S1, S2, S3, S4, S5, and S6 are the time points t2, t4, t5, t6, t7, and t9. In this case, between the time point t3 and the time point t5, the movie data items A and B1 are mutually overlapped, and the still image data items S1 through S5 are overlapped with the movie data item B1.

At the time point t1, the movie data item B1 is selected by the CPU 104 as the image data item to be displayed in the large screen display region, and the display of the movie B1 in the large screen display region of the monitor 105 is started by the CPU 104. At this time, the small screen display region is not displayed upon the monitor 105. At the time point t2, the still image data item S1 is selected by the CPU 104 as the image data item to be displayed in the large screen display region, and the display in the large screen display region of the monitor 105 is changed over by the CPU 104 from the movie B1 to the still image S1. Moreover, the movie data item B1*b* is selected by the CPU 104 as the image data item to be displayed in the small screen display region, and the display of the movie B1*b* that corresponds to this movie data item B1*b* in the small screen display region of the monitor 105 is started. At the time point t2*a* at which the playback time period ts has elapsed from the time point t2, the movie data item B1*c* is selected by the CPU 104 as the image data item to be displayed in the large screen display region, and the display in the large screen display region of the monitor 105 is changed over by the CPU 104 from the still image S1 to the movie B1*c*. Moreover, the display of the movie B1*b* in the small screen display region of the monitor 105 is terminated by the CPU 104. In other words, the small screen display region is not displayed upon the monitor 105.

At the time point t3 that is the starting time point of photography of the movie data item A, the movie data item Aa is selected by the CPU 104 as the image data item to be displayed in the large screen display region, and the display in the large screen display region of the monitor 105 is changed over by the CPU 104 from the movie B1*c* to the movie Aa. Moreover, the movie data item B1*d* is selected by the CPU 104 as the image data item to be displayed in the small screen display region, and the movie B1*d* is displayed by the CPU 104 in the small screen display region of the monitor 105. At the time point t4 that is the photographic time point of the still image data item S2, the still image data item S2 is selected by the CPU 104 as the image data item to be displayed in the large screen display region, and the display in the large screen display region of the monitor 105 is changed over by the CPU 104 from the movie Aa to the still image S2. Moreover, the movie data item Ab is selected by the CPU 104 as the image data item to be displayed in the small screen display region, and the display in the small screen display region of the monitor 105 is changed over by the CPU 104 from the movie B1*d* to the movie Ab. At the time point t5 that is the photographic time point of the still image data item S3, the still image data item S3 is selected by the CPU 104 as the image data item to be displayed in the large screen display region, and the display in the large screen display region of the monitor 105 is changed over by the CPU 104 from the still image S2 to the still image S3. Furthermore, since the time point t5 is the ending time point of photography of the movie data item A, the display of the movie Ab in the small screen display region of the monitor 105 by the CPU 104 is terminated. Moreover, this region is changed over to display of the movie B1*f*.

At the photographic time point t6 that is the photographic time point of the still image data item S4, the still image data item S4 is selected by the CPU 104 as the image data item to be displayed in the large screen display region, and the display in the large screen display region of the monitor 105 is changed over by the CPU 104 from the still image S3 to the still image S4. At this time, the display of the movie B1*f* in the small screen display region of the monitor 105 by the CPU 104 is continued. And, at the photographic time point t7 that is the photographic time point of the still image data item S5, the still image data item S5 is selected by the CPU 104 as the image data item to be displayed in the large screen display region, and the display in the large screen display region of the monitor 105 is changed over by the CPU 104 from the still image S4 to the still image S5. At this time, the display of the movie B1*f* in the small screen display region of the monitor 105 by the CPU 104 is still continued.

At the time point t8 that is the ending time point of photography of the movie data item B1, the display of the movie B1*f* in the small screen display region of the monitor 105 is terminated by the CPU 104. Subsequently, the small screen display region of the monitor 105 is not displayed. Moreover, the display of the still image S5 in the large screen display region of the monitor 105 by the CPU 104 is continued until a time point t7*a* at which the playback time period ts has elapsed from the time point t7. At this time point t7*a*, the still image data item S6 is selected by the CPU 104, so that, in the large screen display region of the monitor 105, the display is changed over by the CPU 104 to the still image S6 corresponding to this still image data item S6 whose photographic time point is the time point t9. And, at the time point t8*a* at which the playback time period ts has elapsed from the time point t8, the movie data item S2 is selected, so that, in the large screen display region of the monitor 105, the display is changed over by the CPU 104 from the still image S6 to the movie B2 whose photographic time point is the time point t10. This movie B2 whose display has been started at the time point t9*a* is displayed by the CPU 104 in the large screen display region of the monitor 105 until the time period (t11−t10) has elapsed.

C2: The Movie Before or after Aggregated Mode

The movie before or after aggregated mode includes two modes: a pre-insertion mode and a post-insertion mode. In the pre-insertion mode, if a movie data item and a still image data item overlap one another in the same time band, the CPU 104 displays the still image that corresponds to the still image data item before starting the display of the movie that corresponds to the movie data item. Moreover, if a movie data item and a plurality of still image data items overlap one another in the same time band, the CPU 104 displays all of the still images that correspond to the still image data items together, before starting the display of the movie that corresponds to the movie data item. FIG. 25(*a*) shows a case in which a movie data item A and two still image data items S1 and S2 are mutually overlapped. The still images S1 and S2 that correspond to the still image data items S1 and S2 are displayed by the CPU 104 upon the monitor 105, before starting the display of the movie A that corresponds to the movie item A. At this time, the display time period for each of the still images S1 and S2 is the playback time period ts.

And, in the post-insertion mode, if a movie data item and a still image data item overlap one another in the same time band, the CPU 104 displays the still image that corresponds to the still image data item after ending the display of the movie that corresponds to the movie data item. Moreover, if a movie data item and a plurality of still image data items overlap one another in the same time band, the CPU 104 displays all of the still images that correspond to the still image data items together, after ending the display of the movie that corresponds to the movie data item. FIG. 25(b) shows a case in which, similarly to the case of FIG. 25(a), a movie data item A and two still image data items S1 and S2 are mutually overlapped. The still images S1 and S2 that correspond to the still image data items S1 and S2 are displayed by the CPU 104 upon the monitor 105, after ending the display of the movie A that corresponds to the movie item A. At this time, the display time period for each of the still images S1 and S2 is the playback time period ts.

C3: The Program Before or after Aggregated Mode

The program before or after aggregated mode includes three modes: a pre-insertion mode, a post-insertion mode, and a pre-and-post-insertion mode. In the pre-insertion mode, a temporally discontinuous, i.e. discrete, plurality of different movie data items are gathered together by the CPU 104, and a single program is created by joining them together successively in time sequence. And, if a movie data item and a still image data item included in the program that has been generated overlap one another in the same time band, the CPU 104 displays the still image that corresponds to the still image data item before starting the display of the program. Moreover, if a movie data item and a plurality of still image data items included in the program that has been generated overlap one another, the CPU 104 displays all of the plurality of still images together, before starting the display of the program.

In FIG. 26(a), a case is shown in which a program X that has been created on the basis of the movie data items A, B, and C and still image data items S1 and S2 are overlapped. The still images S1 and S2 that correspond to the still image data items S1 and S2 are displayed by the CPU 104 upon the monitor 105, before starting the display of the program. At this time, the display time period for each of the still images S1 and S2 is the playback time period ts.

In the post-insertion mode, if a program that has been created by editing processing of a plurality of movie data items and a still image data item overlap one another in the same time band, the CPU 104 displays the still image that corresponds to the still image data item, after ending the display of the program. And, if a movie data item included in a program and a plurality of still image data items overlap one another, the CPU 104 displays all of the still images that correspond to the still image data items together, after starting the display of the program. FIG. 26(b) shows a case in which, similarly to the case of FIG. 26(a), a program X that has been created on the basis of movie data items A, B, and C and two still image data items S1 and S2 are mutually overlapped. The still images S1 and S2 that correspond to the still image data items S1 and S2 are displayed by the CPU 104 upon the monitor 105, after ending the display of the program. At this time, the display time period for each of the still images S1 and S2 is the playback time period ts.

In the pre-and-post-insertion mode, if a program that has been created by editing processing of a plurality of movie data items and one or more still image data items overlap one another in the same time band, the CPU 104 displays the still images that correspond to the still image data items all together, both before starting the display of the program and after ending that display. FIG. 26(c) shows a case in which, similarly to the case of FIG. 26(a), a program X that has been created on the basis of movie data items A, B, and C and two still image data items S1 and S2 are mutually overlapped. The still images S1 and S2 that correspond to the still image data items S1 and S2 are displayed by the CPU 104 upon the monitor 105, before starting the display of the program. Moreover, these still still images S1 and S2 are also displayed by the CPU 104 after ending the display of the program. At this time, the display time period for each of the still images S1 and S2 is the playback time period ts.

Next, the editing processing for image data items accompanied by audio data items will be explained.

—Audio Editing Processing—

In the audio editing processing, when performing editing processing of image data items that are accompanied by audio, a setting is made as to which audio accompanying which image data items should be played back. This audio editing processing includes a movie audio setting mode and a still image audio setting mode. In the movie audio setting mode, the audio of a movie image data item accompanied by audio is played back by the CPU 104 through the speaker 106 via the speaker interface 109. This setting is performed by actuation of the input device 101 upon a menu screen that is displayed upon the monitor 105. Similarly, in the still image audio setting mode, the audio of a still image data item accompanied by audio is played back by the CPU 104 through the speaker 106 via the speaker interface 109. And, in a similar manner, this setting is performed by actuation of the input device 101 upon a menu screen that is displayed upon the monitor 105.

—The Movie Audio Setting Modes—

The movie audio setting modes include an audio priority mode and a non-audio priority mode. These modes are set by actuation of the input device 101 and selection from a menu screen that is displayed upon the monitor 105.

(1) The Audio Priority Mode

In the audio priority mode, the audio of a movie image data item accompanied by audio to be played back through the speaker 106 is selected on the basis of the electronic camera 200 with which this movie image data item was photographed. In other words, an audio data item of a movie image data item accompanied by audio that was photographed with the electronic camera 200 selected by the user as the priority camera is set as a priority data item. And the CPU 104 plays back the audio of this priority data item through the speaker 106 via the speaker interface 109. The selection of the priority camera is made on a menu screen that has been displayed on the monitor 105 by selecting from cameras that are so-called pull down displayed, as shown in FIG. 3(b).

The example shown in FIG. 27(a) is an example in which, with regard to the image priorities, still image data items are set as first priority data items and movie data items are set as second priority data item, and, with regard to the audio priorities, a movie data item B is set as an audio priority data item. With regard to the images to be displayed upon the monitor 105, the display is to be performed with the movies A, B1, and B2 and the still images S being changed over by the CPU 104 as previously described with reference to FIG. 15(e).

In this case, since the audio priority data item is the movie data item B, accordingly the audio Bv corresponding to the audio data item Bv that accompanies the movie data item B is played back through the speaker 106 by the CPU 104 in the interval between the time point t1 and the time point t9. In other words, only the audio Bv that accompanies the movie data item B that is a priority data item is played back, and the audio that accompanies the movie data item A and the still image data items S is not played back.

(2) The Non-Audio Priority Mode

In the non-audio priority mode, the audio that accompanies a movie image data item that is being playback displayed upon the monitor 105 is played back through the speaker 106. In other words, when the CPU 104 changes over the image that is displayed upon the monitor 105, the audio that is played back through the speaker 106 is also changed over to the audio corresponding to the audio data item accompanying the image data item to which this changeover has been made. Moreover, when the display is changed over from a movie to a still image, the CPU 104 plays back through the speaker 106 the audio that corresponds to the audio data item accompanying the movie data item before the changeover.

The example shown in FIG. 27(*b*) is also an example in which, with regard to the image priorities, still image data items are set as first priority data items and movie data items are set as second priority data items, and, with regard to the audio priorities, a movie data item B is set as an audio priority data item. With regard to the images to be displayed upon the monitor 105, the display is to be performed with the movies A, B1, and B2 and the still images S being changed over by the CPU 104 as previously described with reference to FIG. 15(*e*).

In this case, the audio corresponding to the audio data item B1*v* that accompanies the movie data item B1 is played back by the CPU 104 in the interval between the time point t1 and the time point t3. And, at the time point t2, the display is changed over by the CPU 104 to the still image S1. At this time, the audio B1*v* corresponding to the audio data item B1*v* that accompanies the movie data item B1 continues to be played back through the speaker 106. At the time point t3, the movie that is displayed on the monitor 105 is changed over by the CPU 104 to the movie A. Accordingly, with regard to the audio that is played back through the speaker 106 by the CPU 104 as well, this is changed over to the audio Av corresponding to the audio data item Av that accompanies the movie data item A. This playback of the audio Av corresponding to the audio data item Av that accompanies the movie data item A is continued by the CPU 104 until the time point t5. At the time point t5, the playback is changed over by the CPU 104 to playback of the audio B1*v* corresponding to the audio data item B1*v* that accompanies the movie data item B1. This playback of the audio B1*v* corresponding to the audio data item B1*v* that accompanies the movie data item B1 is continued by the CPU 104 until the time point t7.

—The Still Image Audio Setting Modes—

The still image audio setting modes include still image audio on mode and a still image audio off mode. These modes are set by actuation of the input device 101 and selection from a menu screen that is displayed upon the monitor 105.

(1) The Still Image Audio ON Mode

In the still image audio ON mode, if there is an audio data item that accompanies some still image data item, the CPU 104 plays back this audio through the speaker 106 via the speaker interface 109.

Figure 28:
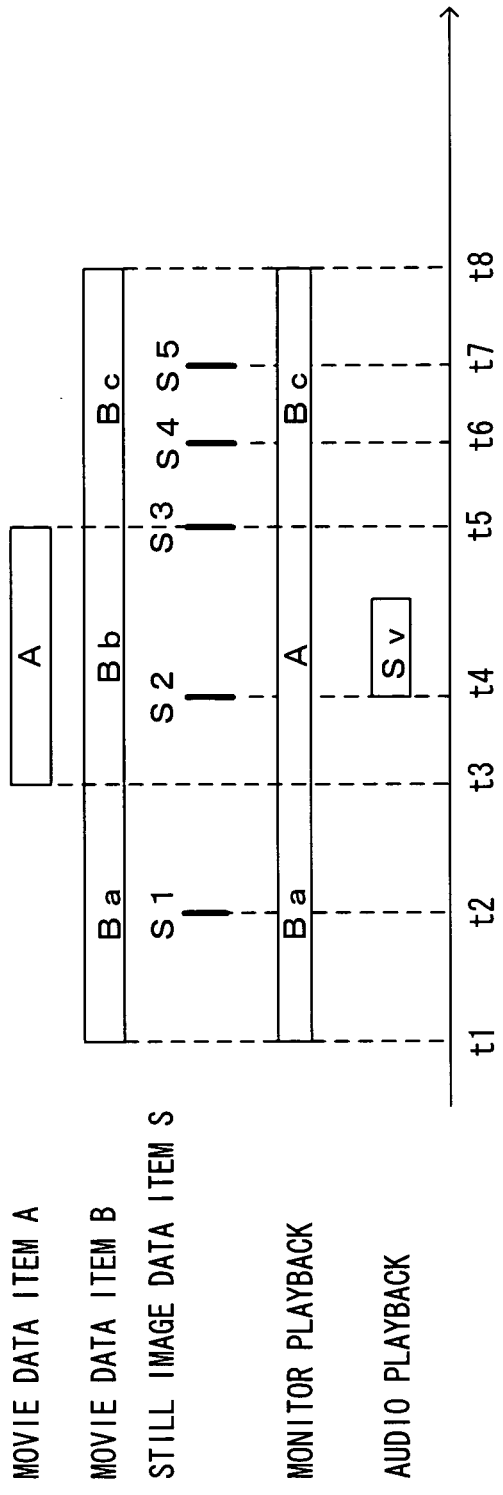
FIG. 28 is a timing chart showing audio that is played back in a still image audio setting mode.

The example shown in FIG. 28 is an example in which, with regard to the image priorities, still image data items are set as first priority data items and movie data items are set as second priority data items, and, with regard to the audio priorities, a still image data item S2 is set in the still image audio ON mode as an audio priority data item. With regard to the images to be displayed upon the monitor 105, the display is to be performed with the movies A and B being changed over by the CPU 104 as previously described with reference to FIG. 15(*d*).

It will be supposed that, at this time, an audio data item Sv accompanies the still image data item S2. At the time point t4 that is the photographic time point of the still image data item S2, the audio Sv corresponding to this audio data item Sv that accompanies the still image data item S2 is played back by the CPU 104. It should be understood that, at this time point t4, if an audio data item is appended to some movie data item, the audio Sv corresponding to this audio data item Sv that accompanies the still image data item S2 is played back by the CPU 104 by being superimposed over the audio corresponding to this audio data item that accompanies the movie data item.

(2) The Still Image Audio OFF Mode

In the still image audio OFF mode, even if an audio data item accompanies some still image data item, the audio corresponding to this audio data item is still not played back through the speaker 106.

Next, the image editing processing performed by the image processing device 100 described above will be explained using the flow charts shown in FIGS. 29 through 32. A program that performs the various processes shown in FIGS. 29 through 32 is stored in a memory (not shown in the figures) within the CPU 104. This program is started, and is executed by the CPU 104, when a signal is input by actuation of the input device 101 for starting the application. Each of the steps shown in FIGS. 29 through 32 is a process that is executed on the basis of commands by the CPU 104.

In a step S1, an image data item is read from the HDD 102, and then the flow of control proceeds to a step S2. In this step S2, a decision is made as to whether or not audio editing processing is being performed. If the editing mode of audio editing processing is set, an affirmative decision is made in this step S2 and the flow of control proceeds to a step S3. In this step S3, the subroutine of FIG. 30 for audio editing mode setting processing that will be described hereinafter is read out, and the editing mode of audio editing processing is set. When the processing in this subroutine ends, the flow of control proceeds to a step S4. But, if the editing mode of audio editing processing is not set, a negative decision is made in the step S2, and the flow of control skips the step S3 and jumps straight to the step S4.

In this step S4, a decision is made as to whether or not still image editing processing is being performed. If the editing mode of still image editing processing is set, an affirmative decision is made in this step S4 and the flow of control proceeds to a step S5. In this step S5, the subroutine of FIG. 31 for still image editing mode setting processing that will be described hereinafter is readout, and the editing mode of still image editing processing is set. When the processing in this subroutine ends, the flow of control proceeds to a step S6. But, if the editing mode of still image editing processing is not set, a negative decision is made in the step S4, and the flow of control skips the step S5 and jumps straight to the step S6.

In this step S6, a decision is made as to whether or not movie editing processing is being performed. If the editing mode of movie editing processing is set, an affirmative decision is made in this step S6 and the flow of control proceeds to a step S7. In this step S7, the subroutine of FIG. 32 for movie editing mode setting processing that will be described hereinafter is read out, and the editing mode of movie editing processing is set. When the processing in this subroutine ends, the flow of control proceeds to a step S8. But, if the editing mode of movie editing processing is not set, a negative decision is made in the step S6, and the flow of control skips the step S7 and jumps straight to the step S8.

In the step S8, on the basis of the various editing modes that have been set in the step S3, the step S5, and the step S7, the various types of image data item editing processing described above are executed and a data item for playback is created, and then the flow of control proceeds to a step S9. In this step S9, an image is displayed upon the monitor 105 using the data item for playback that was created in the step S8, and then this processing series terminates.

Figure 29:
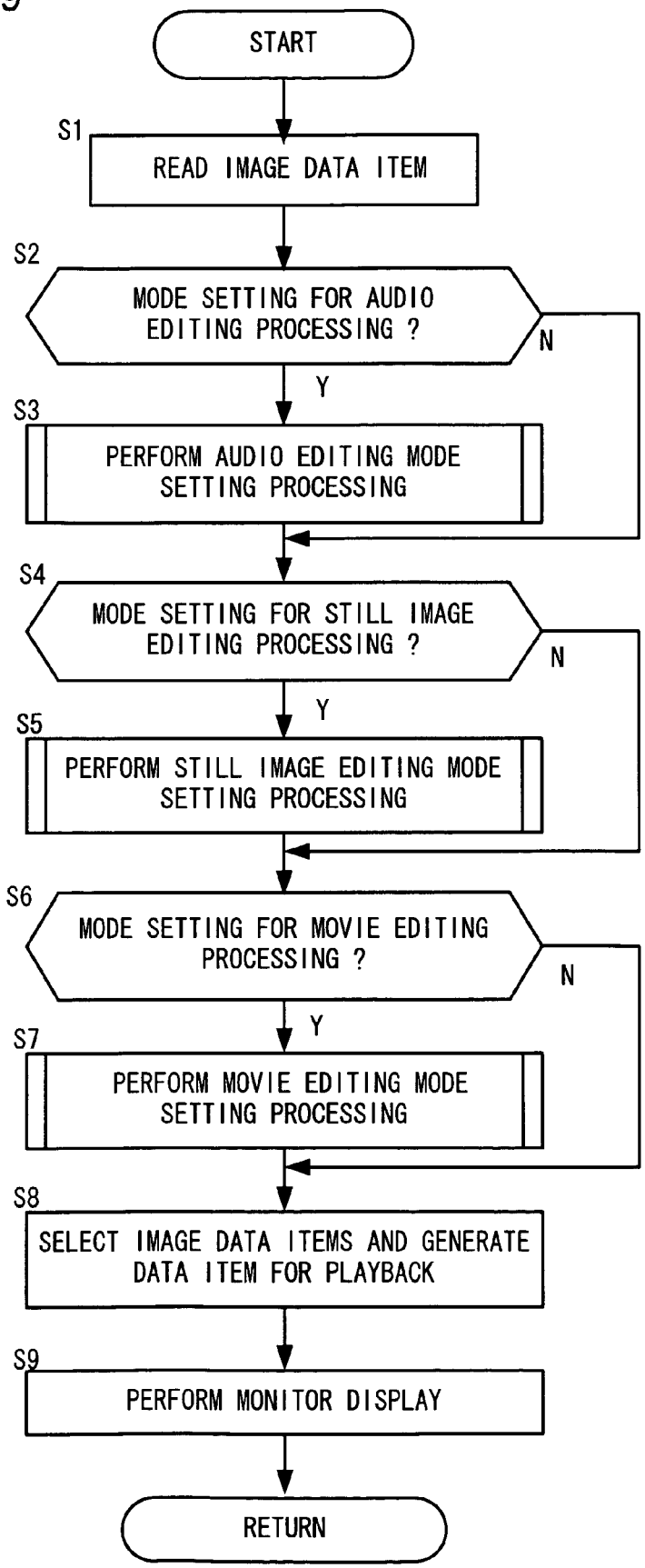
FIG. 29 is a flow chart for explanation of various processes during image editing according to an embodiment.
Figure 30:
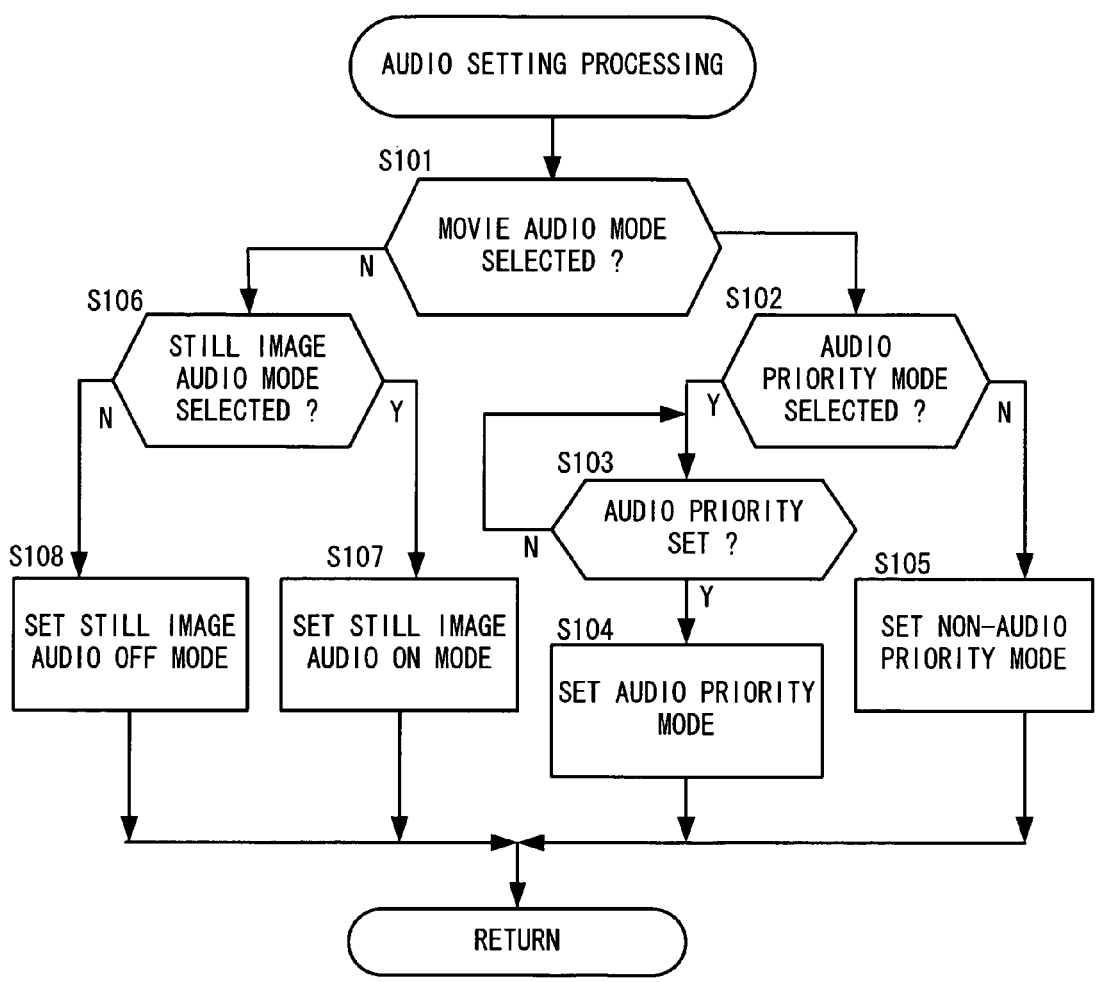
FIG. 30 is a flow chart for explanation of various processes during audio editing processing.

The audio editing mode setting processing in the step S3 of FIG. 29 will now be explained using the flow chart shown in FIG. 30.

In a step S101, a decision is made as to whether or not the movie audio mode is being selected. If the movie audio mode is being selected, an affirmative decision is made in this step S101 and the flow of control proceeds to a step S102. But if the movie audio mode is not being selected, in other words if the still image audio mode is being selected, a negative decision is made in this step S101 and the flow of control is transferred to a step S106.

In the step S102, a decision is made as to whether or not the audio priority mode is being selected. If the audio priority mode is being selected, an affirmative decision is made in this step S102 and the flow of control proceeds to a step S103. But if the audio priority mode is not being selected, a negative decision is made in this step S102 and the flow of control is transferred to a step S105. In the step S105 the non-audio priority mode is set, and then the processing for this subroutine ends and the flow of control returns back to the calling point.

In the step S103, a decision is made as to whether or not the selection of audio priority has ended. If a movie data item is selected to be taken as audio priority, an affirmative decision is made in this step S103 and the flow of control proceeds to a step S104. In this step S104, the audio priority mode is set, and then the processing for this subroutine ends and the flow of control returns back to the calling point. But if a movie data item is not selected to be taken as audio priority, a negative decision is made in this step S103, and this step S103 is repeated.

If the still image audio setting is being selected in the step S101, the flow of control proceeds to the step S106. In this step S106, a decision is made as to whether or not the still image audio ON mode is being selected. If the still image audio ON mode is being selected, an affirmative decision is made in this step S106 and the flow of control proceeds to a step S107. In this step S107, the still image audio ON mode is set, and then the processing for this subroutine ends and the flow of control returns back to the calling point. But if the still image audio ON mode is not being selected, in other words if the still image audio OFF mode is being selected, a negative decision is made in this step S106 and the flow of control proceeds to a step S108. In this step S108, the still image audio OFF mode is set, and then the processing for this subroutine ends and the flow of control returns back to the calling point.

Figure 31:
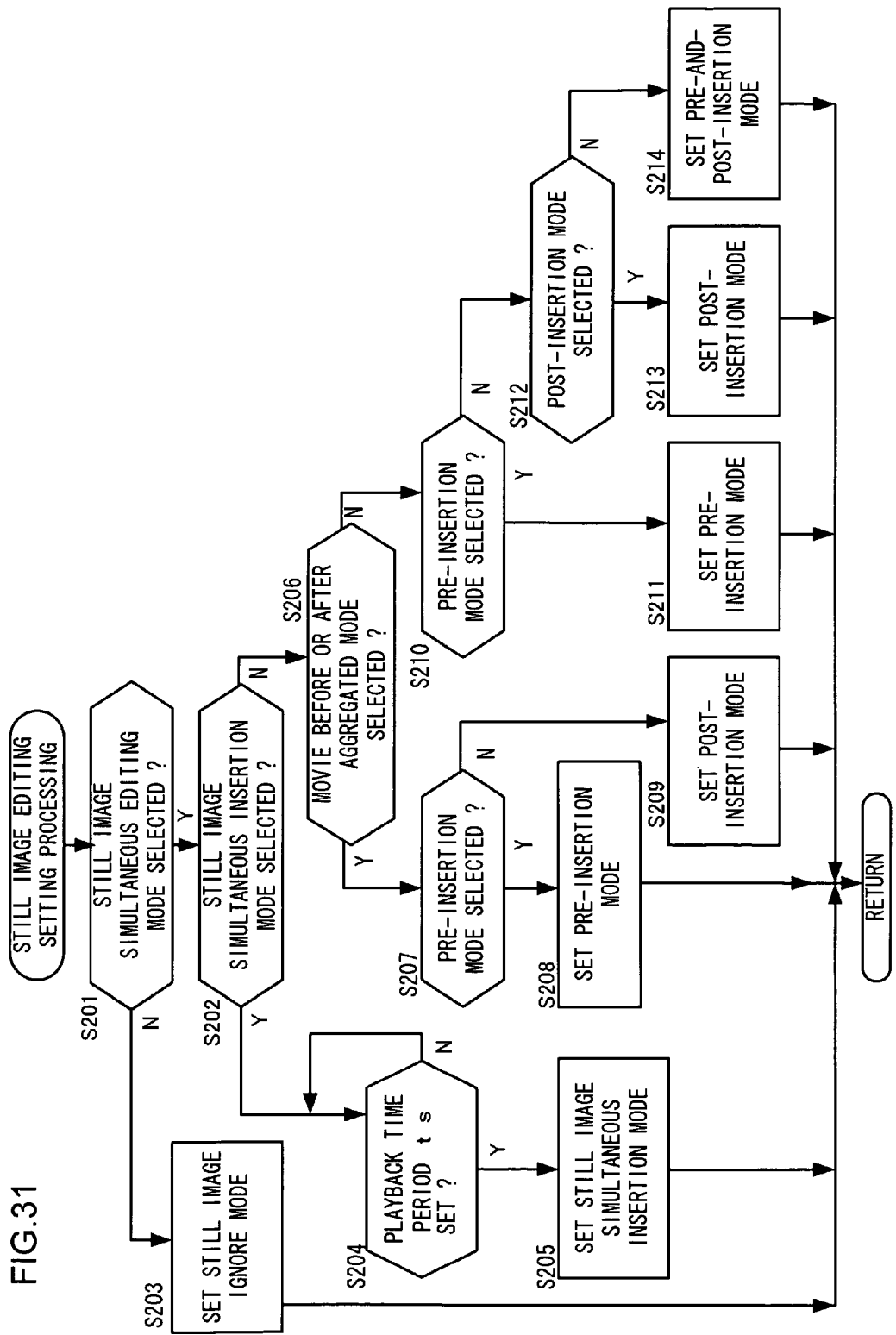
FIG. 31 is a flow chart for explanation of various processes during still image editing processing.

The still image editing mode setting processing in the step S5 of FIG. 29 will now be explained using the flow chart shown in FIG. 31.

In a step S201, a decision is made as to whether or not the still image simultaneous editing mode is being selected. If the still image simultaneous editing mode is being selected, an affirmative decision is made in this step S201 and the flow of control proceeds to a step S202. But if the still image simultaneous editing mode is not being selected, in other words if the still image ignore mode is being selected, a negative decision is made in this step S201 and the flow of control is transferred to a step S203. In the step S203, the still image ignore mode is set, and then the processing for this subroutine ends, and the flow of control returns back to the calling point.

In the step S202, a decision is made as to whether or not the still image simultaneous insertion mode is being selected. If the still image simultaneous insertion mode is being selected, an affirmative decision is made in this step S202 and the flow of control proceeds to a step S204. But if the still image simultaneous insertion mode is not selected, a negative decision is made in this step S202 and the flow of control is transferred to a step S206.

In the step S204, a decision is made as to whether or not the playback time period ts for still images has been set. If the playback time period ts has been set, an affirmative decision is made in this step S204 and the flow of control proceeds to a step S205. In this step S205, the still image simultaneous insertion mode is set, and then the processing for this subroutine ends, and the flow of control returns back to the calling point. But if the playback time period ts is not set, a negative decision is made in the step S204, and this step S204 is repeated until the playback time period ts is set.

If in the step S202 the still image simultaneous insertion mode is not being selected, the flow of control is transferred to the step S206. In this step S206, a decision is made as to whether or not the movie before or after aggregated mode is being selected. If the movie before or after aggregated mode is being selected, an affirmative decision is made in this step S206 and the flow of control proceeds to a step S207. But if the movie before or after aggregated mode is not being selected, in other words if the program before or after aggregated mode is being selected, a negative decision is made in the step S206, and the flow of control is transferred to a step S210.

In the step S204, a decision is made as to whether or not the pre-insertion mode is being selected. If the pre-insertion mode is being selected, an affirmative decision is made in this step S207 and the flow of control proceeds to a step S208. In this step S208, the pre-insertion mode in the movie before or after aggregated mode is set, and then the processing for this subroutine ends, and the flow of control returns back to the calling point. But if the pre-insertion mode is not being selected, in other words if the post-insertion mode is being selected, a negative decision is made in the step S207, and the flow of control is transferred to a step S209. In this step S209, the post-insertion mode in the movie before or after aggregated mode is set, and then the processing for this subroutine ends, and the flow of control returns back to the calling point.

If, in the step S206, the program before or after aggregated mode is being selected, the flow of control is transferred to the step S210. In this step 210, a decision is made as to whether or not the pre-insertion mode is selected. If the pre-insertion mode is being selected, an affirmative decision is made in this step S210 and the flow of control proceeds to a step S211. In this step S211, the pre-insertion mode in the program before or after aggregated mode is set, and then the processing for this subroutine ends, and the flow of control returns back to the calling point. But if the pre-insertion mode is not being selected, a negative decision is made in the step S210, and the flow of control is transferred to a step S212.

In the step S212, a decision is made as to whether or not the post-insertion mode is being selected. If the post-insertion mode is being selected, an affirmative decision is made in this step S212 and the flow of control proceeds to a step S213. In this step S213, the post-insertion mode in the movie before or after aggregated mode is set, and then the processing for this subroutine ends, and the flow of control returns back to the calling point. But if the post-insertion mode is not being selected, in other words if the pre-and-post-insertion mode is being selected, a negative decision is made in the step S212, and the flow of control is transferred to a step S214. In this step S214, the pre-and-post-insertion mode in the movie before or after aggregated mode is set, and then the processing for this subroutine ends, and the flow of control returns back to the calling point.

Figure 32:
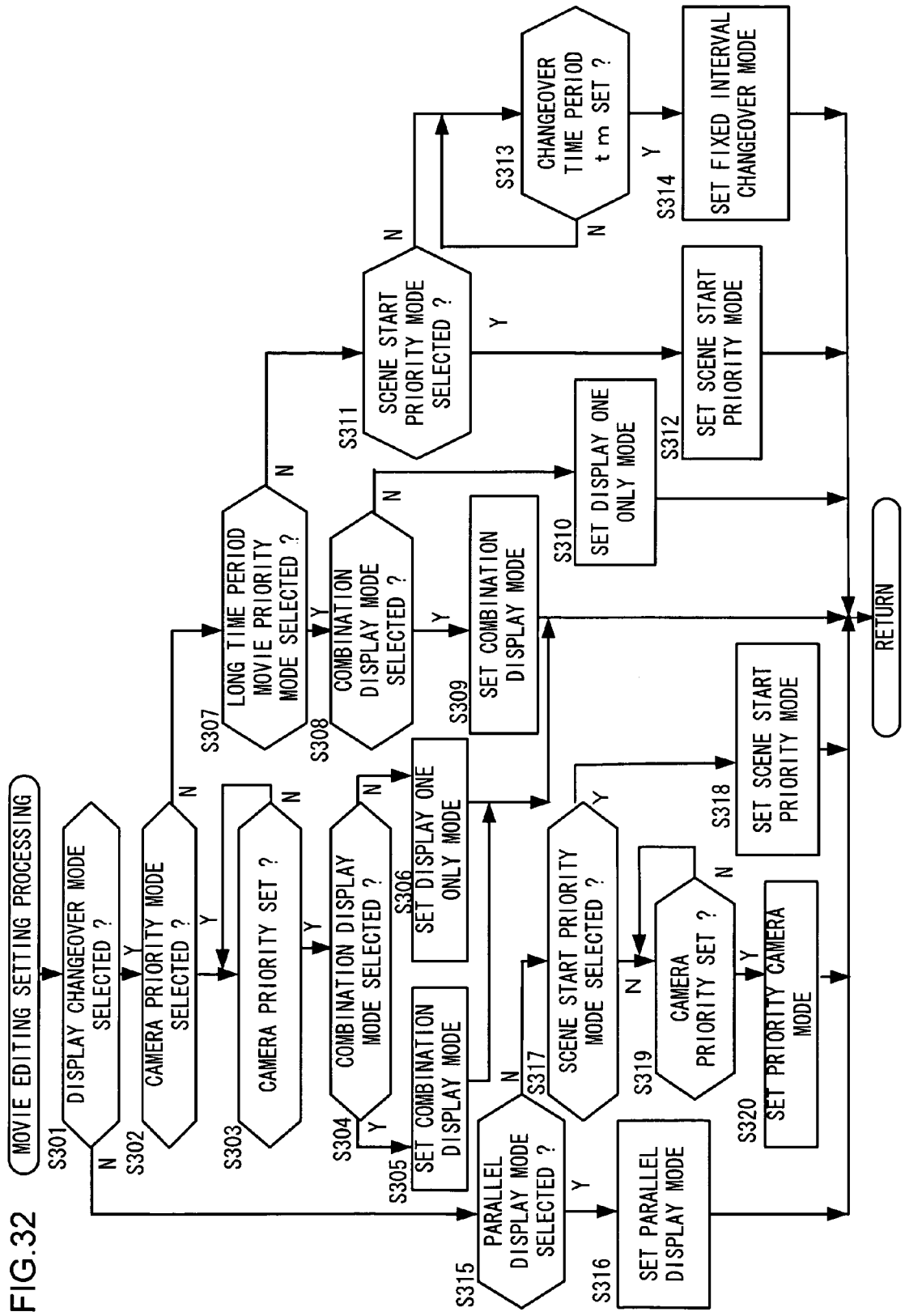
FIG. 32 is a flow chart for explanation of various processes during movie editing processing.

The movie editing mode setting processing in the step S7 of FIG. 29 will now be explained using the flow chart shown in FIG. 32.

In a step S301, a decision is made as to whether or not the display changeover mode is selected. If the display changeover mode is selected, an affirmative decision is made in this step S301 and the flow of control proceeds to a step S302. But if the display changeover mode is not selected, in other words if the simultaneous display mode is selected, a negative decision is made in this step S301 and the flow of control is transferred to a step S315.

In the step S302, a decision is made as to whether or not the camera priority setting mode is selected. If the camera priority setting mode is being selected, an affirmative decision is made in this step S302 and the flow of control proceeds to a step S303. But if the camera priority setting mode is not being selected, a negative decision is made in this step S302 and the flow of control is transferred to a step S307.

In the step S303, a decision is made as to whether or not a setting of a priority camera has been performed. If the setting of a priority camera has been performed, an affirmative decision is made in this step S303 and the flow of control proceeds to a step S304. But if the setting of a priority camera has not been performed, a negative decision is made in this step S303 and this step S303 is repeated until the setting of a priority camera is performed.

In the step S304, a decision is made as to whether or not the combined display mode is being selected. If the combined display mode is being selected, an affirmative decision is made in this step S304 and the flow of control proceeds to a step S305. In this step S305, the combined display mode of the camera priority setting mode is set, and then the processing for this subroutine ends, and the flow of control returns back to the calling point. But if the combined display mode is not being selected, in other words if the display one only mode is being selected, a negative decision is made in this step S304 and the flow of control is transferred to a step S306. In this step S306, the display one only mode of the camera priority setting mode is set, and then the processing for this subroutine ends, and the flow of control returns back to the calling point.

If in the step S302 the camera priority setting mode is not being selected, the flow of control is transferred to the step S307. In this step S307, a decision is made as to whether or not the long time period movie priority mode is being selected. If the long time period movie priority mode is being selected, an affirmative decision is made in this step S307 and the flow of control proceeds to a step S308. But if the long time period movie priority mode is not being selected, a negative decision is made in this step S307 and the flow of control is transferred to a step S311.

In the step S308, a decision is made as to whether or not the combined display mode is being selected. If the combined display mode is being selected, an affirmative decision is made in this step S308 and the flow of control proceeds to a step S309. In this step S309, the combined display mode of the long time period movie priority mode is set, and then the processing for this subroutine ends, and the flow of control returns back to the calling point. But if the combined display mode is not being selected, in other words if the display one only mode is being selected, a negative decision is made in this step S308 and the flow of control is transferred to a step S310. In this step S310, the display one only mode of the long time period movie priority mode is set, and then the processing for this subroutine ends, and the flow of control returns back to the calling point.

If in the step S307 the long time period movie priority mode is not being selected, the flow of control is transferred to the step S311. In this step S311, a decision is made as to whether or not the scene start priority mode is being selected. If the scene start priority mode is being selected, an affirmative decision is made in this step S311 and the flow of control proceeds to a step S312. In this step S312, the scene start priority mode is set, and then the processing for this subroutine ends, and the flow of control returns back to the calling point. But if the scene start priority mode is not being selected, in other words if the fixed interval changeover mode is being selected, a negative decision is made in this step S311 and the flow of control is transferred to a step S313.

In the step S313, a decision is made as to whether or not the changeover time period tm has been set. If the changeover time period tm is set, an affirmative decision is made in this step S313 and the flow of control proceeds to a step S314. But if the changeover time period tm is not set, a negative decision is made in this step S313, and this step S313 is repeated until the changeover time period tm is set. In the step S314, the fixed interval changeover mode is set, and then the processing for this subroutine ends, and the flow of control returns back to the calling point.

If in the step S301 the simultaneous display mode is being selected, the flow of control is transferred to the step S315. In this step S315, a decision is made as to whether or not the parallel display mode is being selected. If the parallel display mode is being selected, an affirmative decision is made in this step S315 and the flow of control proceeds to a step S316. In this step S316, the parallel display mode is set, and then the processing for this subroutine ends, and the flow of control returns back to the calling point. But if the parallel display mode is not being selected, in other words if the small screen display mode is being selected, a negative decision is made in this step S315 and the flow of control is transferred to a step S317.

In this step S317, a decision is made as to whether or not the scene start priority mode is selected. If the scene start priority mode is being selected, an affirmative decision is made in this step S317 and the flow of control proceeds to a step S318. In this step S318, the scene start priority mode in the small screen display mode is set, and then the processing for this subroutine ends, and the flow of control returns back to the calling point. But if the scene start priority mode is not being selected, in other words if the camera priority setting mode is selected, a negative decision is made in this step S317 and the flow of control is transferred to a step S319.

In the step S319, in a similar manner to the step S303, a decision is made as to whether or not a setting of a priority camera has been performed. If the setting of a priority camera has been performed, an affirmative decision is made in this step S319 and the flow of control proceeds to a step S320. But if the setting of a priority camera has not been performed, a negative decision is made in this step S319 and this step S319 is repeated until the setting of a priority camera is performed. In the step S320, the camera priority setting mode in the small screen display mode is set, and then the processing for this subroutine ends, and the flow of control returns back to the calling point.

According to the image processing device of the embodiment explained above, the following beneficial operational effects are obtained.

(1) The CPU 104 refers to the EXIF information and the tag information of each of the plurality of image data items that have been read into the HDD 102 from the plurality of electronic cameras 200, and extracts, from among the plurality of image data items, those image data items whose dates and times of photography overlap one another within the same time band. And the CPU 104 generates a data item for playback by editing these image data items that it has extracted. Then the CPU 104 displays this data item for playback upon the monitor 105. At this time, the CPU 104 selects the image data items according to the editing mode from among the plurality of image data items, according to the editing mode that the user has set by actuation of the input device 101. Accordingly the convenience of use is enhanced, since, when the user is editing or appreciating images or the like, it becomes unnecessary for an image to be displayed upon the monitor 105 by manual actuation by the user, from among the plurality of images whose dates and times of photography are mutually overlapped within the same time band.

(2) As one editing mode, there is provided the camera priority setting mode. In the camera priority setting mode, from among the plurality of images whose dates and times of photography are mutually overlapped within the same time band, the CPU 104 selects those image data items that have been selected as priority data items, in other words those image data items that have been acquired by the camera whose priority level is the highest. Accordingly, since the images that have been photographed by the electronic camera 200 that has been selected by the user as the priority camera are displayed upon the monitor 105, therefore it is possible to prevent some desired image being omitted from the editing process, when the user is editing images.

(3) As one editing mode, the long time period movie priority mode is provided. In this long time period movie priority mode, the CPU 104 selects, from the plurality of image data items that have been extracted, the image data item whose playback time period is the longest. Since thus the image whose playback time period is the longest, and that accordingly contains the most information, is displayed upon the monitor 105, it is possible for the user to obtain various types of information when editing images.

(4) The scene start priority mode is provided in the editing mode. In this scene start priority mode, the CPU 104 selects, from among a plurality of data items whose dates and times of photography overlap one another in the same time band, the image data item whose starting time point of photography is the latest time point. Accordingly, it is possible for the user to obtain novel information when editing images, since the image displayed upon the monitor 105 is the one that contains the newest information, differing from that up until now.

(5) The fixed interval changeover mode is provided as one among the editing modes. In this fixed interval changeover mode, the CPU 104 changes over which image data item is selected, among a plurality of data items whose dates and times of photography overlap one another in the same time band, at fixed intervals. In other words, in the same time band, the CPU 104 selects different image data items from the image data item that was selected during some fixed interval, during fixed intervals that are different from that fixed interval. It should be understood that the fixed interval is the changeover time period tm if a movie data item is selected, and is the playback time period ts if a still image data item is selected. Accordingly it is possible for the user to obtain information of various types when editing images, since the display upon the monitor 105 is changed over between a plurality of different images at fixed intervals.

(6) The small screen display mode in the simultaneous display mode is provided as one among the editing modes. In this small screen display mode, the CPU 104 displays images corresponding to a plurality of image data items that have been extracted in screens upon the monitor 105 of two sizes: in a large screen display region, and in a small screen display region of a predetermined small range. In this case, the CPU 104 displays an image corresponding to the image data item that has been photographed with the electronic camera 200 to which the highest priority level has been assigned in the large screen display region upon the monitor 105. Moreover, the CPU 104 displays an image corresponding to the image data item that has been photographed with the electronic camera 200 to which a lower priority level has been assigned in the small screen display region upon the monitor 105. Thus, since a desired image or a very important scene or the like is displayed in the large screen display region of the monitor 105 by the user selecting the camera that has photographed its image, the task of editing becomes simple when the user is editing images. Moreover, this feature can also be used for viewing.

(7) Furthermore, during the small screen mode setting of the simultaneous display mode, it would also be acceptable to do the following. That is, if the dates and times of photography of some image data item and of an image data item that has been photographed with a camera whose priority level is high do not overlap one another, the CPU 104 displays an image corresponding to the image data level that has been photographed with the camera whose priority level is low in the large screen display region of the monitor 105. Accordingly, it is possible to prevent the state of affairs occurring in which no image is displayed in the large screen display region of the monitor 105.

(8) In the small screen display mode of the simultaneous display mode, it is possible to select either movie priority or still image priority. If movie priority has been selected, the CPU 104 selects a movie data item from among the plurality of image data items that have been extracted, and displays the movie corresponding to that movie data item that has been selected in the large screen display region of the monitor 105. However, if still image priority has been selected, the CPU 104 selects a still image data item from among the plurality of image data items, and displays the still image corresponding to which still image data item in the large screen display region of the monitor 105. Accordingly, the convenience to the user when editing images is enhanced, since he is able to display either the movie or the still image in the large screen display region of the monitor 105, as he wishes.

(9) The scene start priority mode is provided in the small screen display mode of the simultaneous display mode. In this scene start priority mode, the CPU 104 compares the starting time points of photography of a plurality of data items that have been extracted, on the basis of their EXIF information or their tag information. As a result of this comparison, the CPU 104 displays the image corresponding to the data item whose starting time point of photography is the latest in the large screen display region of the monitor 105. Moreover, the CPU 104 displays the image corresponding to that data item whose starting time point of photography is the earliest in the small screen display region of the monitor 105. Accordingly, when the user is editing the images, the editing task is simple, since the image that has new information, different from what has been available up until the present, is displayed in the large screen display region of the monitor 105. Moreover, this feature can also be used for viewing.

(10) The movie before or after aggregated mode is provided as one of the editing modes. In this movie before or after aggregated mode, the CPU 104 has extracted a movie data item and a plurality of still image data items, it displays the still images corresponding to the plurality of still image data items upon the monitor 105, before starting the display of the movie that corresponds to the movie data item, or after that display ends. Accordingly, when the user is performing image editing, the task of editing becomes simple, since the movie and the still images are not displayed upon the monitor 105 while being mixed together.

(11) The program before or after aggregated mode is provided as one of the editing modes. In this program before or after aggregated mode, the CPU 104 generates one continuous program by bringing together a plurality of different movie data items, in other words of discrete movie data items. Moreover, if the dates and times of photography of a movie data item and a plurality of still image data items that make up the program overlap one another in the same time band, the CPU 104 displays the still images corresponding to the plurality of still image data items upon the monitor 105, before starting the display of the program, or after that display ends. Accordingly, when the user is performing image editing, the task of editing becomes simple, since the program and the still images are not displayed upon the monitor 105 while being mixed together.

(12) The mode in which the audio of movie is played back is provided as one of the editing modes. In this mode, when the CPU 104 extracts a still image data item and a movie data item that is accompanied by audio, along with displaying the still image that corresponds to this still image data item upon the monitor 105, it also plays back the audio corresponding to this movie data item that is accompanied by audio through the speaker 106. The audio that is played back at this time is the audio corresponding to the movie data item accompanied by audio that has been photographed by a camera designated by the user. Accordingly, since it is possible for the user to select the audio that he desires to be played back, it is possible to play back audio according to the wishes of the user, or audio that is matched to the concept when editing.

(13) Moreover, in this mode in which the audio of movie is played back, there is provided a non-audio priority mode. In this mode, when the CPU 104 extracts a still image data item and a movie data item that is accompanied by audio, when displaying the still image that corresponds to this still image data item on the monitor 105, directly before starting the display of the still image, the CPU 104 plays back through the speaker 106 the audio corresponding to this movie data item accompanied by audio, which has been displayed upon the monitor 105. Accordingly, if very important information is included in the audio corresponding to this movie data item accompanied by audio, it is possible for the user to obtain the desired information while performing the editing task, since it is possible reliably to play back this audio.

(14) The mode in which the audio of still images is played back, in other words the still image audio priority mode, is provided. In this mode, when the CPU 104 extracts a still image data item that is accompanied by audio and a movie data item, along with displaying the movie item that corresponds to this movie data item on the monitor 105, the CPU 104 plays back through the speaker 106 the audio corresponding to this still image data item accompanied by audio. Accordingly, if very important information is included in the audio corresponding to this still image data item accompanied by audio, it is possible for the user to obtain the desired information while performing the editing task, since it is possible reliably to play back this audio.

The embodiment described above may be varied in the following ways.

(1) As an image editing mode, it would also be acceptable to add a short time period movie setting mode. In this short time period movie setting mode, a setting is made as to whether or not movies that correspond to movie data items, the photographic time periods of which are less than some certain time period, should be displayed upon the monitor 105. This setting is performed by the user performing selection setting actuation upon a menu screen. This short time period movie setting mode includes a short time period movie utilize mode and a short time period movie ignore mode. When the short time period movie utilize mode is set, the CPU 104 selects all movie data items, irrespective of the lengths of their photographic time periods; in other words, it selects all movie data items, however short the photographic time periods of those movie data items may be. By contrast, when the short time period movie ignore mode is selected, the CPU 104 does not select any movie data item whose total photographic time period is less than the certain time period. Moreover, the CPU 104 also does not select any movie data item for which the result of the movie editing processing or the still image editing processing explained with reference to the above embodiment is that the remaining photographic time period is less than the certain time period. In other words, a movie whose time period to be displayed is short is not displayed by the CPU 104 upon the monitor 105. It should be understood that the certain predetermined time period for the short time period ignore mode can be set by the user from a menu screen.

(2) It would also be acceptable, in the movie editing processing or the still image editing processing, for the CPU 104 to generate a sound effect and to play this sound effect back through the speaker 106, when the plurality of images to be displayed upon the monitor 105 is changed over. It will be supposed that whether or not this sound effect corresponding to changeover of the images is to be played back or not, is set by the user from a menu screen upon the monitor 105.

(3) It would also be acceptable to add a short time period movie priority mode to the display changeover mode of the movie editing processing. In this case, it will be supposed that this short time period movie priority mode also includes a combination display mode and a display one only mode. It should be understood that, if such a short time period movie priority mode is provided, a check box "short time period movie priority mode" should be provided on the menu screen of FIG. 3, so that this mode can be selected by user actuation. In the following, each of the combination display mode and the display one only mode will be explained.

(3-1) The Combination Display Mode

The combination display mode of the short time period movie priority mode will now be explained with reference to FIG. 33. Among a plurality of movie data items overlap one another within the same time band, the CPU 104 finds that movie data item whose photographic time period is the shortest, and, when the time reaches this photographic time point, the selection is changed over to this movie data item. It should be understood that, in the following explanation, it will be supposed that the information relating the starting time point of photography, the ending time point of photography, and the length of time of photography is recorded in a similar manner to the case of the embodiment described above.

Figure 33:
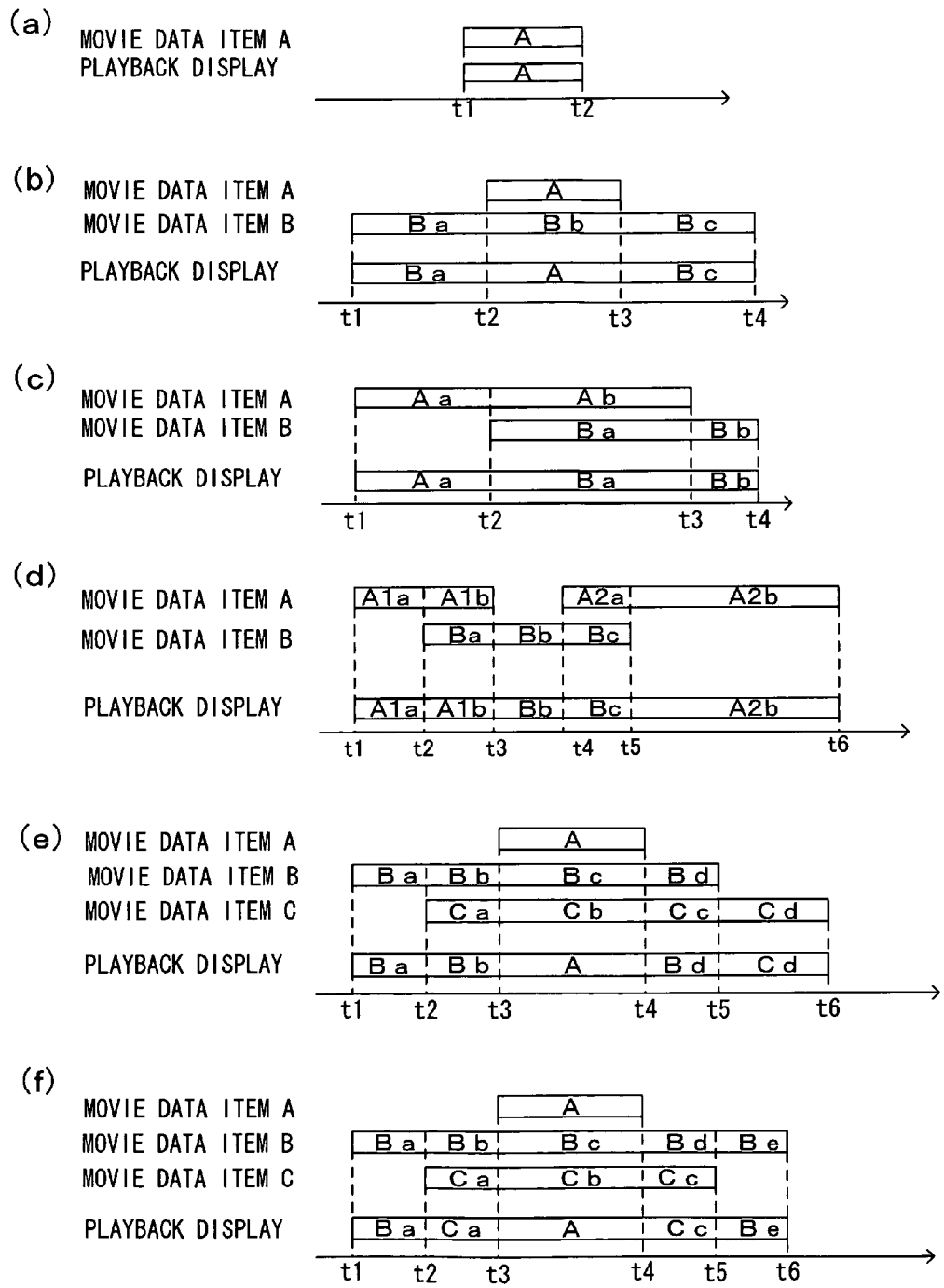
FIG. 33 is a time chart showing movie that is displayed in a combined display mode of a short time period priority mode.

FIG. 33(*a*) shows a case in which, similarly to the case of FIG. 7(*a*), apart from the movie data item A, no other movie data item exists that overlaps it in the same time band. In this case, the movie data item A is selected by the CPU 104, and the movie A that corresponds to this movie data item A is playback displayed upon the monitor 105.

In the example shown in FIG. 33(*b*), it is supposed that the starting time points of photography of each of the movie data items A and B are the same as in the example shown in FIG. 7(*b*). At the time point t1, in a similar manner to the case shown in FIG. 7(*b*), the movie data item B is selected by the CPU 104. At the time point t1, the movie data item B is selected by the CPU 104, in a similar manner to the case shown in FIG. 7(*b*). When the time reaches t2 that is the starting time point of photography of the movie data item A, the CPU 104 compares together the lengths of time of photography of the movie item A and the movie item B, which are in their tag information. The movie data item A is selected by the CPU 104, since the result of the above comparison is that the length of time of photography of this movie data item A is the shorter. And, since only the image data item B exists between the time point t3 and the time point t4, the movie data item B is selected by the CPU 104. Thus, the movie Ba that corresponds to the movie data item Ba is displayed between the time point t1 and the time point t2, while the movie A that corresponds to the movie data item A is displayed between the time point t2 and the time point t3, and the image Bc that corresponds to the movie data item Bc is displayed between the time point t3 and the time point t4.

In the example shown in FIG. 33(*c*), it is supposed that the starting time point of photography and the length of time of photography of each of the movie data items A and B is the same as in the case of FIG. 7(*c*). At the time point t1, the movie data item A is selected by the CPU 104. The movie data items A and B overlap one another between the time point t2 and the time point t3. The CPU 104 compares together the lengths of time of photography of the movie data item A and the movie data item B, as described above, and, since the length of time of photography of the movie data item B is the shorter, the movie data item B is selected by the CPU 104 as a priority, over the movie data item A. Subsequently, this selection by the CPU 104 of the movie data item B is continuously performed until the time point t4.

In the example shown in FIG. 33(*d*), the photographic time point and the length of time of photography of each of the movie data items A1, A2, and B is the same as in the case of FIG. 7(*d*). At the time point t1, the movie data item A1 is selected by the CPU 104. And, at the time point t2 that is the starting time point of photography of the movie data item B, the CPU 104 compares together the lengths of time of photography of the movie data item A1 and the movie data item B. As the result of this comparison, the movie data item A1 whose length of time of photography is the shorter is selected by the CPU 104. Since, between the time point t3 and the time point t4, apart from the movie data item B, no other movie data item exists that overlaps it in the same time band, accordingly the movie data item B is selected by the CPU 104.

When the time reaches the time point t4 that is the starting time point of photography of the movie data item A2, the CPU 104 compares together the lengths of time of photography of the movie item A2 and the movie item B. And, as the result of this comparison, the movie data item B whose length of time of photography is shorter than that of the movie data item A2 is selected by the CPU 104. And, since only the image data item A2 exists between the time point t5 and the time point t6, this movie data item A2 is selected by the CPU 104. Thus, the movie A1 that corresponds to the movie data item A1 is displayed between the time point t1 and the time point t3, while the movie Bb that corresponds to the movie data item Bb is displayed between the time point t3 and the time point t4, the movie Bc that corresponds to the movie data item Bc is displayed between the time point t4 and the time point t5, and the movie A2b that corresponds to the movie data item A2 is displayed between the time point t5 and the time point t6.

In the example shown in FIG. 33(*e*), the photographic time point and the length of time of photography of each of the movie data items A, B, and C is the same as in the case of FIG. 7(*e*). In this case, at the time point t1, the movie data item B is selected by the CPU 104. And, at the time point t2 that is the starting time point of photography of the movie data item C, the lengths of time of photography of the movie data item B and the movie item C are compared together by the CPU 104. As the result of this comparison, the movie data item B whose length of time of photography is shorter than that of the movie data item C is selected by the CPU 104.

At the time point t3 that is the starting time point of photography of the movie data item A, the CPU 104 compares together the lengths of time of photography of the movie data item A, the movie data item B, and the movie data item C. And, as the result of this comparison, the movie data item A whose length of time of photography is the shortest is selected by the CPU 104. And, at the time point t4 that is the ending time point of photography of the movie data item A, the lengths of time of photography of the movie data item B and the movie item C are compared together by the CPU 104. As the result of this comparison, the movie data item B whose length of time of photography is the shorter is selected by the CPU 104. Since, subsequent to the time point t5, no other movie data item exists that is overlapped with the movie data item C, the CPU 104 selects the movie data item C between the time point t5 and the time point t6. Thus, the movie B that corresponds to the movie data item B is displayed between the time point t1 and the time point t3, while the movie A that corresponds to the movie data item A is displayed between the time point t3 and the time point t4, the movie Bd that corresponds to the movie data item Bd is displayed between the time point t4 and the time point t5, and the movie Cd that corresponds to the movie data item Cd is displayed between the time point t5 and the time point t6.

In the example shown in FIG. 33(*f*), the photographic time point and the length of time of photography of each of the movie data items A, B, and C is the same as in the case of FIG. 7(*f*). At the time point t1, the movie data item B is selected by the CPU 104. And, at the time point t2 that is the starting time point of photography of the movie data item C, the lengths of time of photography of the movie data item B and the movie item C are compared together by the CPU 104. As the result of this comparison, the movie data item C whose length of time of photography is shorter than that of the movie data item B is selected by the CPU 104. And, at the time point t3 that is the starting time point of photography of the movie data item A, the movie data item A is selected by the CPU 104, in a similar manner to the case of FIG. 33(*e*).

And, at the time point t4 that is the ending time point of photography of the movie data item A, the lengths of time of photography of the movie data item B and the movie item C are compared together by the CPU 104. As the result of this comparison, the movie data item C whose length of time of photography is the shorter is selected by the CPU 104. Since, subsequent to the time point t5, no other movie data item exists that is overlapped with the movie data item B, the CPU 104 selects the movie data item B between the time point t5 and the time point t6. Thus, the movie Ba that corresponds to the movie data item Ba is displayed between the time point t1 and the time point t2, while the movie Ca that corresponds to the movie data item Ca is displayed between the time point t2 and the time point t3, the movie A that corresponds to the movie data item A is displayed between the time point t3 and the time point t4, the movie Cc that corresponds to the movie data item Cc is displayed between the time point t4 and the time point t5, and the movie Be that corresponds to the movie data item Be is displayed between the time point t5 and the time point t6.

(3-2) The Display One Only Mode

The case in which the display one only mode is selected in the short time period movie priority mode will now be explained with reference to FIG. 34. In this case, if a plurality of movie data items overlap one another within the same time band, the CPU 104 selects only that movie data item whose length of time of photography is the shortest, and the other movie data items are not playback displayed.

FIG. 34(a) shows a case in which, similarly to the case of FIG. 8(a), apart from the movie data item A, no other movie data item exists that overlaps it in the same time band. In this case, the movie data item A is selected by the CPU 104, and the movie A that corresponds to this movie data item A is playback displayed upon the monitor 105.

In FIG. 34(b), it is supposed that the starting time points of photography of each of the movie data items A and B are the same as in the example shown in FIG. 8(b). The CPU 104 compares together the lengths of time of photography of the movie data items A and B that overlap one another in the same time band. And, as the result of this comparison, the movie data item A whose length of time of photography is the shortest is selected by the CPU 104. Accordingly, at the time point t1, the movie data item B is not selected by the CPU 104. When the time reaches the time point t2 that is the starting time point of photography of the movie data item A, the movie data item A is selected by the CPU 104. Subsequently, this selection of the movie data item A by the CPU 104 is continued until the time point t3. FIG. 34(b) is one example in which the display one only mode is set; the way in which it differs from the case of the combination display mode of FIG. 33(b), is that, at the time point t3, the movie data item B is not selected by the CPU 104. In other words, the movie data item B is not selected by the CPU 104.

In FIG. 34(c), it is supposed that the starting time points of photography of each of the movie data items A and B are the same as in the example shown in FIG. 8(c). The CPU 104 compares together the lengths of time of photography of the movie data items A and B that overlap one another in the same time band. And, as the result of this comparison, the movie data item B whose length of time of photography is the shortest is selected by the CPU 104. Accordingly, at the time point t1 that is the starting time point of photography of the movie data item A, the movie data item A is not selected by the CPU 104. When the time reaches the time point t2 that is the starting time point of photography of the movie data item B, the movie data item B is selected by the CPU 104. Subsequently, this selection of the movie data item B by the CPU 104 is continued until the time point t3. In other words, the movie data item A is not selected by the CPU 104.

In the example shown in FIG. 34(d), the length of time of photography of each of the movie data items A1, A2, and B is the same as in the case of FIG. 8(d). The CPU 104 compares together the lengths of time of photography of the movie data items A1, A2, and B that overlap one another within the same time band. As the result of this comparison, the movie data item A1 whose length of time of photography is the shortest is selected by the CPU 104. In other words, in the interval between the time points t1 and t3, only the movie data item A1 is selected by the CPU 104. That is to say, the movie data items A2 and B whose lengths of time of photography are the longer, are not selected by the CPU 104.

In the example shown in FIG. 34(e), the photographic time point and the length of time of photography of each of the movie data items A, B, and C is the same as in the case of FIG. 8(e). In this case as well, the CPU 104 compares together the lengths of time of photography of the movie item A, the movie data item B, and the movie item C. And, as the result of this comparison, the movie data item A whose length of time of photography is the shortest is selected by the CPU 104. Accordingly, at the starting time point of photography t1 of the movie data item B, the movie data item B is not selected by the CPU 104. Similarly, at the starting time point of photography t2 of the movie data item C, the movie data item C is not selected by the CPU 104 either. When the time reaches the time point t3 that is the starting time point of photography of the movie data item A, the movie data item A is selected by the CPU 104. This selection of the movie data item A by the CPU 104 is continued until the time point t4. Subsequent to the time point t4, neither of the image data items B and C is selected by the CPU 104. In other words, the movie data items B and C whose lengths of time of photography are the longer are not selected by the CPU 104.

In the example shown in FIG. 34(f), the photographic time point and the length of time of photography of each of the movie data items A, B, and C is the same as in the case of FIG. 8(f). The CPU 104 compares together the lengths of time of photography of the movie data items A, B, and C that overlap one another in the same time band. As the result of this comparison, the movie data item A whose length of time of photography is the shortest is selected by the CPU 104. Accordingly, in a similar manner to the example shown in FIG. 34(e), the movie data item A is selected by the CPU 104. In other words, the movie data items B and C whose lengths of time of photography are the longer are not selected by the CPU 104

As has been explained above, when the short time period movie priority mode is provided as one of the editing modes, the CPU 104 selects, from among the plurality of data items that have been extracted, that image data item whose length of time is the shortest. Accordingly, this mode is appropriate when the user is creating a paced slide show that uses movie images whose time periods are short. It should be understood that by selecting, in addition to this short time period movie priority mode described above, also the still image simultaneous insertion mode of the simultaneous editing mode it is possible to perform editing using both movie and still images in a similar manner as in the case explained in the above embodiment with reference to FIGS. 17 and 18. In this case, the CPU 104 handles still images like the movies of time period ts in FIGS. 17 and 18, and compares together the lengths of times of photography of those movies that overlap one another, thus determining the images that are to be displayed as priority.

(4) In the scene start priority mode during the display changeover mode of the movie editing processing, instead of according priority to the movie whose starting time point of photography is the latest, it would also be acceptable to accord priority to the movie whose starting time point of photography is the earliest. This case will now be explained in concrete terms using FIG. 35.

FIG. 35(a) shows a case in which, similarly to the case of FIG. 9(a), apart from the movie data item A, no other movie data item exists that overlaps it in the same time band. In this case, the movie data item A is selected by the CPU 104, and the movie A that corresponds to this movie data item A is playback displayed upon the monitor 105.

In the example shown in FIG. 35(b), it is supposed that the starting time point of photography and the length of time of photography of each of the movie data items A and B are the same as in the example shown in FIG. 9(b). The CPU 104 compares together the starting time points of photography of the movie data item A and the movie data item B. Since the result of this comparison is that the starting time point of photography of the movie data item B is earlier than the starting time point of photography of the movie data item A, the movie data item B is selected by the CPU 104. In other words, in the interval between the time point t1 and the time point t4, the movie data item B is selected by the CPU 104. The movie data item A whose starting time point of photography is later than that of the movie data item B is not selected by the CPU 104.

In the example shown in FIG. 35(c), it is supposed that the starting time point of photography and the length of time of photography of each of the movie data items A and B are the same as in the example shown in FIG. 9(c). The CPU 104 compares together the starting time points of photography of the movie data item A and the movie data item B. Since the result of this comparison is that the starting time point of photography of the movie data item A is earlier than the starting time point of photography of the movie data item B, the movie data item A is selected by the CPU 104. In other words, in the interval between the time point t1 and the time point t3, the movie data item A is selected by the CPU 104. When the time reaches the time point t3 that is the ending time point of photography of the movie data item A, the movie data item B is selected by the CPU 104. Accordingly, during the interval between the time point t1 and the time point t3, the movie A that corresponds to this movie data item A is displayed by the CPU 104, and during the interval between the time point t3 and the time point t4, the movie Bb that corresponds to this movie data item Bb is displayed.

In the example shown in FIG. 35(d), it is supposed that the starting time point of photography and the length of time of photography of each of the movie data items A and B are the same as in the example shown in FIG. 9(d). Since in this case the movie data item A and the movie data item B do not overlap one another, the movies that correspond to each of these data items are edited as a continuous image, in a similar manner to the case for FIG. 9(d).

In the example shown in FIG. 35(e), it is supposed that the starting time point of photography and the length of time of photography of each of the movie data items A, B, and C are the same as in the example shown in FIG. 9(e). The CPU 104 compares together the starting time points of photography of the movie data items A, B, and C. Since the result of this comparison is that the starting time point of photography of the movie data item B is the earliest, the movie data item B is selected by the CPU 104. In other words, in the interval between the time point t1 and the time point t5, the movie data item B is selected by the CPU 104. Subsequent to the time point t5, the movie data item C is selected by the CPU 104, since no other movie data item exists other than the movie data item C. Accordingly, during the interval between the time point t1 and the time point t5, the movie B that corresponds to the movie data item B is displayed, and during the interval between the time point t5 and the time point t6, the movie Cd that corresponds to the movie data item Cd is displayed.

In the example shown in FIG. 35(f), it is supposed that the photographic time point and the length of time of photography of each of the movie data items A, B, and C are the same as in the example shown in FIG. 9(e). The CPU 104 compares together the starting time points of photography of the movie data items A, B, and C. Since the result of this comparison is that the starting time point of photography of the movie data item B is the earliest, the movie data item B is selected by the CPU 104. In other words, in the interval between the time point t1 and the time point t6, the movie data item B is selected by the CPU 104. Accordingly the movie data items A and C are not selected by the CPU 104.

In the example shown in FIG. 35(g), it is supposed that the photographic time point and the length of time of photography of each of the movie data items A, B, and C are the same as in the example shown in FIG. 9(g). Since in this case none of the movie data item A and the movie data items B and C do not overlap one another, the movie data item A is selected by the CPU between the time point t1 and the time point t2, in a similar manner to the case for FIG. 9(g). Subsequent to the time point t3, the CPU 104 compares together the starting time points of photography of the movie data items B and C. The result of this comparison is that the movie data item C whose starting time point of photography is the earlier is selected by the CPU 104. When the time reaches the ending time point of photography of the movie data item C at the time point t5, the movie data item B is selected by the CPU 104. This selection by the CPU 104 of the movie data item B is continued until the time point t6 that is the ending time point of photography of the movie data item B. It should be understood that, in a similar manner to the case of FIG. 9(g), the movie data items A through C are edited by the CPU 104 so that the movie C is displayed continuously after the movie A.

By employing a structure of the type described above, it is possible to prevent the malfunction of the system changing over during editing, from the movie that is still being edited to a different movie. It should be understood that, by selecting the still image simultaneous insertion mode of the still image simultaneous editing mode in addition to the scene start priority mode described above, it is possible to perform editing using both movie and still images, in a similar manner to the case explained above with reference to FIG. 19.

With the image editing device explained above, the following programs (1) through (24) may be provided and executed by the CPU 104 individually, or in any combination.

(1) The image processing program executed by a computer includes reading process of reading a plurality of image data items that have been photographed and acquired by a plurality of cameras; and editing process of extracting image data items of which dates and times of photography overlap within a same time band from among the plurality of image data items that have been read, and generating a data item for playback by editing the plurality of extracted image data items.

(2) In the image processing program according to the item (1) described above, the image processing program further includes selection process of selecting one editing mode from a plurality of editing modes according to a selection command output from an actuation member, the editing process generates the data item for playback by editing the image data item according to the editing mode selected by the selection process.

(3) In the image processing program according to the item (1) described above, the editing process includes image data item selection process of selecting an image data item as a selected image data item, from the plurality of extracted image data items and data item for playback generation process of generating the data item for playback so as to display an image upon one screen, based upon the selected image data item.

(4) In the image processing program according to the item (3) described above, priority levels are assigned to the plurality of cameras and the image data item selection process described above selects the image data item that has been acquired by the camera of a highest priority level as the selected image data item, from among the plurality of extracted image data items.

(5) In the image processing program according to the item (3) described above, if a movie data item and a still image data item have been extracted, the image data item selection process selects the still image data item as the selected image data item.

(6) In the image processing program according to the item (3) described above, if a movie data item and a still image data item have been extracted, the image data item selection process selects a movie data item as the selected image data item.

(7) In the image processing program according to the item (3) described above, the image data item selection process selects a movie data item that has a longest playback time period, as the selected image data item.

(8) In the image processing program according to the item (3) described above, the image data item selection process selects a movie data item that has a shortest playback time period, as the selected image data item.

(9) In the image processing program according to the item (3) described above, the image data item selection process selects an image data item that has a latest starting time point of photography, among the plurality of extracted image data items, as the selected image data item.

(10) In the image processing program according to the item (3) described above, the image data item selection process selects an image data item that has an earliest starting time point of photography, among the plurality of extracted image data items, as the selected image data item.

(11) In the image processing program according to the item (3) described above, the image data item selection process selects, on the basis of the plurality of extracted image data items, a first image data item that is one of the plurality of extracted image data items for a first time band in the same time band of date and time of photography, and a second image data item that is different from the first image data item from among the plurality of extracted image data items, for a second time band within the same time band of date and time of photography that is different from the first time band.

(12) The image processing program according to the item (1) described above further includes ranking assignment process of assigning priority levels to the plurality of image data items, and in the image processing program the data item for playback is a data item for playback that displays images corresponding to the plurality of extracted image data items upon two large and small screens on the display monitor; and the editing process generates the data item for playback so as to display an image corresponding to an image data item to which a high priority level has been assigned in a large screen display region, and so as to display an image corresponding to an image data item to which a low priority level has been assigned in a small screen display region.

(13) In the image processing program according to the item (12) described above, the ranking assignment process assigns the high priority level to an image data item that has been photographed with a camera to which a high priority level has been assigned, and assigns the low priority level to an image data item that has been photographed with a camera to which a low priority level has been assigned.

(14) In the image processing program according to the item (13) described above, even if the image corresponds to the image data item that has been photographed with the camera having the low priority level and of which priority level is low, the editing process generates the data item for playback so as to display, in the large screen display region, the image corresponding to the image data item of which the date and time of photography do not overlap with an image corresponding to an image data item of which priority level is high and that has been photographed with the camera having the high priority level.

(15) The image processing program according to the item (1) described above further includes ranking assignment process of assigning priority levels to the plurality of image data items and mode setting process of setting one of a movie priority mode and a still image priority mode, and in the image processing program, the data item for playback is a data item for playback that displays images corresponding to the plurality of extracted image data items in two large and small screen regions upon a display monitor, and if a movie priority mode is set, when one of the plurality of extracted image data items by the editing process corresponds to a movie, and the other corresponds to a still image, the ranking assignment process assigns a high priority level to the image data item of the movie, and assigns a low priority level to the image data item of the still image and the editing process generates the data item for playback so as to display the movie that corresponds to the image data item to which the high priority level has been assigned in the large screen display region, and so as to display the still image that corresponds to the image data item to which the low priority level has been assigned in the small screen display region.

(16) The image processing program according to the item (1) described above further includes ranking assignment process of assigning priority levels to the plurality of image data items; and mode setting process of setting one of a movie priority mode and a still image priority mode, and in the image processing program, the data item for playback is a data item for playback that displays images corresponding to the plurality of extracted image data items in two large and small screen regions on a display monitor, and if a still image priority mode is set, when one of the plurality of extracted image data items by the editing process corresponds to a movie, and the other corresponds to a still image, the ranking assignment process assigns a high priority level to the image data item of the still image, and assigns a low priority level to the image data item of the movie; and the editing process generates the data item for playback so as to display the still image that corresponds to the image data item to which the high priority level has been assigned in the large screen display region, and so as to display the movie that corresponds to the image data item to which the low priority level has been assigned in the small screen display region.

(17) The image processing program according to the item (1) described above further includes ranking assignment process of assigning priority levels to the plurality of image data items, and in the image processing program, the editing process has process to compare a starting time points of photography of the plurality of extracted image data items, the data item for playback is a data item for playback that displays images corresponding to the plurality of extracted image data items in two large and small screen regions on a display monitor, on the basis of a results of comparison of starting time points of photography, the ranking assignment process assigns a high priority level to an image data item that has a later starting time point of photography, and assigns a low priority level to an image data item that has an earlier starting time point of photography and the editing process generates the data item for playback so as to display the image that corresponds to the image data item to which the high priority level has been assigned and that has the later starting time point of photography in the large screen display region, and so as to display the image that corresponds to the image data item to which the low priority level has been assigned and that has the earlier starting time point of photography in the small screen display region.

(18) In the image processing program according to the item (1) described above, if a movie data item and a plurality of still image data items have been extracted, the editing process generates the data item for playback so as to display the images corresponding to the plurality of still image data items, before a starting time point of playback, or after an ending time point of playback, of an image corresponding to the movie data item.

(19) In the image processing program according to the item (1) described above, the editing process further includes process to link together a plurality of separate movie data items that have been read by the reading process into one continuous program, extracts a plurality of still image data items of which dates and times of photography are overlapped the same time band with those of the plurality of movie data items before the program editing process, and generates the data item for playback so as to display images corresponding to the plurality of still image data items that have been extracted, before a starting time point of playback, or after an ending time point of playback, of the program.

(20) In the image processing program according to the item (1) described above, if a still image data item and a movie data item that is accompanied by audio have been extracted, the editing process generates the data item for playback so as to display an image corresponding to the still image data item, and so as to play back the audio corresponding to the movie data item that is accompanied by audio.

(21) In the image processing program according to the item (17) described above, the audio that is output during display of the image corresponding to the still image data item corresponds to a movie data item accompanied by audio that has been photographed with a camera designated by the user.

(22) In the image processing program according to the item (1) described above, if a movie data item accompanied by audio and a still image data item have been extracted, the editing process generates the data item for playback so as, while displaying an image that corresponds to the still image data item, to play back the audio corresponding to the movie data item accompanied by audio, the audio being played back directly before starting the display of the image corresponding to the still image data item.

(23) In the image processing program according to the item (1) described above, if a still image data item accompanied by audio and a movie data item have been extracted, the editing process generates the data item for playback so as to play back the audio corresponding to the still image data item accompanied by audio, while displaying an image corresponding to the movie data item.

(24) In the image processing program according to the item (1) described above, the editing process generates the data item for playback so as to create and play back a sound effect, when the display of the plurality of images changes over.

When updating the program version or the like, the same procedure may be employed as when implementing support for an already existing user via the internet or via a transportable recording medium. Accordingly, the program described above may also be applied to software for version updating in this manner.

Figure 36:
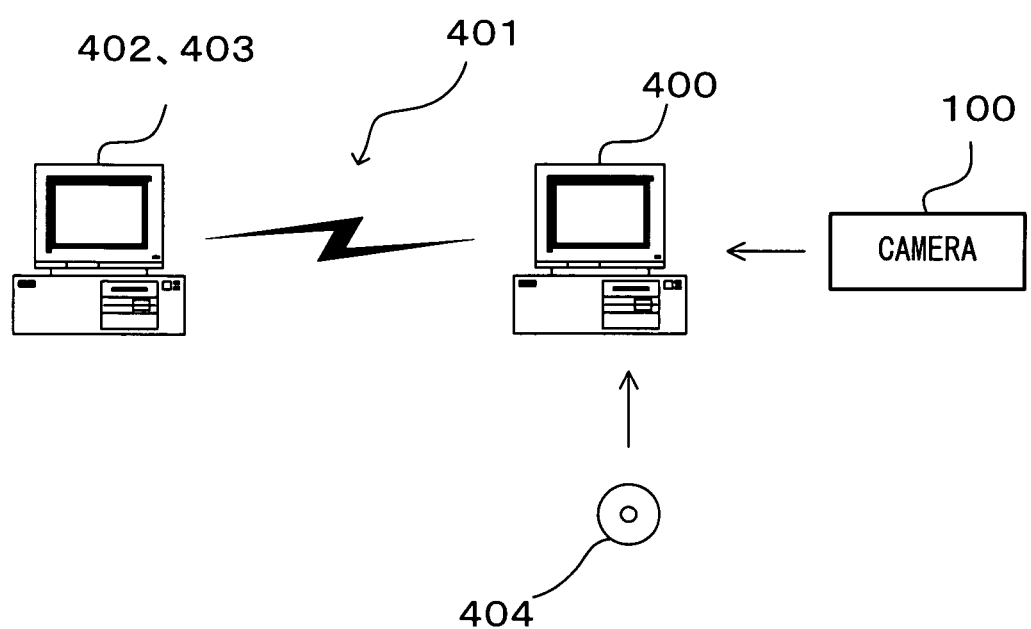
FIG. 36 is a figure for explanation of the overall structure of apparatus used for supplying a program manufactured product.

Moreover, when the present invention is to be applied to a personal computer or the like, a program related to the control as described above may be supplied upon a recording medium such as a CD-ROM or the like, or via a data signal such as the internet or the like. FIG. 36 is a figure showing this situation. A personal computer 400 receives supply of the program via a CD-ROM 404. Moreover, the personal computer 400 is endowed with a function of connection to a communication circuit 401. A computer 402 is a server computer that supplies the program described above, and stores this program upon a recording medium such as a hard disk 403 or the like. The communication circuit 401 is a communication circuit such as the internet or a personal computer communication link or the like, or is a dedicated communication circuit or the like. The computer 402 reads out the program using the hard disk 403, and transmits the program to the personal computer 400 via the communication circuit 401. In other words, the program is embodied as a data signal upon a carrier wave, and is transmitted via the communication circuit 401. In this manner, the program may be supplied as a computer-readable computer program product in various formats, such as a recording medium or a carrier wave or the like.

Furthermore, provided that the specific characteristics of the present invention are not lost, the present invention is not to be considered as being limited by the details of the embodiments described above; other modes that are considered to lie within the range of the technical concept of the present invention are also included within the scope of the present invention.

The content of the disclosure of the following patent application, upon which priority is claimed, is hereby incorporated herein by reference:

Japanese Patent Application 276,189 of 2006 (filed on 10 Oct. 2006).

The invention claimed is:

1. A non-transitory computer-readable recording medium on which an image processing program that is executed by a computer is recorded, the image processing program generating a data item for playback to be played back by successively arranging, in order of data and time of photography, plurality of image data items photographed by a plurality of cameras, the image processing program comprising instructions for:

a reading process of reading the plurality of image data items and information regarding date and time of photography, the plurality of image data items having been photographed and recorded by the plurality of cameras and the information regarding date and time of photography being added to each of the plurality of image data items;

a selection process of selecting one editing mode from a plurality of editing modes in accordance with a selection command output from an actuation member, the plurality of editing modes including at least an editing mode for displaying one image on a display monitor, and the one editing mode that is selected specifying an editing process for the plurality of image data items read by the reading process;

an extracting process of extracting image data items of which the dates and times of photography overlap within a same time band from among the plurality of image data items that have been read;

an image data item selection process of selecting image data items corresponding to the editing mode selected by the selection process as selected image data items, from among the plurality of image data items extracted by the extracting process; and a generating process of generating the data item for playback by successively arranging the selected image data items selected by the image data item selection process in accordance with the editing mode selected by the selection process.

2. The computer-readable recording medium according to claim 1, wherein:
   priority levels are assigned to the plurality of cameras,
   the plurality of editing modes includes a camera priority setting mode in order to select the selected image data items from among the plurality of image data items extracted in accordance with the priority levels, and
   the camera priority setting mode includes a first mode and a second mode, in the first mode, the image data item that has been acquired by the camera of a highest priority level as the selected image data item being selected by the image data item selection process from among the plurality of extracted image data items, and in the second mode, the image data items being selected as the selected image data items in order of the priority levels assigned to the cameras from among the plurality of extracted image data items.

3. The computer-readable recording medium according to claim 1, wherein:
   the plurality of editing modes includes a still image priority mode and a movie priority mode, in the still image priority mode, a still image data item being selected as the selected image data item by the image data item selection process if a movie data item and the still image data item have been extracted, and in the movie priority mode, the movie data item being selected as the selected image data item by the image data item selection process if the movie data item and the still image have been extracted.

4. The computer-readable recording medium according to claim 1, wherein:
   the plurality of editing modes includes a third mode in which a movie data item that has a longest playback time period as the selected image data item is selected from among a plurality of extracted movie data items by the image data item selection process based upon the information regarding data and time of photography.

5. The computer-readable recording medium according to claim 1, wherein:
   the plurality of editing modes includes a fourth mode in which a movie data item that has a shortest playback time period as the selected image data item is selected from among a plurality of extracted movie data items by the image data item selection process based upon the information regarding date and time of photography.

6. The computer-readable recording medium according to claim 1, wherein:
   the plurality of editing modes includes a fifth mode in which an image data item that has a latest starting time point of photography as the selected image data item is selected from among a plurality of extracted movie data items by the image data item selection process based upon the information regarding date and time of photography.

7. The computer-readable recording medium according to claim 1, wherein:
   the plurality of editing modes includes a sixth mode in which an image data item that has an earliest starting time point of photography as the selected image data item is selected from among a plurality of extracted movie image data items by the image data item selection process based upon the information regarding date and time of photography.

8. The computer-readable recording medium according to claim 1, wherein:
   the image data item selection process selects, on the basis of the information regarding date and time of photography added to the plurality of extracted image data items, a first image data item that is one of the plurality of extracted image data items for a first time band included in the same time band of date and time of photography, and a second image data item that is different from the first image data item from among the plurality of extracted image data items, for a second time band within the same time band of date and time of photography that is different from the first time band.

9. The computer-readable recording medium according to claim 1, the image processing program further comprising instructions for:
   a ranking assignment process of assigning priority levels to the plurality of image data items, wherein
   the generating process generates the data item for playback by using the selected image data items selected by the image data item selection process so as to display images corresponding to the plurality of selected image data items upon multi screens on the display monitor, the multi screens including a large screen region and a small screen region, and
   the generating process generates the data item for playback so as to display an image corresponding to the selected image data item to which a high priority level has been assigned in a large screen display region, and so as to display an image corresponding to the selected image data item to which a low priority level has been assigned in a small screen display region.

10. The computer-readable recording medium according to claim 9, wherein:
    priority levels are assigned to the plurality of cameras, and
    the ranking assignment process assigns the high priority level to an image data item that has been photographed with a camera to which a high priority level has been assigned, and assigns the low priority level to an image data item that has been photographed with a camera to which a low priority level has been assigned.

11. The computer-readable recording medium according to claim 1, wherein:
    the plurality of editing modes includes a seventh mode in which, if a movie data item and a plurality of still image data items have been selected, the generating process generates the data item for playback so as to display the images corresponding to the plurality of still image data items, before a starting time point of playback, or after an ending time point of playback, of an image corresponding to the movie data item.

12. The computer-readable recording medium according to claim 1, wherein:
    the plurality of editing modes includes an eighth mode in which a plurality of separate movie data items that have been read by the reading process are linked together into one continuous program;
    the image data item selection process selects a plurality of still image data items of which dates and times of photography are overlapped within the same time band with those of the plurality of movie data items, and
    the generating process generates the data item for playback so as to display images corresponding to the one continuous program into which the plurality of selected separate movie data items are linked and the plurality of still image data items that have been selected, before a starting time point of playback, or after an ending time point of playback, of the program.

13. A non-transitory computer-readable recording medium on which an image processing program that is executed by a computer is recorded, the image processing program comprising instructions for:
- a reading process of reading a plurality of image data items that have been photographed and acquired by a plurality of cameras;
- a generating process of extracting image data items of which dates and times of photography overlap within a same time band from among the plurality of image data items that have been read, and generating a data item for playback by editing the plurality of extracted image data items;
- a ranking assignment process of assigning priority levels to the plurality of image data items; and
- a mode setting process of setting one of a movie priority mode and a still image priority mode, and wherein
- the data item for playback is a data item for playback that displays images corresponding to the plurality of extracted image data items in multi screens on a display monitor, the multi screens including a large screen region and a small screen region,
- if a movie priority mode is set, when one of the plurality of extracted image data items by the generating process corresponds to a movie, and the other corresponds to a still image, the ranking assignment process assigns a high priority level to the image data item of the movie, and assigns a low priority level to the image data item of the still image, and
- the generating process generates the data item for playback so as to display the movie that corresponds to the image data item to which the high priority level has been assigned in the large screen display region, and so as to display the still image that corresponds to the image data item to which the low priority level has been assigned in the small screen display region.

14. A non-transitory computer-readable recording medium on which an image processing program that is executed by a computer is recorded, the image processing program comprising instructions for:
- a reading process of reading a plurality of image data items that have been photographed and acquired by a plurality of cameras;
- a generating process of extracting image data items of which dates and times of photography overlap within a same time band from among the plurality of image data items that have been read, and generating a data item for playback by editing the plurality of extracted image data items;
- a ranking assignment process of assigning priority levels to the plurality of image data items; and
- a mode setting process of setting one of a movie priority mode and a still image priority mode, and wherein
- the data item for playback is a data item for playback that displays images corresponding to the plurality of extracted image data items in multi screens on a display monitor, the multi screens including a large screen region and a small screen region,
- if a still image priority mode is set, when one of the plurality of extracted image data items by the generating process corresponds to a movie, and the other corresponds to a still image, the ranking assignment process assigns a high priority level to the image data item of the still image, and assigns a low priority level to the image data item of the movie, and
- the generating process generates the data item for playback so as to display the still image that corresponds to the image data item to which the high priority level has been assigned in the large screen display region, and so as to display the movie that corresponds to the image data item to which the low priority level has been assigned in the small screen display region.

15. A non-transitory computer-readable recording medium on which an image processing program that is executed by a computer is recorded, the image processing program comprising instructions for:
- a reading process of reading a plurality of image data items that have been photographed and acquired by a plurality of cameras;
- a generating process of extracting image data items of which dates and times of photography overlap within a same time band from among the plurality of image data items that have been read, and generating a data item for playback by editing the plurality of extracted image data items;
- a ranking assignment process of assigning priority levels to the plurality of image data items, wherein
- the generating process includes process to compare a starting time points of photography of the plurality of extracted image data items,
- the data item for playback is a data item for playback that displays images corresponding to the plurality of extracted image data items in multi screens on a display monitor, the multi screens including a large screen region and a small screen region,
- on the basis of a results of comparison of starting time points of photography, the ranking assignment process assigns a high priority level to an image data item that has a later starting time point of photography, and assigns a low priority level to an image data item that has an earlier starting time point of photography, and
- the generating process generates the data item for playback so as to display the image that corresponds to the image data item to which the high priority level has been assigned and that has the later starting time point of photography in the large screen display region, and so as to display the image that corresponds to the image data item to which the low priority level has been assigned and that has the earlier starting time point of photography in the small screen display region.

16. An image processing device, comprising:
- a reading unit that reads a plurality of image data items that have been photographed and acquired by a plurality of cameras and information regarding dates and times of photography that is added to each of the plurality of image data items;
- an actuation member that receives a selection operation so as to select one editing mode from a plurality of editing modes that includes at least an editing mode for displaying one image on a display monitor;
- an extraction unit that extracts image data items of which dates and times of photography overlap within a same time band from among the plurality of image data items that have been read;
- an image data item selection unit that selects image data items corresponding to the editing mode selected based upon the selection operation as selected image data items, from among the plurality of extracted image data items; and
- an editing unit that generates a data item for playback by using the selected image data items selected by the image data item selection unit in accordance with the editing mode selected by the selection operation.

17. An image processing method, comprising:
reading, with a reading unit, a plurality of image data items that have been photographed and acquired by a plurality of cameras and information regarding dates and times of photography that is added to each of the plurality of image data items;
selecting, with an actuation member, one editing mode from a plurality of editing modes that includes at least an editing mode for displaying one image on a display monitor;
extracting, with an extraction member, image data items of which dates and times of photography overlap within a same time band from among the plurality of image data items that have been read;
selecting, with an image data selection unit, image data items corresponding to the selected editing mode as selected image data items from among the plurality of extracted data items; and
generating, with an editing unit, a data item for playback by using the selected image data items.

* * * * *